US010616329B2

(12) United States Patent
Ferrer

(10) Patent No.: US 10,616,329 B2
(45) Date of Patent: Apr. 7, 2020

(54) SYSTEM AND METHOD FOR REAL-TIME CUSTOMIZATION AND SYNCHRONIZATION OF MEDIA CONTENT

(71) Applicant: Julio Ferrer, Oak Park, CA (US)

(72) Inventor: Julio Ferrer, Oak Park, CA (US)

(73) Assignee: Julio Ferrer, Oak Park, CA (US)

( * ) Notice: Subject to any disclaimer, the term of this patent is extended or adjusted under 35 U.S.C. 154(b) by 432 days.

(21) Appl. No.: 15/328,674

(22) PCT Filed: Aug. 13, 2015

(86) PCT No.: PCT/IB2015/002382
§ 371 (c)(1),
(2) Date: Jan. 24, 2017

(87) PCT Pub. No.: WO2016/063137
PCT Pub. Date: Apr. 28, 2016

(65) Prior Publication Data
US 2017/0230454 A1    Aug. 10, 2017

Related U.S. Application Data

(60) Provisional application No. 62/036,834, filed on Aug. 13, 2014.

(51) Int. Cl.
*H04L 29/08* (2006.01)
*H04L 29/06* (2006.01)
(Continued)

(52) U.S. Cl.
CPC ...... *H04L 67/1095* (2013.01); *H04L 65/4069* (2013.01); *H04L 65/601* (2013.01);
(Continued)

(58) Field of Classification Search
None
See application file for complete search history.

(56) References Cited

U.S. PATENT DOCUMENTS

| 7,873,982 B2 * | 1/2011 | Smith | H04H 20/31 |
| | | | 348/563 |
| 2002/0053078 A1 * | 5/2002 | Holtz | G06Q 30/06 |
| | | | 725/14 |
| 2003/0084442 A1 * | 5/2003 | Kellner | H04N 5/607 |
| | | | 725/38 |
| 2006/0002681 A1 | 1/2006 | Spilo et al. | |

(Continued)

FOREIGN PATENT DOCUMENTS

| EP | 2790337 | 10/2014 |
| WO | 2012048928 | 4/2012 |

*Primary Examiner* — Kenny S Lin
(74) *Attorney, Agent, or Firm* — Fish IP Law, LLP

(57) ABSTRACT

A method for customizing media content includes: receiving over a network from a client device controlled by a user, by a server-side computing device, a message or packet comprising stock media content received from a user, the message or packet further comprising customization preferences of the user obtained by the client-side customization application, the customized media content to be played by a client-side playback device in coordination with server-side playback of the stock media content by a server-side playback device; customizing the stock media content, by the server-side computing device, using the customization preferences of the user, so as to create customized media content; and streaming live over the network, by the server-side computing device, to the client device, the customized media content for playback by the client device that is substantially synchronized with playback by the server-side computing device of the stock media content.

25 Claims, 25 Drawing Sheets

(51) Int. Cl.

| | |
|---|---|
| *H04N 21/258* | (2011.01) |
| *H04N 21/43* | (2011.01) |
| *H04N 21/45* | (2011.01) |
| *H04N 21/4788* | (2011.01) |
| *H04N 21/414* | (2011.01) |
| *H04N 21/41* | (2011.01) |
| *H04N 21/2668* | (2011.01) |
| *H04N 21/475* | (2011.01) |

(52) U.S. Cl.
CPC ....... *H04L 67/42* (2013.01); *H04N 21/25891* (2013.01); *H04N 21/2668* (2013.01); *H04N 21/4122* (2013.01); *H04N 21/4126* (2013.01); *H04N 21/41415* (2013.01); *H04N 21/4305* (2013.01); *H04N 21/4307* (2013.01); *H04N 21/4532* (2013.01); *H04N 21/4756* (2013.01); *H04N 21/4788* (2013.01)

(56) References Cited

U.S. PATENT DOCUMENTS

| | | | |
|---|---|---|---|
| 2008/0071399 A1* | 3/2008 | Baird | H04H 60/80 700/94 |
| 2009/0010283 A1 | 1/2009 | Lin et al. | |
| 2010/0061695 A1* | 3/2010 | Furmanski | G11B 27/034 386/278 |
| 2012/0144435 A1* | 6/2012 | Spilo | H04N 5/76 725/78 |
| 2014/0040930 A1* | 2/2014 | Gates, III | H04N 21/251 725/13 |
| 2014/0071342 A1* | 3/2014 | Winograd | H04N 5/44 348/383 |
| 2014/0079241 A1* | 3/2014 | Chan | H04W 4/21 381/77 |
| 2014/0153727 A1 | 6/2014 | Walsh et al. | |
| 2014/0186010 A1* | 7/2014 | Guckenberger | G11B 27/031 386/248 |

\* cited by examiner

SYSTEM AND METHOD FOR REAL-TIME CUSTOMIZATION AND SYNCHRONIZATION OF MEDIA CONTENT

PRIORITY CLAIM

The present application claims the priority benefit of U.S. provisional patent application No. 62/036,834 filed Aug. 13, 2014 and entitled "Computer-Readable Medium, System and Method for Real-Time Customization and Synchronization of Media Content," the disclosure of which is incorporated herein by reference.

This invention relates to a method and system for the customization via one or more electronic devices of one or more of media content. Particularly, the invention relates to a method and system for customization and synchronization via one or more electronic devices of media content. More particularly, the invention relates to a method and system for the customization and synchronization via one or more electronic devices of one or more of one or more of audio and video content. More particularly, the invention relates to a medium, method and system for real-time customization via one or more electronic devices of one or more of synchronized audio and synchronized video content. Even more particularly, the invention relates to a medium, method and system for real-time customization via one or more electronic devices of one or more of synchronized audio and synchronized video content within and around one or more of a venue, public, office, school and home environment. Specifically, the invention relates to a medium, method and system for real-time customization via one or more electronic devices of one or more of synchronized audio and synchronized video content within and around one or more of a venue, public, office and home environment over a communications network. The invention provides four different alternative methods, to which we respectively refer in shorthand as the baseline, download, streaming, and live methods.

According to embodiments of the invention, a platform is provided for the synchronization of one or more of audio content, video content, and other data during playback of content. For example, the content may be digital content. For example, the content may be another type of content other than digital content. For example, the content may be accessed by a user using a client device. For example, the content may be accessed by the user over a network. For example, the audio content may comprise one or more of customized audio content and alternative audio content. For example, the video content may comprise one or more of customized video content, customized video content and alternative video content.

In particular, according to further embodiments of the invention, the one or more of audio content, video content, and other data synchronizes with on-screen video. For example, the on-screen video may be projected using one or more of a digital projector, hologram projector, computer, television, console, head-set, another projection device, and another reception device. The synchronization is performed by one or more of a computer algorithm, clock and sensor. Alternatively, or additionally, the system receives synchronization input from one or more of the user and a designer.

According to further embodiments of the invention, a contained communication with the audience within the venue also can be monitored (i.e. expanded, edited or deleted) by an employee or contractor of the venue. Alternative embodiments of the invention address home media viewing. Also, the client-side social networking application tracks every user and knows each user's specific location in the venue. Also, according to yet other embodiments of the invention, the walled environment may include multiple venues within different locations and/or time zones viewing the same media content simultaneously, maybe even synchronously. Also, the client-side social networking application can allow for the creation of private chat rooms.

According to further embodiments of the invention, media content may be customized, including a children's customization system. According to yet other embodiments of the invention, media content can be saved, including children's media content. A user may choose one or more of a language of interest, a commentary track of interest, a commercial of interest, a trailer of interest, a demo of interest, and alternative content of interest. The user may choose to participate in a survey. These features are available in one or more of in venue settings, on demand settings, in-synchronization ("in-sync") settings, and in other settings. These features are available on multiple platforms and devices.

According to other embodiments of the invention, a method for real-time customization and synchronization of stock media content includes: receiving, by a client device controlled by a user, stock media content selected by the user to be customized and played on the client device in coordination with server-side playback of the stock media content by a server-side computing device; obtaining, by the client device, customization preferences of the user; customizing the stock media content, by the client device, using the customization preferences, so as to create customized media content; creating, by the client device, a client-side message or packet comprising one or more of a client-side unique identifier and a client-side start host time (CSHT); sending, by the client device, the client-side message or packet to the server-side computing device; receiving and processing a server-side message or packet comprising g one or more of a server-side unique identifier, the CSHT, a server-side start host time (SSHT), a server-side end host time (SEHT), and a server-side running media play time (SRMPT) and substantially synchronizing in real-time, by the client device, using one or more of the server-side unique identifier, the CSHT, the SSHT, the SEHT, and the SRMPT, client-side playback of the customized media content with server-side playback of the stock media content; and playing back, by the client device, the synchronized customized media content.

According to still further embodiments of the invention, a method for customizing media content pursuant to a method for real-time customization and synchronization of stock media content includes: receiving and processing, by a server-side computing device, from a client device controlled by a user, a client-side message or packet from the client device comprising one or more of a client-side unique identifier, and a client-side start host time (CSHT); creating, by the server-side computing device, a server-side message or packet comprising one or more of a server-side unique identifier comprising a copy of the client-side unique identifier, the CSHT, a server-side start host time (SSHT), a server-side end host time (SEHT), and a server-side running media play time (SRMPT); transmitting the server-side message or packet to the client device, by the server-side computing device, to be used by the client device along with previously received stock media content selected by a user to be customized, and customized media content previously created using customization preferences obtained from a user, to substantially synchronize in real-time, using the CSHT, client-side playback of the customized media content with server-side playback of the stock media content; and playing back, by the server-side computing device, the synchronized stock media content.

According to other embodiments of the invention, a method for customizing media content pursuant to a method for real-time customization and synchronization of stock media content includes: receiving over a network from a client device controlled by a user, by a server-side computing device, a message or packet comprising stock media content received from a user, the message or packet further comprising customization preferences of the user obtained by the client-side customization application, the customized media content to be played by a client-side playback device in coordination with server-side playback of the stock media content by a server-side playback device; customizing the stock media content, by the server-side computing device, using the customization preferences of the user, so as to create customized media content; transmitting, by the server-side computing device, to the client device, the customized media content so that the client device may substantially synchronize with its playback of the customized media content a playback of the stock media content by the server-side computing device; receiving, by the server-side computing device, from the client device, a client-side message or packet comprising one or more of a client-side unique identifier and a client-side start host time (CSHT); sending to the client device, by the server-side computing device, a server-side message or packet comprising one or more of a server-side unique identifier, the CSHT, a server-side start host time (SSHT), a server-side end host time (SEHT), and a server-side running media play time (SRMPT); and initiating, by the server-side computing device, server-side playback of the stock media content and initiating, by the server-side computing device, via a play command the server-side computing device sends to the client device, client-side playback of the customized media content that is substantially synchronized using one or more of the client-side unique identifier, the CSHT, the SSHT, the SEHT, and the SRMPT.

According to embodiments of the invention, a method for receiving and processing a server-side message or packet and synchronizing one or more clocks comprised in a client device under a user's control with one or more server-side clocks pursuant to a method for real-time customization and synchronization of stock media content includes: receiving, by the client device, a server-side message or packet from the server-side master application, the server-side message or packet comprising one or more of a unique identifier, a client-side start host time (CSHT), a server-side start host time (SSHT), a server-side end host time (SEHT), and a server-side running media play time (SRMPT); reading, by the client device, the server-side message or packet into one or more client-side buffers; recording, by the client device, a client-side end host time (CEHT); evaluating and verifying, by the client device, integrity of the server-side message or packet by comparing the CEHT and the SEHT; calculating a half-round-trip time (HRT), by the client device, using one or more of the CEHT, CSHT, SEHT, and SSHT; reading, by the client device a value of the SRMPT; calculating, by the client device, using one or more of CEHT, CSHT, SEHT, SSHT, SRMPT, and HRT, a playback offset time $T_{PO}$; computing, by the client device, using one or more of the $T_{PO}$ and the SRMPT, a client-side running media play time (CRMPT); and substantially synchronizing, by the client device, using one or more of the CRMPT and the $T_{PO}$, client-side playback of customized media content to server-side playback of stock media content.

According to other embodiments of the invention, a method for customizing media content pursuant to a method for real-time customization and synchronization of stock media content includes: receiving over a network from a client device controlled by a user, by a server-side computing device, a message or packet comprising stock media content received from a user, the message or packet further comprising customization preferences of the user obtained by the client-side customization application, the customized media content to be played by a client-side playback device in coordination with server-side playback of the stock media content by a server-side playback device; customizing the stock media content, by the server-side computing device, using the customization preferences of the user, so as to create customized media content; and streaming live over the network, by the server-side computing device, to the client device, the customized media content for playback by the client device that is substantially synchronized with playback by the server-side computing device of the stock media content.

According to still further embodiments of the invention, a method for customizing stock media content pursuant to a method for real-time customization and synchronization of stock media content, so as to create customized media content includes: receiving, by a server-side computing device, from a client device under the control of a user, a client-side message or packet with pre-determined media content; creating, by the server-side computing device, a customized media content; adding, by the server-side computing device, to the customized media content, using a pre-defined data structure, new media content comprising one or more of user-selected new media content and non-user-selected new media content; computing, by the server-side computing device, a total media frames count of the customized media content; computing, by the server-side computing device, a total percentage of the then-written customized media content; and writing, by the server-side computing device, the new media content into the customized media content.

According to embodiments of the invention, a method for receiving and processing a server-side message or packet and synchronizing one or more clocks comprised in a client device under a user's control with one or more server-side clocks pursuant to a method for real-time customization and synchronization of stock media content includes: receiving, by the client device, a server-side message or packet from the server-side master application, the server-side message or packet comprising one or more of a unique identifier, a client-side start host time (CSHT), a server-side start host time (SSHT), a server-side end host time (SEHT), and a server-side running media play time (SRMPT); reading, by the client device, the server-side message or packet into one or more client-side buffers; recording, by the client device, a client-side end host time (CEHT); evaluating and verifying, by the client device, integrity of the server-side message or packet by comparing the CEHT and the SEHT; calculating a half-round-trip time (HRT), by the client device, using one or more of the CEHT, CSHT, SEHT, and SSHT; reading, by the client device a value of the SRMPT; calculating, by the client device, using one or more of CEHT, CSHT, SEHT, SSHT, SRMPT, and HRT, a playback offset time $T_{PO}$; computing, by the client device, using one or more of the $T_{PO}$ and the SRMPT, a client-side running media play time (CRMPT); and synchronizing, by the client device, using one or more of the CRMPT and the $T_{PO}$, client-side playback of customized media content to server-side playback of stock media content.

According to other embodiments of the invention, a method for constructing a media content file comprising one or more of a user's selected media content and media content that was not selected by the user, pursuant to a method for real-time customization and synchronization of stock media content includes: launching, by a client device under the control of a user, a client-side media player; selecting and playing, by the client device, a pre-determined media content; creating, by the client device, a customized media content; adding, by the client device, new media content to the customized media content; computing, by the client device, a total media frames count of the customized media content; computes, by the client device, a total percentage of the then-written customized media content; and writing, by the client device, the new media content into the customized media content.

According to yet further embodiments of the invention, a server-side computing device for customizing media content includes: a processor; data storage operably connected with the processor; memory operably connected with the processor, the memory comprising one or more of a server-side master application, a server-side customization application, and a server-side streaming application; a projector operably connected with the processor; and a local interface operably connected with the processor and configured to communicate over a network with a client device controlled by a user, the server-side master application configured to receive over the network from the client device a message or packet comprising stock media content selected by the user, the server-side customization application configured to obtain customization preferences of the user; the server-side customization application further configured to customize the stock media content, using the customization preferences of the user, so as to create customized media content, the local interface configured to transmit to the client device via the network server-side timing information and the customized media content so that the client device may substantially synchronize with its playback of the customized media content a playback by the projector of the stock media content.

DESCRIPTION OF THE DRAWINGS

FIG. 3 applies to the baseline method viewed from the client side.

FIG. 4 applies to the baseline method viewed from the server side.

FIG. 5 applies to the download and streaming methods viewed from the client side.

FIG. 6 applies to the download and streaming method viewed from the server side.

FIG. 7 applies to the live method viewed from the client side.

FIG. 8 applies to the live method viewed from the server side.

FIG. 9 provides provide more detail regarding sub-steps of step 315 in FIG. 3 for the baseline method.

FIG. 10 provides more detail regarding sub-steps of step 315 in FIG. 3 for the baseline method.

FIG. 13 provides more detail regarding sub-steps of step 345 in FIG. 3 for the baseline method, step 545 in FIG. 5 for the download and streaming methods, and step 745 in FIG. 7 for the live method.

FIG. 14 provides more detail regarding sub-steps of step 360 in FIG. 3 for the baseline method, and step 560 in FIG. 5 for the download and streaming methods. Synchronization is not required with the live method.

DETAILED DESCRIPTION

Figure 1:
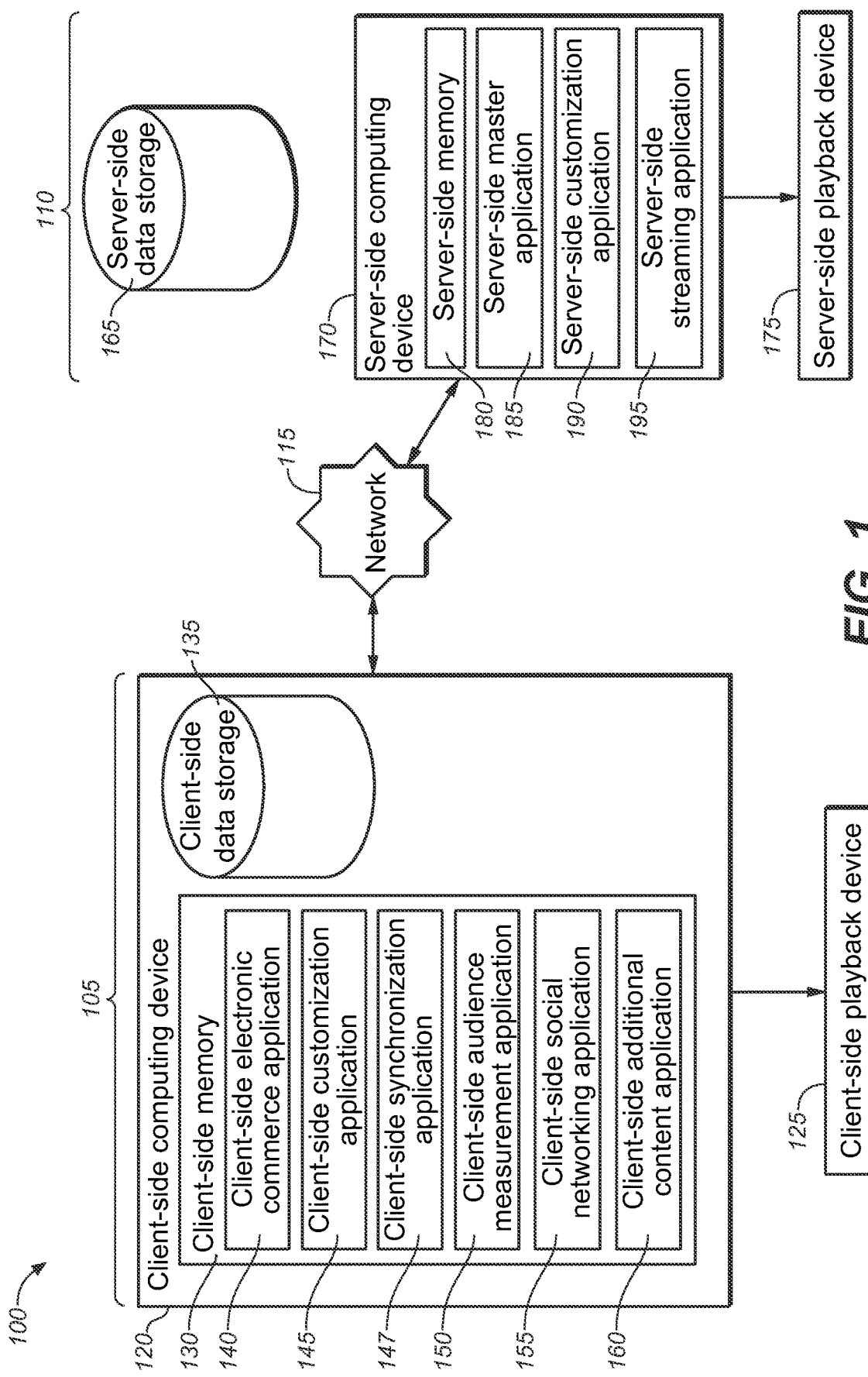
FIG. 1 is a block diagram of a networked environment for real-time customization and synchronization via one or more electronic devices of media content.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

The system for the customization via one or more electronic devices of one or more of media content includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

FIG. 1 is a block diagram of a networked environment 100 for real-time customization and synchronization via one or more electronic devices of media content that comprises a client-side networked environment 105, a server-side networked environment 110, and a network 115. The network 115 comprises one or more of the Internet, a private virtual network, an extranet, a fiber optic network, a wide area network (WAN), a local area network (LAN), a wired network, a wireless network, and another type of network.

The client-side networked environment 105 comprises a client device 120 and a client-side playback device 125 that is operably connected with the client device 120. The client device 120 comprises, for example, one or more of a tablet, a phone, a smart device, a virtual reality headset, a computer program, a computer browser, a media player, a game console, a virtual device, and another computing device.

The client device 120 processes a user's selection of media content. For example, the client device 120 processes the user's selection of media content to match media content stored in the client-side data storage 135. Alternatively, or additionally, the client device 120 may create new media content. The media content may be one or more of encrypted, non-encrypted, compressed, and non-compressed.

For example, the client device 120 may create a new audio clip. The client device 120 may create the new audio clip by one or more of executing a text-to-audio algorithm, executing a speech recognition algorithm, executing an algorithm based on trends, making a random selection of the new audio clip, making a selection of the new audio clip, and by another method for making new media content. The client device 120 may create the new audio clip based on one or more of a media selected by the user, a media selected by another user, the user's historical purchases, the user's consumption history, the user's recommended items, items recommended by the system to users, and another audio clip criterion.

The client device 120 runs one or more applications. The client device 120 deploys over the network 115.

The client-side playback device 125 is configured to play media content. For example, the client-side playback device 125 plays media content received from the client device 120. Alternatively, or additionally, the client-side playback device 125 plays media content received directly over the network 115. For example, the client-side playback device 125 comprises one or more of a headphone, a pair of earphones, a pair of earbuds, earworn wearables, a screen, a television, a monitor, an in-venue projector, a home theater, a television, a monitor, a three-dimensional digital projector, and another client-side playback device. For example, the client-side playback device 125 comprises one or more of an open headphone 125, a semi-open headphone 125, a closed headphone 125, and another type of headphone 125. For example, the client-side playback device 125 operates in one or more of a single-channel environment and a multi-channel speaker environment. For example, the client-side playback device 125 operates in a Dolby Atmos environment.

The client device 120 comprises one or more of client-side memory 130 and a client-side data storage 135.

The client-side memory 130 is defined herein as including both volatile and nonvolatile memory and data storage components. For example, the client-side memory 130 comprises one or more client-side buffers. Volatile components are those that do not retain data values upon loss of power. Nonvolatile components are those that retain data upon loss of power. For example, the client-side memory 130 may comprise one or more of random access memory (RAM), read-only memory (ROM), hard disk drive, solid-state drive, USB flash drive, memory card, floppy disk, optical disc such as compact disc (CD) or digital versatile disc (DVD), magnetic tape, and other memory components. For example, the RAM may comprise one or more of static random access memory (SRAM), dynamic random access memory (DRAM), magnetic random access memory (MRAM), and other forms of RAM. For example, the ROM may comprise one or more of programmable read-only memory (PROM), erasable programmable read-only memory (EPROM), electrically erasable programmable read-only memory (EEPROM), and other forms of ROM.

The client-side memory 130 comprises one or more of a client-side electronic commerce application 140, a client-side customization application 145, a client-side synchronization application 147, a client-side audience measurement application 150, a client-side social networking application 155, and a client-side additional content application 160. For example, the client-side memory 130 comprises one or more client-side buffers.

The client-side memory 130 further comprises a client device unique identifier. The client device unique identifier is a number unique to this particular device. In other words, each device in the world will have its own number that no other such device will have. A copy of the client device unique identifier, known as a as a client-side unique identifier, will be transmitted by the client in a message or packet to the server. Then a copy of the client-side transmitted unique identifier, known as a server-side unique identifier, will be transmitted back from the server to the client. The server-side unique identifier received by the client will then be compared with the client device unique identifier to help determine the integrity of the messages and as a security check.

Optionally, the client-side memory 130 further comprises an other client-side application (not pictured). The other client-side application comprises one or more of an additional client-side application, an additional client-side service, an additional client-side process, and an additional client-side functionality.

For example, the other client-side application runs background services. For example, the other client-side application runs boot processes. For example, the other client-side application runs other client-side applications.

The client-side data storage 135 comprises one or more of a single database, a multiple database, a cloud application platform, a relational database, a no-sequel database, flash memory, solid state memory, and another client-side data storage device. The client-side data storage 135 may be located in a single installation that may be local to the server-side computing device 110. Alternatively, the client-side data storage 135 may be located in a single installation that may be local to the client device 120. Alternatively, the client-side data storage 135 may be distributed in a plurality of locations. The client-side data storage 135 may be distributed in a plurality of geographical locations. The client-side data storage 135 may be distributed in a plurality of geographical locations located in the same time zone. The client-side data storage 135 may be distributed in a plurality of geographical locations, wherein not all the geographical locations are located in the same time zone.

The client-side data storage 135 comprises one or more of item prices, order information, media content, and other information. For example, the media content comprises one or more of an audio track, a video track, another media track, a motion picture, a commercial, a motion picture trailer, a demonstration ("demo"), a commentary, extra content, and another form of additional content. The media content comprises one or more of media data, media content files, and other media content. The motion picture comprises one or more of a film, a movie, a documentary, a commercial, a trailer, a television show, and another motion picture. The media data comprises one or more of an audio track, a multi-channel track, a commentary, and other media data. The audio track comprises one or more of an English language audio track, an audio track in a language other than English, and a customized audio track. The commentary comprises one or more of a commentary by one or more directors of a motion picture, a commentary by one or more actors in a motion picture, a commentary by contributors to a motion picture other than the directors and actors, and a commentary by persons other than contributors to a motion picture.

The client-side electronic commerce application 140 is configured to perform one or more of receiving user orders, fulfilling user orders and delivering ordered products to an ordering user. The client-side electronic commerce application 140 is configured to execute online purchases placed by the user of one or more of physical goods, services, and media content. The client-side electronic commerce application 140 is further configured to optionally customize the one or more of physical goods, services, and media content. For example, an additional charge may apply to a user wishing to have customized the one or more of physical goods, services, and media content. For example, the one or more of physical goods, services, and media content may be customized by adding one or more of a user-specified name, a user-specified message or packet, and another form of customization specified by the user.

For example, the user-specified name may comprise a name of a character comprised in the digital media content. For example, the digital media content comprises a motion picture. For example, if a motion picture is titled, "Joe's and Sport's Exciting Trip" and describes a road trip by a man Joe and his dog Sport, the user-specified name might be "Joe." For example, the user might insert the user's own name as the name of one of the characters in the digital media content. For example, a user named Hamilton might insert "Hamilton" as the name of the character known in the motion picture as Joe. For example, the user might insert the name of his or her pet as the name of one of the animals in the digital media content. For example, if Hamilton has a dog named Champ, Hamilton might insert "Champ" as the name of the dog known in the motion picture as Sport.

The client-side customization application 145 is configured to store media content. For example, the client-side customization application 145 stores the playable media content in the client-side data storage 135. The playable media content comprises one or more of a segmented media content track, a non-segmented media content track, and another playable media content. Optionally, the client-side customization application 145 performs media processing of the playable media content. For example, the client-side customization application 145 passes the playable media content through a bandpass filter. For example, the client-side customization application 145 parses the playable media content into a chronological sequence that substantially matches the sequence of the motion picture. For example, the client-side customization application 145 writes the playable media content to one or more of the client-side data storage 135 and the client-side memory 130. For example, the client-side customization application 145 writes the playable media content to a media content file located in one or more of the client-side data storage 135 and the client-side memory 130.

The client-side synchronization application 147 is configured to connect with the server-side networked environment 110 so as to substantially synchronize between the server-side networked environment 110 and the client device 120 media content played on the client-side playback device 125. The client-side playback device 125 comprises one or more of a screen, a television, a monitor, a cellular phone, a laptop computer, a desktop computer, a notebook, a tablet, a multi-channel playback system, and another client-side playback device. The client-side playback device plays for the user one or more of audio media content, video media content, and another form of media content. For example, the networked environment 100 may be synchronized with other sensory experiences such as, for example, one or more of smoke effects, water droplets, moving chairs, and the like. For example, more than one client-side playback device 125 may be used simultaneously.

As explained below in greater detail, particularly in FIGS. 3 and 12, the client-side synchronization application 147 is configured to perform one or more of sampling and recording a client-side running media play time (CRMPT) at which the client-side media player plays the media on the client. The CRMPT is defined as an elapsed running time for customized media content that is being played by the client-side media player on the client. If no customized media content is being played by the client-side media player, the CRMPT is defined as zero. The CRMPT recorded by the client-side synchronization application 147 represents a real world time value based on the host system clock of the client. Then, the client-side synchronization application 147 creates a client-side message or packet that it transmits to the server-side networked environment 110.

The client-side audience measurement application 150 is configured to solicit the user's opinion regarding one or more questions of interest. For example, the client-side audience measurement application 150 presents the user with one or more of a survey and another audience measure. For example, the client-side audience measurement application 150 solicits the user's opinion regarding an audience measure relating to the media content displayed by the client-side playback device 125.

The client-side social networking application 155 comprises a client-side social networking interface (not pictured) configured to communicate with the user. The client-side social networking interface communicates with the user via one or more of in-venue communication and home communication.

The client-side additional content application 160 is configured to play additional content comprised in the client device 120. For example, the additional content comprises one or more of a commercial, a motion picture trailer, a demonstration ("demo"), extra content, and another form of additional content. For example, the demo comprises one or more of a demonstration regarding a technical breakthrough, a behind-the-scenes short film regarding the making of a motion picture, an outtakes reel, a documentary about a topic relating to the motion picture, and another demo. One or more of the commercials may be customized. Alternatively, or additionally, one or more of the commercials may not be customized. One or more of the trailers may be customized. Alternatively, or additionally, one or more of the trailers may not be customized.

The server-side networked environment 110 comprises a server-side data storage 165, a server-side computing device 170 that is operably connected with the server-side data storage 165, and a server-side playback device 175 that is operably connected with the server-side data storage 165. The server-side data storage 165 is a second location where, as mentioned above in relation to the client-side data storage 135, the client-side customization application 145 may store the playable media content.

The server-side data storage 165 comprises one or more of item prices, order information, media content, and other information. The media content comprises one or more of media data, media content files, and other media content. For example, the media content files comprise one or more of an audio track, a video track, another media track, a motion picture, another media track, a commercial, a motion picture trailer, a demonstration ("demo"), a commentary, extra content, and another form of additional content. For example, the audio track comprises one or more of an English language audio track, an audio track in a language other than English, and a customized audio track. For example, the commentary comprises one or more of a commentary by one or more directors of a motion picture, a commentary by one or more actors in a motion picture, a commentary by contributors to a motion picture other than the directors and actors, and a commentary by persons other than contributors to a motion picture.

The server-side data storage 165 comprises one or more of a single database, a multiple database, a cloud application platform, a relational database, a no-sequel database, flash memory, solid state memory, and another server-side data storage device. The server-side data storage 165 may be located in a single installation that may be local to the client device 120. Alternatively, the server-side data storage 165 may be located in a single installation that may be local to the server-side computing device 170. Alternatively, the server-side data storage 165 may be distributed in a plurality of locations. The server-side data storage 165 may be distributed in a plurality of geographical locations. The server-side data storage 165 may be distributed in a plurality of geographical locations located in the same time zone. The server-side data storage 165 may be distributed in a plurality of geographical locations, wherein not all the geographical locations are located in the same time zone.

The server-side computing device 170 comprises one or more of a server, a computer, a cloud-computing device, and a distributed computing system.

Optionally, the server-side computing device 170 further comprises an other server-side application (not pictured). The other server-side application comprises one or more of an additional server-side application, an additional server-side service, an additional server-side process, and an additional server-side functionality.

For example, the other server-side application runs background services. For example, the other server-side application runs boot processes. For example, the other server-side application runs other server-side applications.

The server-side computing device 170 may be located in a single installation. Alternatively, the server-side computing device 170 may be distributed in a plurality of geographical locations. For example, the server-side computing device 170 may be distributed in a plurality of geographical locations located in the same time zone. For example, the server-side computing device 170 may be distributed in a plurality of geographical locations wherein not all the geographical locations are located in the same time zone.

The server-side playback device 175 is configured to play media content. For example, the server-side playback device 175 plays media content received from the server-side computing device 170. Alternatively, or additionally, the server-side playback device 175 plays media content received directly over the network 115. For example, the server-side playback device 175 comprises one or more of a headphone, a pair of earphones, a pair of earbuds, earworn wearables, a screen, a television, a monitor, an in-venue projector, a home theater, a television, a monitor, a three-dimensional digital projector, and another device. The server-side playback device 175 is configured to communicate with the server-side computing device 170. For example, the server-side playback device 175 communicates with the server-side computing device 170 using one or more of a satellite, an antenna, a cable, the network 115, and another communication method. The server-side playback device 175 is a second device that can, as mentioned above in relation to the client-side playback device 125, play media content regarding which the user's opinion is solicited by the client-side audience measurement application 150.

The server-side computing device comprises a server-side memory 180. The server-side memory 180 is defined herein as including both volatile and nonvolatile memory and data storage components. For example, the server-side memory 180 comprises one or more server-side buffers. Volatile components are those that do not retain data values upon loss of power. Nonvolatile components are those that retain data upon loss of power. For example, the server-side memory 180 may comprise one or more of random access memory (RAM), read-only memory (ROM), hard disk drive, solid-state drive, USB flash drive, memory card, floppy disk, optical disc such as compact disc (CD) or digital versatile disc (DVD), magnetic tape, and other memory components. For example, the RAM may comprise one or more of static random access memory (SRAM), dynamic random access memory (DRAM), magnetic random access memory (MRAM), and other forms of RAM. For example, the ROM may comprise one or more of programmable read-only memory (PROM), erasable programmable read-only memory (EPROM), electrically erasable programmable read-only memory (EEPROM), and other forms of ROM.

The server-side memory 180 comprises one or more of a server-side master application 185, a server-side customization application 190, and a server-side streaming application 195. The server-side master application 185 is configured to provide synchronization timing information to one or more of the client-side synchronization application 147 and the server-side streaming application 195.

As explained below in greater detail, particularly in FIGS. 3 and 12, the server-side master application 185 is configured to perform one or more of sampling and recording a server-side running media play time (SRMPT) at which the server-side media player plays the media on the server. The SRMPT is defined as an elapsed running time for customized media content that is being played by the server-side media player on the server. If no customized media content is being played by the server-side media player, the SRMPT is defined as zero. For example, the motion picture's SRMPT time might clock in at 6 minutes, 10 seconds, and 10 frames. The SRMPT recorded by the server-side master application 185 represents a real world time value based on the host system clock of the server. Then, the server-side master application 185 creates a server-side message or packet that it transmits to the client-side synchronization application 147.

The server-side customization application 190 is configured to store playable media content to be played by the server-side playback device 175. For example, the server-side customization application 190 stores the playable media content in the server-side data storage 165. Optionally, the server-side customization application 190 performs media processing of the playable media content. For example, the server-side customization application 190 passes the playable media content through a bandpass filter. For example, the server-side customization application 190 parses the playable media content into a chronological sequence that substantially matches the sequence of the motion picture. For example, the server-side customization application 190 writes the playable media content to one or more of the server-side data storage 165 and the server-side memory 180. For example, the server-side customization application 190 writes the playable media content to a media content file located in one or more of the server-side data storage 165 and the server-side memory 180.

The server-side streaming application 195 segments media content for deployment via the network 115 to the client device 120. The server-side streaming application 195 supports multiple alternate data streams, two or more of which can have different bit rates from each other. The server-side streaming application 195 also allows for the client device 120 to switch streams intelligently as network bandwidth changes. The server-side streaming application 195 also provides for media encryption and user authentication over encrypted connections.

Figure 2:
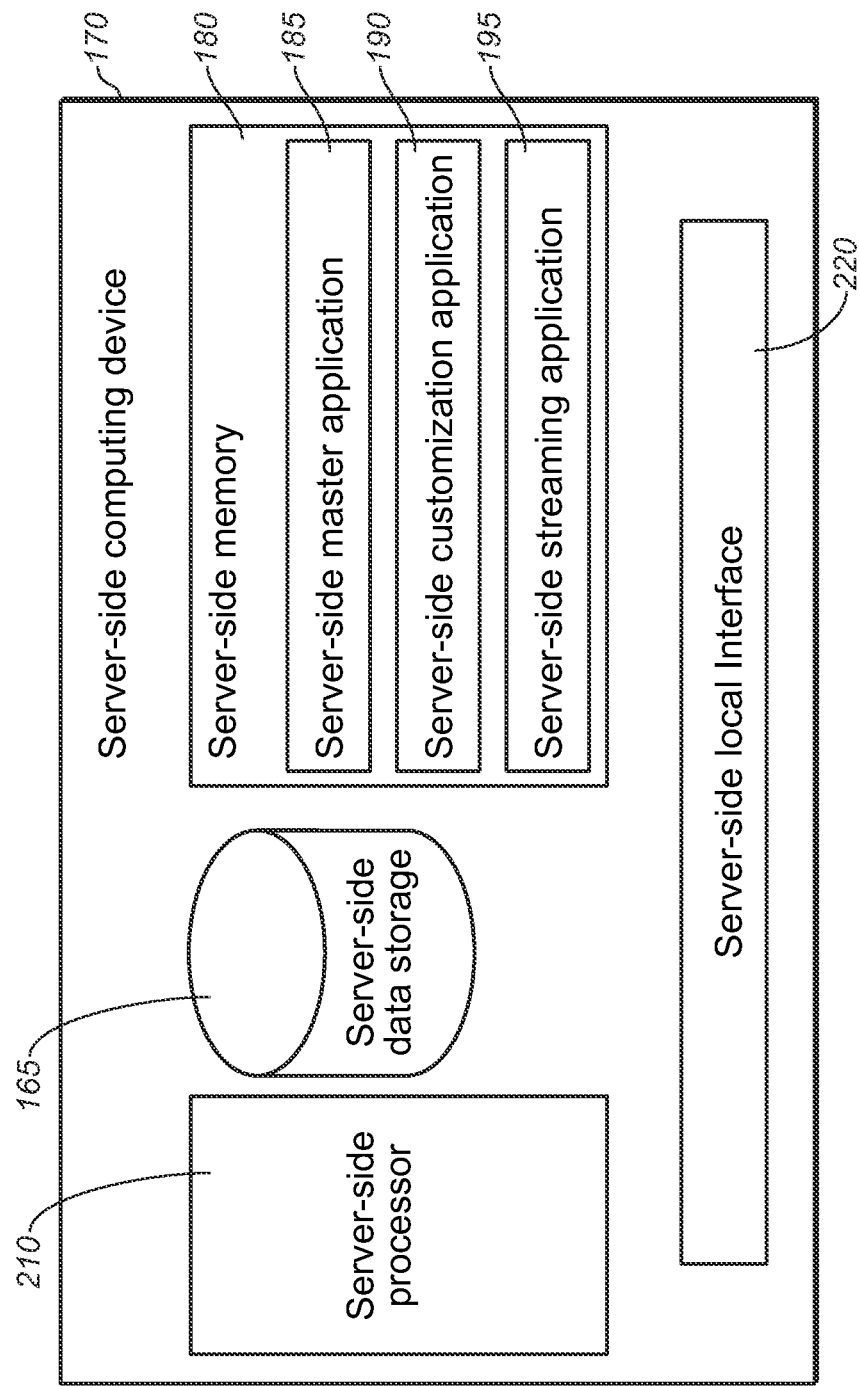
FIG. 2 is a schematic block diagram of the server-side computing device in an alternative configuration of a networked environment for real-time customization and synchronization via one or more electronic devices of media content.

FIG. 2 is a schematic block diagram of the server-side computing device 170 in an alternative configuration of a networked environment for real-time customization and synchronization via one or more electronic devices of media content.

The server-side computing device 170 comprises one or more of the server-side data storage 165, the server-side projector 175, the server-side memory 180, a server-side processor 210, and a server-side local interface 220. The server-side local interface 220 is operationally connected with one or more of the server-side data storage 165, the server-side memory 180, and the server-side processor 210. The server-side memory comprises one or more of the server-side master application 185, the server-side customization application 190, and the server-side streaming application 195. For example, the server-side processor 210 comprises a server-side computer. For example, the server-side local interface 220 comprises a bus. For example, the server-side local interface 220 comprises a bus and further comprises one or more of an accompanying address/control bus or other bus structure.

Software components stored in one or more of the server-side memory 180 and the server-side data storage 165 are executable by the server-side processor 210. In this respect, the term "executable" means a program file that is in a form that can ultimately be run by the server-side processor 210. For example, a compiled program is executable if it may be translated into machine code in a format that can be loaded into a random access portion of the server-side memory 180 and run by the server-side processor 210. For example, source code is executable if it may be expressed in a proper format, such as object code, that may be loaded into a random access portion of the server-side memory 180 and run by the server-side processor 210. For example, source code is executable if it may be interpreted by another executable program to generate instructions in a random access portion of the server-side memory 180 and run by the server-side processor 210. An executable program may be stored in one or more portions or components of the server-side memory 180. For example, the server-side memory 180 comprises one or more of random access memory (RAM), read-only memory (ROM), hard disk drive, solid-state drive, USB flash drive, memory card, floppy disk, optical disc such as compact disc (CD) or digital versatile disc (DVD), magnetic tape, and other memory components may be stored in any portion or component of the server-side memory 180.

One or more of data and components stored in one or more of the server-side memory 180 and the server-side data storage 165 are executable by the server-side processor 210. For example, the server-side processor 210 can execute one or more of the server-side master application 185, the server-side customization application 190, and the server-side streaming application 195.

For example, as an alternative to the setup in FIG. 1 with the server-side data storage 165 separate from the server-side computing device 170, the server-side data storage 165 may be located in the server-side computing device 170. For example, the server-side data storage 165 may be located in the server-side memory 180.

The server-side processor 210 comprises one or more processors. The server-side memory 180 comprises one or more memories. For example, the server-side memory 180 comprises at least one memory configured to operate in a parallel processing circuit. In such a case, the server-side local interface 220 may serve as the network 115. For example, the server-side local interface 220 may facilitate communication between two processors. For example, the server-side local interface 220 may facilitate communication between a processor and a memory. For example, the server-side local interface 220 may facilitate communication between two memories. The server-side local interface 220 may comprise additional systems designed to coordinate this communication. For example, the server-side local interface 220 may comprise a system to perform load balancing. The server-side processor 210 may comprise an electrical processor. Alternatively, or additionally the server-side processor 210 may comprise a non-electrical processor.

Any logic or application described herein, including but not limited to the server-side master application 185, the server-side customization application 190, and the server-side streaming application 195 that comprises software or code can be embodied in any non-transitory computer-readable medium for use by or in connection with an instruction execution system such as, for example, a server-side processor 210 in a computer system or other system. In this sense, the logic may comprise, for example, statements including instructions and declarations that can be fetched from the computer-readable medium and can be executed by the instruction execution system. In the context of the present disclosure, a computer-readable medium can be any medium that can contain, store, or maintain the logic or application described herein for use by or in connection with the instruction execution system. For example, the computer-readable medium may comprise one or more of RAM, ROM, hard disk drive, solid-state drive, USB flash drive, memory card, floppy disk, optical disc such as a CD or a DVD, magnetic tape, and other memory components. For example, the RAM may comprise one or more of SRAM, DRAM), MRAM, and other forms of RAM. For example, the ROM may comprise one or more of PROM, EPROM, EEPROM, and other forms of ROM.

Figure 3:
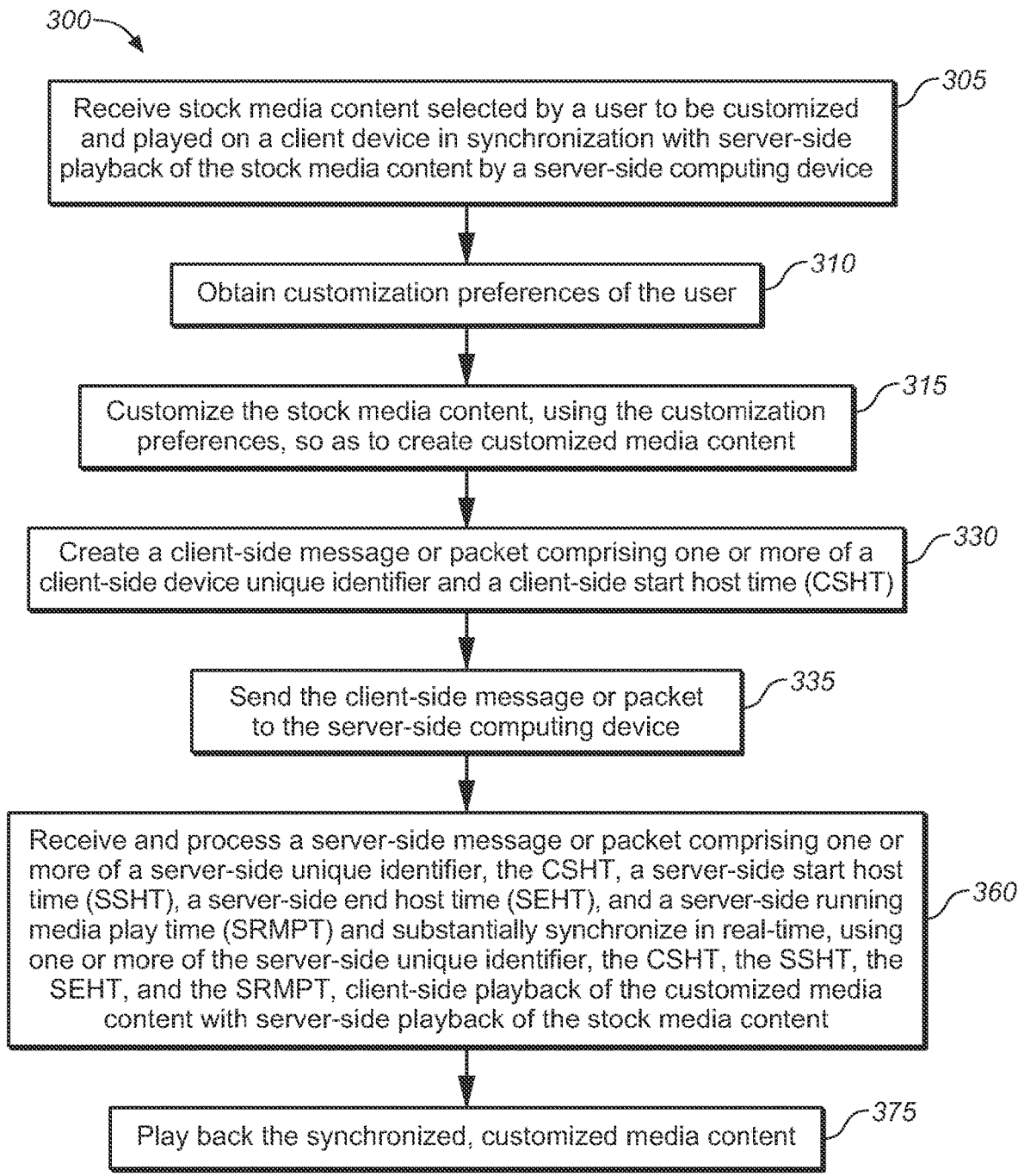
FIG. 3 is a flowchart of a method for real-time customization and synchronization of stock media content.

FIG. 3 is a flowchart of a method 300 for real-time customization and synchronization of stock media content. FIG. 3 applies to the baseline method viewed from the client side.

The order of the steps in the method 300 is not constrained to that shown in FIG. 3 or described in the following discussion. Several of the steps could occur in a different order without affecting the final result.

According to this method, to which we shall refer in shorthand as the baseline method, the client constructs the customized media content. According to this baseline method, the client performs the synchronization of the client-side playback with the server-side playback.

In block 305, a client-side customization application receives a user's selection of stock media content to be customized and played on a client-side playback device in synchronization with server-side playback of the stock media content by a server-side master application. The client-side customization application stores the user's stock media selection in one or more of client-side data storage and client-side memory. Block 305 then transfers control to block 310.

Next, in block 310, the client-side customization application obtains a user's customization preferences. A user's customization preferences can be chosen by the user and then received by the client-side customization application from the user. Alternatively, or additionally, the user's customization preferences can be generated by the client-side customization application using user characteristics comprised in one or more of memory and data storage. For example, a user may wish for his name or the name of his spouse or his favorite musician to replace a main character's name throughout a motion picture. For example, a user may like the Scottish accent so one of the main character's lines may be dubbed so as to be spoken with a Scottish accent. Alternatively, or additionally, the client-side customization application uses the user's characteristics to generate the customization preferences. For example, if the name of a user's spouse is known, that name replaces a main character's name throughout a motion picture without the user specifically requesting this exact customization. For example, if a user is known to like soul music, a well-known soul music song may be substituted into the movie at a point where a classical piece is normally played. Block 310 then transfers control to block 315.

Next, in block 315, the client-side customization application, using the customization preferences, customizes the stock media content, so as to create customized media content. For example, the client-side customization application customizes the stock media content using a pre-defined data structure. For example, the pre-defined data structure structures the data in chronological order. For example, the pre-defined data structure structures the data according to a structure that does not comprise chronological order.

For example, the pre-defined data structure structures the user's selected stock media content in chronological order, and structures the stock media content not selected by the user in separate chronological order. For example, the pre-defined data structure structures the user's selected stock media content in chronological order, first a title sequence, second an opening act of a motion picture, third a middle act of a motion picture, fourth a closing act of a motion picture, and fifth credits of a motion picture. For example, the chronological order is based on the time the stock media content was created by the media creators such as film directors or musicians. For example, the chronological order is based on the time the stock media content was saved. For example, the chronological order is based on the time at which the stock media content had maximum popularity. For example, the chronological order is based on another user-selected time.

Figure 9:
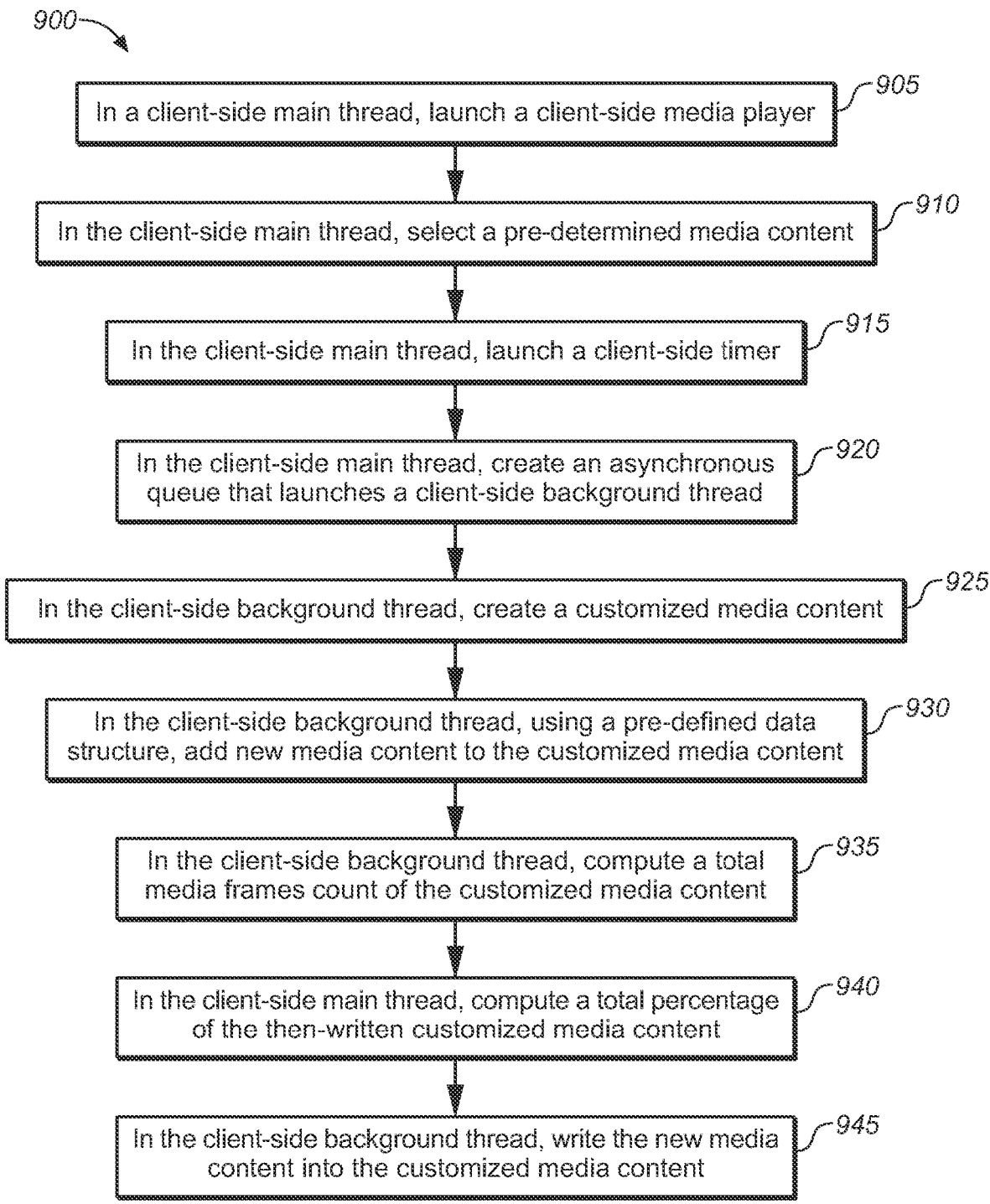
FIG. 9 is a flowchart of a more detailed method by which the client-side customization application, using a pre-defined data structure, using a client-side main thread and a client-side background thread, constructs a media content file comprising one or more of a user's selected media content and media content that was not selected by the user.
Figure 10:
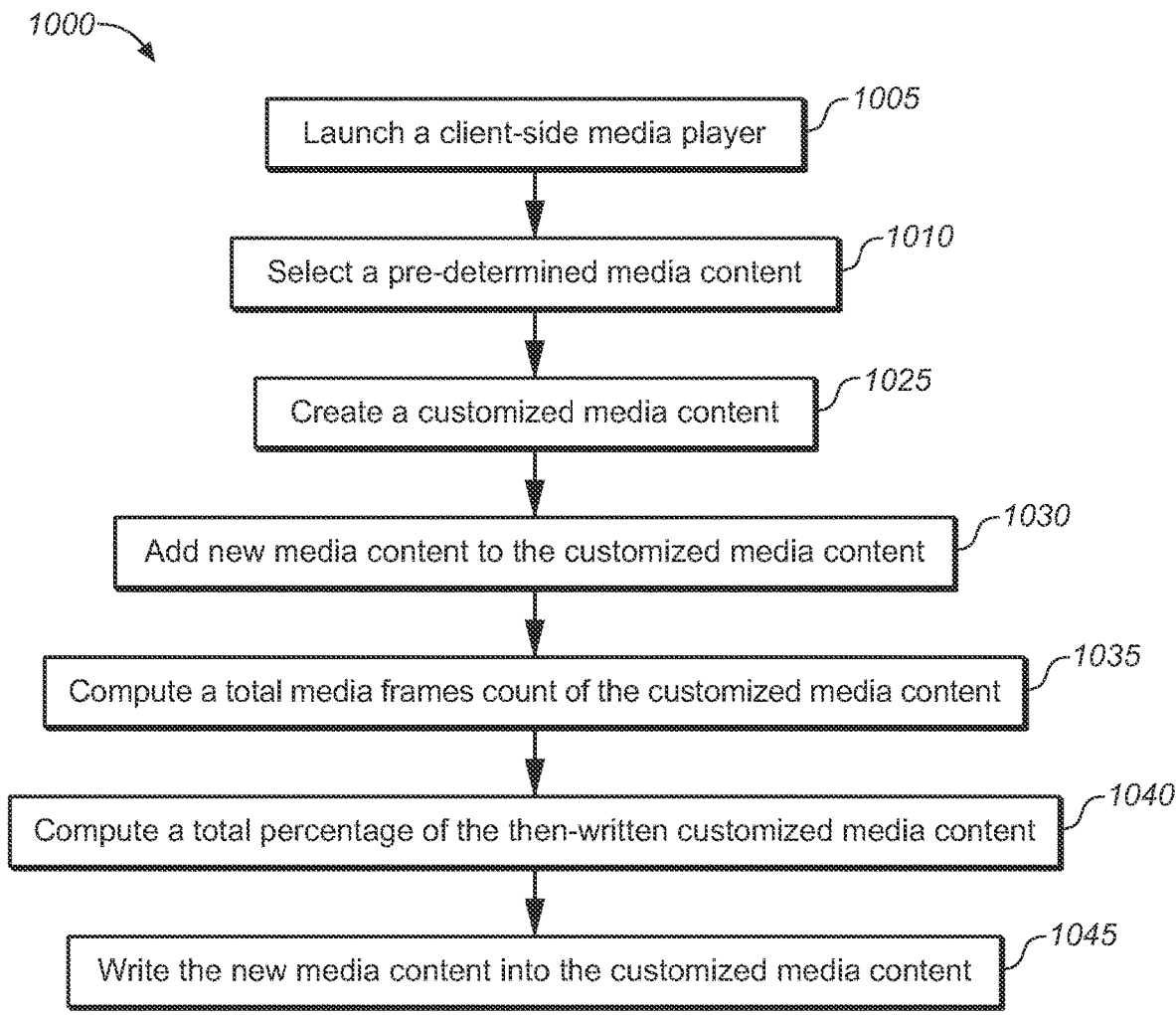
FIG. 10 is a flowchart of a method by which the client-side customization application, using a pre-defined data structure, constructs a media content file comprising one or more of a user's selected media content and media content that was not selected by the user.

Further details of how to perform step 315 are given in FIGS. 9 and 10. Block 315 then transfers control to block 330.

Next, in block 330, the client-side synchronization application creates a client-side message or packet. The client-side message or packet comprises one or more of a client-side unique identifier and a client-side start host time (CSHT). The client-side unique identifier comprises a copy of the client-side customization application unique identifier. The client device unique identifier uniquely identifies the client device. The CSHT is defined as a host time at which transmission of a server-side message or packet is requested on the client side. For example, the CSHT may comprise the time at which client-side playback starts. For example, the client device comprises one or more of a tablet, a notebook computer, a laptop computer, a cellular phone, and another client computing device. For example, the client-side unique identifier comprises an alphanumeric string.

For example, the client-side customization application communicates over a network so as to obtain server-side timing information from the server-side master application. For example, to communicate with the server-side master application, the client-side synchronization application browses the network. The client-side synchronization application then resolves the master application. The client-side synchronization application then connects via the network to the master application. Further, one or more of a server-side clock and an external clock may be used to synchronize the server-side master application with the client-side customization application. Block 330 then transfers control to block 335.

Next, in block 335, the client-side customization application sends the client-side message or packet to the server-side master application. Optionally, to facilitate error detection, a client-side transmitted error code can be added to messages or packets sent from the client-side to the server-side. To facilitate verification of data authenticity, the client-side customization application saves the client-side message or packet to one or more of client-side memory and client-side data storage. Block 335 then transfers control to block 340.

Next, in block 340, the client-side synchronization application waits for a pre-determined time period for a valid response from the server-side master application. If a valid response is received within the pre-determined time period, the process continues to step 345. If the client-side customization application does not receive a valid response from the server-side master application within a pre-determined time period, the request times out, and the process loops back to step 330.

Next, in block 345, the server-side master application receives and processes the client-side message or packet. Further details of how to perform step 345 are given in FIG. 13. Block 345 then transfers control to block 350.

Next, in block 350, using the synchronized clocks, the server-side master application creates a server-side message or packet. For example, the server-side message or packet comprises one or more of a server-side unique identifier, the CSHT, a server-side start host time (SSHT), a server-side end host time (SEHT), and a server-side running media play time (SRMPT). The SSHT is defined as a host time at which transmission of a client-side message or packet is requested on the server side. For example, the SSHT may comprise the time at which server-side playback starts. The SEHT is defined as a host time at which transmission of a client-side message or packet ends on the server side. For example, the SEHT may comprise the time at which server-side playback stops. Block 350 then transfers control to block 355.

Next, in block 355, the server-side master application transmits the server-side message or packet to the client-side synchronization application. Optionally, to facilitate error detection, the server-side master application adds a server-side transmitted error code to one or more server-side messages or packets it sends to the client-side synchronization application. Block 355 then transfers control to block 360.

Next, in block 360, the client-side synchronization application receives and processes the server-side message or packet and substantially synchronizes one or more clocks in the client-side synchronization application with one or more clocks in the server-side master application. Further details of how to perform step 360 are given in FIG. 14. Optionally, an additional step may be inserted here of relaying to the user, by the client device, one or more offers to purchase customized goods prepared by the server-side computing device using the user's customization preferences.

Block 360 then transfers control to block 375.

Next, in block 375, the client-side synchronization application begins playback of the customized media content in synchronization with playback of the stock media content by a server-side playback device. Block 375 then terminates the process.

Figure 4:
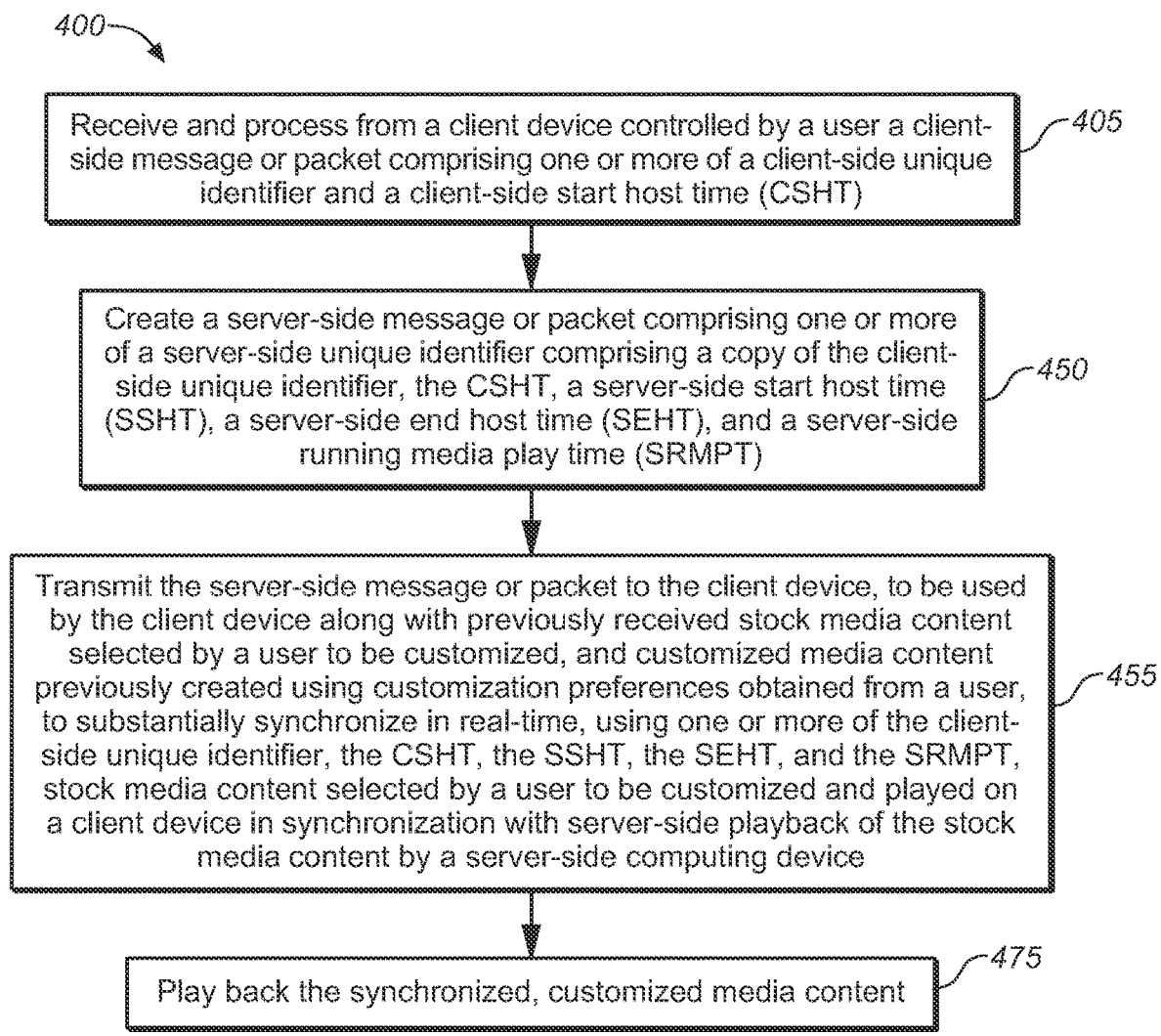
FIG. 4 is a flowchart of a method for real-time customization and synchronization of stock media content.

FIG. 4 is a flowchart of a method 400 for real-time customization and synchronization of stock media content. FIG. 4 applies to the baseline method viewed from the server side.

The order of the steps in the method 400 is not constrained to that shown in FIG. 4 or described in the following discussion. Several of the steps could occur in a different order without affecting the final result.

In block 405, a server-side master application receives and processes from a client device controlled by a user a client-side message or packet comprising one or more of a client-side unique identifier and a client-side start host time (CSHT). Block 405 then transfers control to block 450.

Next, in block 450, the server-side master application creates a server-side message or packet. For example, the server-side message or packet comprises one or more of a server-side unique identifier, the CSHT, a server-side start host time (SSHT), a server-side end host time (SEHT), and a server-side running media play time (SRMPT). The server-side unique identifier comprises a copy of the client-side unique identifier. Block 450 then transfers control to block 455.

Next, in block 455, the server-side master application transmits the server-side message or packet to the client-side synchronization application, to be used by the client-side customization application along with previously received stock media content selected by a user to be customized, and customized media content previously created using customization preferences obtained from a user, to substantially synchronize in real-time, using the CSHT, client-side playback of the customized media content with server-side playback of the stock media content. Block 455 then transfers control to block 475.

Next, in block 475, the server-side master application begins playback of the stock media content in synchronization with playback of the customized media content by a client-side playback device. Block 475 then terminates the process.

Figure 5:
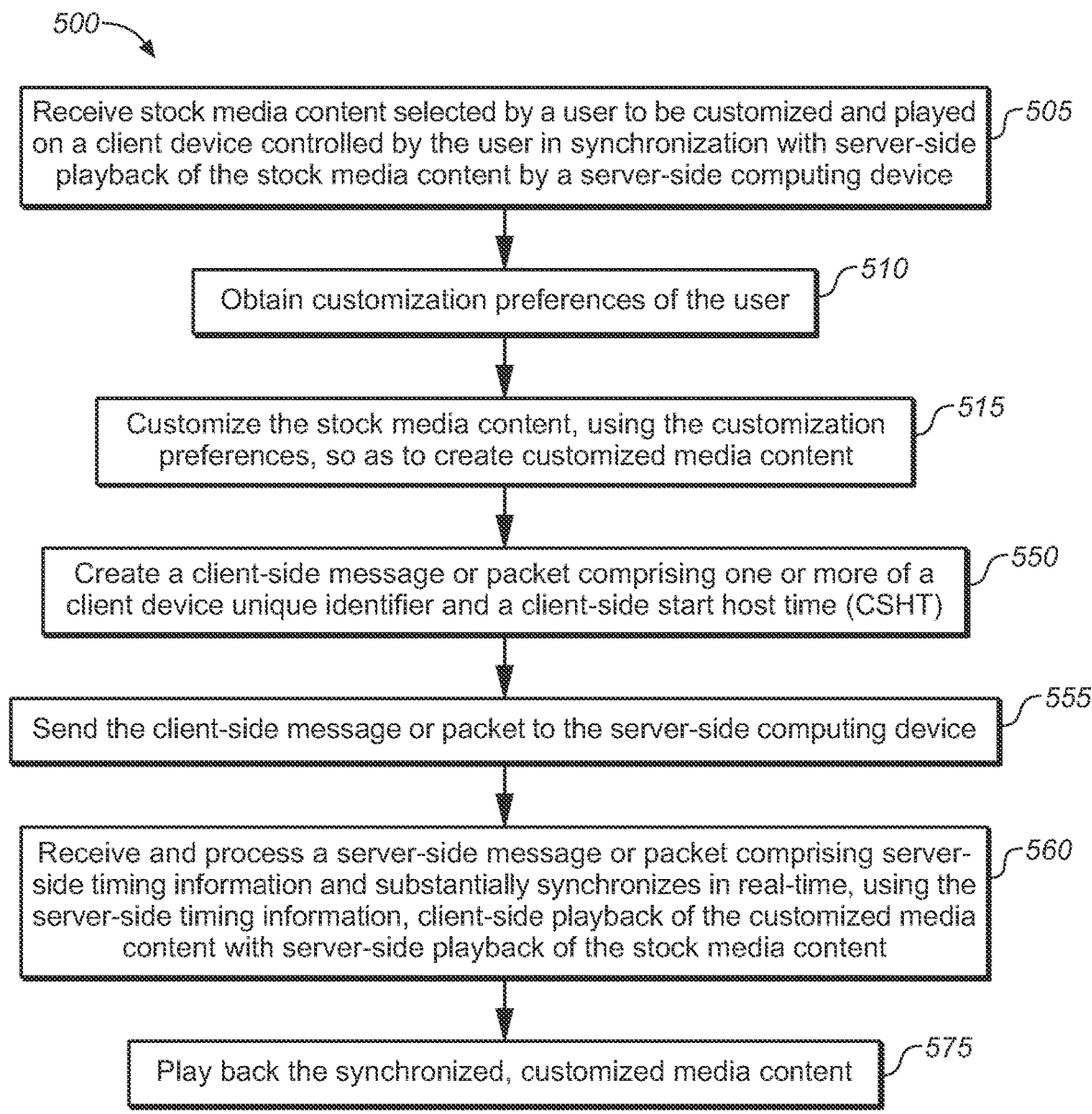
FIG. 5 is a flowchart of a method for real-time customization and synchronization of stock media content.

FIG. 5 is a flowchart of a method 500 for real-time customization and synchronization of stock media content. FIG. 5 applies to the download and streaming method viewed from the client side.

The order of the steps in the method 500 is not constrained to that shown in FIG. 5 or described in the following discussion. Several of the steps could occur in a different order without affecting the final result.

According to this method, which covers the first and second alternative methods, the download and streaming methods, the server constructs the customized media content. The client performs the synchronization of the client-side playback with the server-side playback.

According to the download method, the client-side customization application sends the user's selection of media content to the server-side customization application. The server-side customization application then constructs the customized media content file and then sends the media content file to the client-side synchronization application for playback. According to the download method, the client-side synchronization application performs the synchronization of the client-side playback with the server-side playback. Optionally, the media content file can be chunked so that it can be downloaded in sections.

According to the streaming method, the client-side customization application streams the user's selection of stock media content to the server-side customization application. The server-side customization application then constructs the customized media content file and then sends the media content file to the client-side synchronization application for playback. According to the streaming method, the client-side synchronization application performs the synchronization of the client-side playback with the server-side playback. Optionally, the media content file can be chunked so that it can be streamed in sections.

In block 505, a client-side customization application receives a user's selection of stock media content to be customized and played by a client-side playback device in synchronization with server-side playback of the stock media content by a server-side playback device. Block 505 then transfers control to block 510.

Next, in block 510, the client-side customization application obtains a user's customization preferences. A user's customization preferences can be chosen by the user. Alternatively, or additionally, the user's customization preferences can be generated using user characteristics comprised in one or more of memory and data storage. For example, a user may wish for his name or the name of his spouse or his favorite musician to replace a main character's name throughout a motion picture. For example, a user may like the Scottish accent so one of the main character's lines may be dubbed so as to be spoken with a Scottish accent. Alternatively, or additionally, the client-side customization application uses the user's characteristics to generate the customization preferences. For example, if the name of a user's spouse is known, that name replaces a main character's name throughout a motion picture without the user specifically requesting this exact customization. For example, if a user is known to like soul music, a well-known soul music song may be substituted into the movie at a point where a classical piece is normally played. Block 510 then transfers control to block 512.

Next, in block 512, the client-side synchronization application sends to the server-side customization application a client-side message comprising one or more of the user's customization preferences and the user's selection of stock media content, for the server-side customization application to use to construct the media content file, creating customized media content.

For example, to communicate with the server-side master application, the client-side synchronization application browses the network. The client-side synchronization application then resolves the master application. The client-side synchronization application then connects via the network to the master application. Block 512 then transfers control to block 523.

Next, in block 523, the client-side synchronization application receives the customized media content in real-time from the server-side streaming application. For the download alternative, the client-side synchronization application receives the customized media by download from the server-side synchronization application and stores the customized media content in the client-side data storage 135 or in a client-side buffer. Alternatively, for the streaming alternative, the client-side synchronization application receives by streaming and temporarily stores segments of the customized media content in the client-side data storage 135 or in the client-side buffer. Block 523 then transfers control to block 530.

Next, in block 530, the client-side synchronization application creates a client-side message or packet. The client-side message or packet comprises one or more of a client-side unique identifier and a client-side start host time (CSHT). Block 530 then transfers control to block 535.

Next, in block 535, the client-side customization application sends the client-side message or packet to the server-side master application. Optionally, to facilitate error detection, a client-side transmitted error code can be added to messages or packets sent from the client-side to the server-side. To facilitate verification of data authenticity, the client-side customization application saves the client-side message or packet to one or more of client-side memory and client-side data storage. Block 535 then transfers control to block 540.

Next, in block 540, the client-side synchronization application waits for a pre-determined time period for a valid response from the server-side master application. If a valid response is received within the pre-determined time period, the process continues to step 555. If the client-side customization application does not receive a valid response from the server-side master application within a pre-determined time period, the request times out, and the process loops back to step 530.

Next, in block 555, the client-side synchronization application receives from the server-side master application a server-side message or packet comprising one or more of a server-side unique identifier, the CSHT, a server-side start host time (SSHT), a server-side end host time (SEHT), and a server-side running media play time (SRMPT). For example, the SSHT may comprise the time at which server-side playback starts. Optionally, to facilitate error detection, the server-side master application adds a server-side transmitted error code to one or more server-side messages or packets it sends to the client-side synchronization application. Block 555 then transfers control to block 560.

Next, in block 560, the client-side synchronization application receives and processes the server-side message or packet and synchronizes one or more clocks in the client-side synchronization application with one or more clocks in the server-side master application. Alternatively, or additionally for the streaming alternative, the client-side synchronization application loads into the client-side player the customized media content playlist. Further details of how to perform step 560 are given in FIG. 13. Block 560 then transfers control to block 565.

Next, in block 565, the client-side synchronization application receives a play command from the server-side master application. Block 565 then transfers control to block 575.

Next, in block 575, the client-side synchronization application processes the command to begin playback and begins playback. For example, using the synchronized clocks, the client-side synchronization application plays the customized media content in synchronization with a client-side playback device. Block 575 then transfers control to block 580.

Finally, in block 580, the client-side synchronization application disconnects from the server-side master application. For example, the client-side synchronization application disconnects via the network from the server-side master application. Block 580 then terminates the process.

Figure 6:
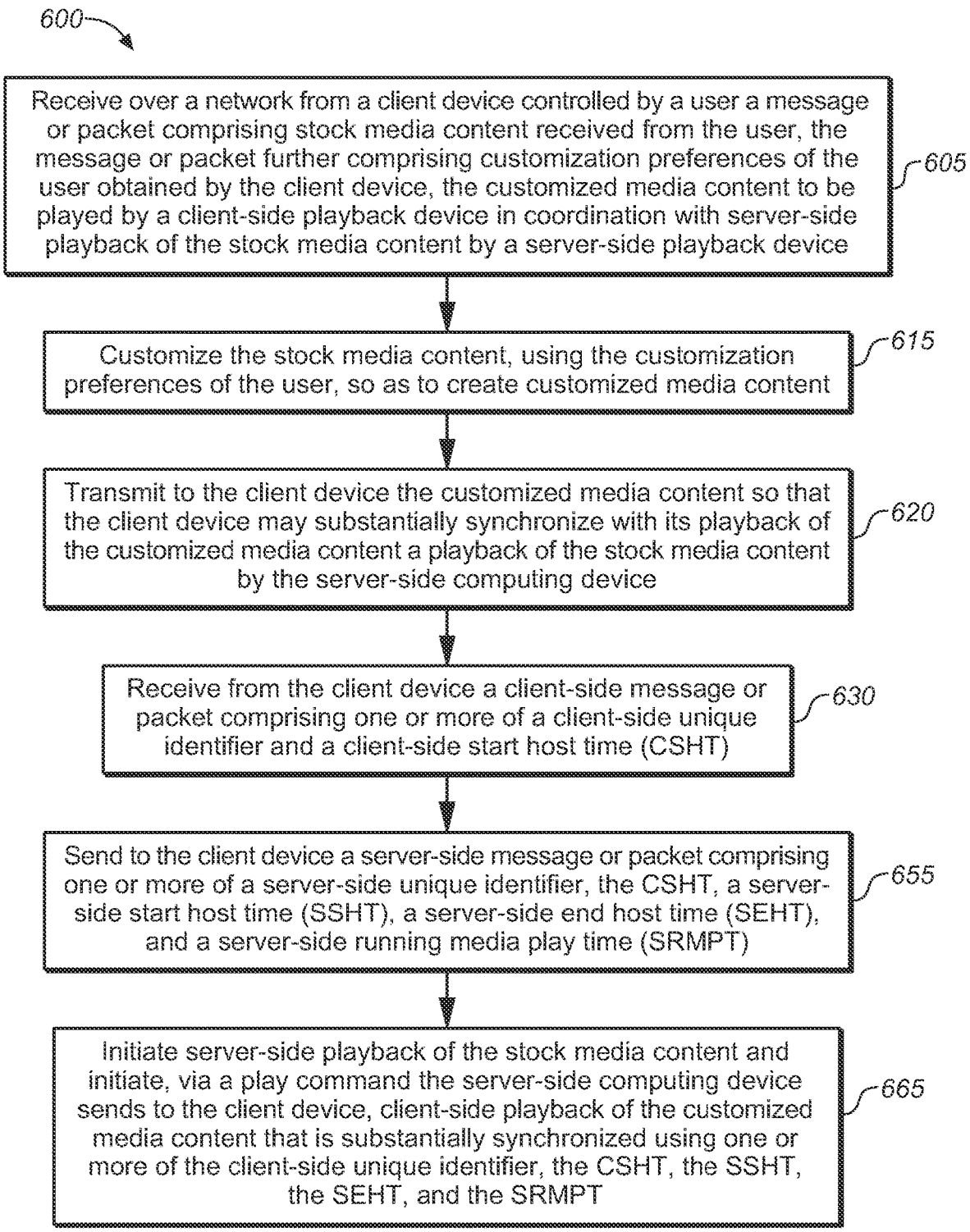
FIG. 6 is a flowchart of a method for real-time customization and synchronization of stock media content.

FIG. 6 is a flowchart of a method 600 for real-time customization and synchronization of stock media content. FIG. 6 applies to the download and streaming method viewed from the server side.

The order of the steps in the method 600 is not constrained to that shown in FIG. 6 or described in the following discussion. Several of the steps could occur in a different order without affecting the final result.

According to this method, which covers the first and second alternative methods, the download and streaming methods, the server constructs the customized media content. The client performs the synchronization of the client-side playback with the server-side playback.

In block 605, a server-side master application receives over a network from a client-side customization application a client-side message or packet comprising stock media content received from a user, the client-side message or packet further comprising customization preferences of the user obtained by the client-side customization application, the customized media content to be played by a client-side playback device in coordination with server-side playback of the stock media content by a server-side playback device.

A user's customization preferences can be chosen by the user. Alternatively, or additionally, the user's customization preferences can be generated using user characteristics comprised in one or more of memory and data storage. Block 605 then transfers control to block 615.

Next, in block 615, the server-side master application, using the customization preferences of the user, customizes the stock media content, so as to create customized media content. For example, the server-side master application customizes the stock media content using a pre-defined data structure. For example, the pre-defined data structure structures the data in chronological order. For example, the pre-defined data structure structures the data according to a structure that does not comprise chronological order. Further details of how to perform step 615 are given in FIG. 12. Block 615 then transfers control to block 620.

Next, in block 620, the server-side master application transmits the customized media content to the client-side synchronization application.

For example, to communicate with the client-side synchronization application, the server-side master application browses the network. The server-side master application then resolves the client-side synchronization application. The server-side master application then connects via the network to the client-side synchronization application.

For the download alternative, the server-side synchronization application downloads the customized media content to the client-side synchronization application. Alternatively, for the streaming alternative, the server-side synchronization application streams segments of the customized media content to the client-side synchronization application. Block 620 then transfers control to block 630.

Next, in block 630, the server-side master application receives from the client-side synchronization application a client-side message or packet. The client-side message or packet comprising one or more of a client-side unique identifier and a client-side start host time (CSHT). Block 630 then transfers control to block 655.

Next, in block 655, the server-side master application sends to the client-side synchronization application a server-side message or packet comprising one or more of a server-side unique identifier, the CSHT, a server-side start host time (SSHT), a server-side end host time (SEHT), and a server-side running media play time (SRMPT). For example, the SSHT may comprise the time at which server-side playback starts. Block 655 then transfers control to block 665.

Next, in block 665, the server-side master application initiates playback by a server-side playback device of the stock media content, and the server-side master application also initiates a playback of the customized media content via a play command it sends to the client-side synchronization application and begins playback of the stock media content that is substantially synchronized using live streaming. For example, using the live streaming, the server-side playback device plays the customized media content in synchronization with the playback of the stock media content by a client-side playback device.

Optionally, an additional step may be inserted here of preparing, by the server-side computing device, one or more offers to the user to purchase customized goods to be created by the server-side computing device using the user's customization preferences. Optionally, if the preparing step is inserted, a second additional step may be inserted after the step of preparing of processing an offer accepted by the user to purchase the customized goods prepared by the server-side computing device using the user's customization preferences; and creating, by the server-side computing device, the purchased customized goods. For example, the customized goods comprise one or more of customized physical goods, customized services, and customized media content. For example, the customized goods comprise one or more of a user-specified name, a user-specified message, and another form of customization specified by the user.

Block 665 then terminates the process.

Figure 7:
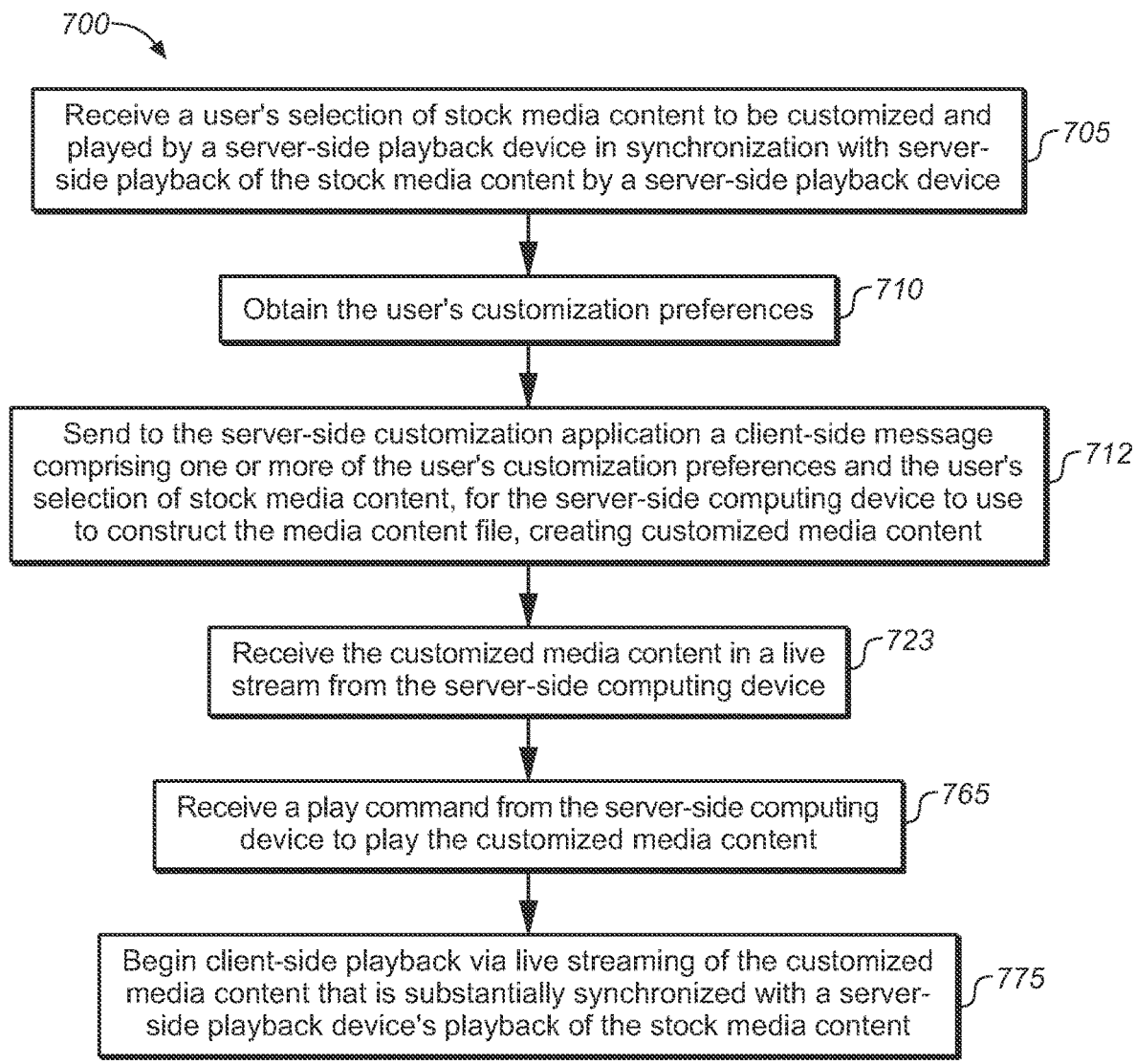
FIG. 7 is a flowchart of a method for real-time customization and synchronization of stock media content.

FIG. 7 is a flowchart of a method 700 for real-time customization and synchronization of stock media content. FIG. 7 applies to the live method viewed from the client side.

The order of the steps in the method 700 is not constrained to that shown in FIG. 7 or described in the following discussion. Several of the steps could occur in a different order without affecting the final result.

According to this method, which covers the third alternative method, the live method, the client-side customization application sends the user's selection of the media content to the server-side customization application. The server-side customization application then constructs the customized media content and then streams the media content file for direct playback using a substantially immediate streaming technology. For example, the streaming technology comprises user datagram protocol (UDP). According to the live method, there is no need for synchronization of the client-side playback and the server-side playback, because the playback is substantially immediate.

In block 705, a client-side customization application receives a user's selection of stock media content to be customized and played by a server-side playback device in synchronization with server-side playback of the stock media content by a server-side playback device. Block 705 then transfers control to block 710.

Next, in block 710, the client-side customization application obtains the user's customization preferences. A user's customization preferences can be chosen by the user. Alternatively, or additionally, the user's customization preferences can be generated using user characteristics comprised in one or more of memory and data storage. Block 710 then transfers control to block 712.

Next, in block 712, the client-side synchronization application sends to the server-side customization application a client-side message comprising one or more of the user's customization preferences and the user's selection of stock media content, for the server-side customization application to use to construct the media content file, creating customized media content.

For example, to communicate with the server-side master application, the client-side synchronization application browses the network. The client-side synchronization application then resolves the master application. The client-side synchronization application then connects via the network to the master application. Block 712 then transfers control to block 723.

Next, in block 723, the client-side synchronization application receives the customized media content in a live stream from the server-side streaming application. Block 723 then transfers control to block 765.

Next, in block 765, the client-side synchronization application receives a play command from the server-side master application to play the customized media content. Block 765 then transfers control to block 775.

Next, in block 775, the client-side synchronization application processes the command to begin playback of the customized media content and a client-side playback device begins a playback via live streaming of the customized media content that is substantially synchronized with a server-side playback device's playback of the stock media content. Block 775 then terminates the process.

Figure 8:
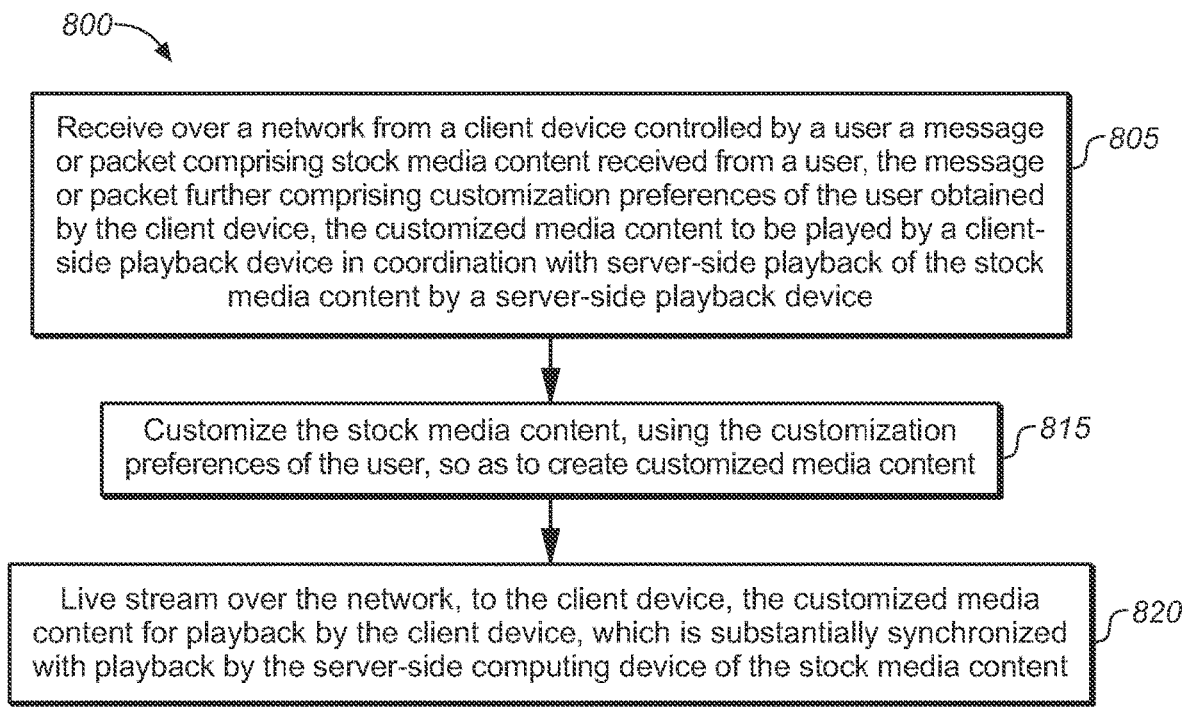
FIG. 8 is a flowchart of a method for real-time customization and synchronization of stock media content.

FIG. 8 is a flowchart of a method 800 for real-time customization and synchronization of stock media content. FIG. 8 applies to the live method viewed from the server side.

The order of the steps in the method 800 is not constrained to that shown in FIG. 8 or described in the following discussion. Several of the steps could occur in a different order without affecting the final result.

In block 805, a server-side master application receives over a network from a client-side customization application a client-side message or packet comprising stock media content received from a user, the client-side message or packet further comprising customization preferences of the user obtained by the client-side customization application, the customized media content to be played by a client-side playback device in coordination with server-side playback of the stock media content by a server-side playback device.

A user's customization preferences can be chosen by the user. Alternatively, or additionally, the user's customization preferences can be generated using user characteristics comprised in one or more of memory and data storage. Block 805 then transfers control to block 815.

Next, in block 815, the server-side master application, using the customization preferences of the user, customizes the stock media content, so as to create customized media content. For example, the server-side master application customizes the stock media content using a pre-defined data structure. For example, the pre-defined data structure structures the data in chronological order. For example, the pre-defined data structure structures the data according to a structure that does not comprise chronological order. Further details of how to perform step 815 are given in FIG. 12. Block 815 then transfers control to block 820.

Next, in block 820, the server-side master application live streams the customized media content to the client-side synchronization application. For example, the server-side master application live streams the customized media content using user datagram protocol (UDP).

For example, to communicate with the client-side synchronization application, the server-side master application browses the network. The server-side master application then resolves the client-side synchronization application. The server-side master application then connects via the network to the client-side synchronization application. Block 820 then transfers control to block 830.

Next, in block 830, the server-side master application sends a play command to the client-side synchronization application. Block 830 then transfers control to block 855.

Next, in block 855, the server-side master application sends to the client-side synchronization application a play command to play the customized media content. Block 855 then transfers control to block 875.

Next, in block 875, the server-side master application initiates playback by a server-side playback device of the stock media content, and the server-side master application also initiates via a play command it sends to the client-side synchronization application a substantially synchronized playback via live streaming of the customized media content. Block 875 then terminates the process.

FIG. 9 is a flowchart of a more detailed method 900 by which the client-side customization application, using a pre-defined data structure, using a client-side main thread and a client-side background thread, constructs a media content file comprising one or more of a user's selected media content and media content that was not selected by the user. FIGS. 9 and 10 provide more detail regarding sub-steps of step 315 in FIG. 3 for the baseline method.

The order of the steps in the method 1000 is not constrained to that shown in FIG. 10 or described in the following discussion. Several of the steps could occur in a different order without affecting the final result.

FIGS. 9 and 10 provide the steps of the baseline method, according to which the client constructs the customized media content. According to the baseline method, the client performs the synchronization of the client-side playback with the server-side playback.

In block 905, in a client-side main thread, a client-side customization application launches a client-side media player. For example, the client-side main thread handles one or more actions relating to a graphical user interface (GUI). Block 905 then transfers control to block 910.

Next, in block 910, the client-side customization application, in the client-side main thread, selects a pre-determined media content. For example, the pre-determined media content comprises one or more of dialog, music, sound cues, scenes, partial scenes, visual cues, and other media content. The client-side media player then plays the pre-determined media content. Block 910 then transfers control to block 915.

Next, in block 915, the client-side customization application, in the client-side main thread, launches a client-side timer. The client-side timer periodically requests from the server-side timer a total percentage of the then-written customized media content. For example, the total percentage output is displayed to the user using a progress bar. Block 915 then transfers control to block 920.

Next, in block 920, the client-side customization application, in the client-side main thread, creates an asynchronous queue that launches a client-side background thread. The client-side background thread runs simultaneously with the client-side main thread. For example, the client-side background thread handles actions not handled by the client-side main thread. For example, the client-side background thread does not handle one or more GUI-related actions. Block 920 then transfers control to block 925.

Next, in block 925, the client-side customization application, in the client-side background thread, creates a customized media content that contains data types. For example, the customized media content may be created from a file in one or more of client-side data storage and client-side memory. For example, data types may comprise one or more of audio sample rates, bits per channel and other data types. Block 925 then transfers control to block 930.

Next, in block 930, the client-side customization application, in the client-side background thread, using a pre-defined data structure, adds new media content to the customized media content. For example, the client-side customization application uses the pre-defined data structure to sequence the new media content in the customized media content. The new media content comprises one or more of user-selected new media content and non-user-selected new media content. For example, the new media content comprises one or more of dialog, music, sound cues, scenes, partial scenes, visual cues, and other media content. Block 930 then transfers control to block 935.

Next, in block 935, the client-side customization application, in the client-side background thread, computes a total media frames count of the customized media content. For example, the total media frames count equals the stored media frames count plus a media frames count of the new media content. Block 935 then transfers control to block 940.

Next, in block 940, the client-side timer, in the client-side main thread, computes a total percentage of the then-written customized media content. For example, the total percentage of the customized media content is equal to the media frames count subtotal, divided by the total media frames count. Block 940 then transfers control to block 945.

Next, in block 945, the client-side customization application, in the client-side background thread, writes the new media content into the customized media content. It is queried whether the new media content comprises a final element in the pre-defined data structure. If yes, the client-side customization application, in the client-side background thread instructs the client-side main thread to terminate operation of the client-side timer, and terminates the process. If no, the process loops back to block 930.

Next, in block 950, the client-side customization application, in the client-side background thread, when the processing of the customized media content is substantially complete, instructs the client-side main thread to terminate operation of the timer, and terminates the process.

Alternatively, or additionally, the loop between blocks 930 and 945 may be replaced with a concurrent queue operation for parallel processing, which reads the media content in parallel, and then concatenates the media content into a buffer.

FIG. 10 is a flowchart of a method 1000 by which the client-side customization application, using a pre-defined data structure, constructs a media content file comprising one or more of a user's selected media content and media content that was not selected by the user. FIG. 10 provides more detail regarding sub-steps of step 315 in FIG. 3 for the baseline method.

The order of the steps in the method 1000 is not constrained to that shown in FIG. 10 or described in the following discussion. Several of the steps could occur in a different order without affecting the final result.

FIG. 10 provides the steps of the baseline method 1000, according to which the client constructs the customized media content. According to the baseline method 1000, the client performs the synchronization of the client-side playback with the server-side playback.

In block 1005, a client-side customization application launches a client-side media player. Block 1005 then transfers control to block 1010.

Next, in block 1010, the client-side customization application selects a pre-determined media content. The client-side media player then plays the pre-determined media content. Block 1010 then transfers control to block 1025.

Next, in block 1025, the client-side customization application creates a customized media content. Block 1025 then transfers control to block 1030.

Next, in block 1030, the client-side customization application adds new media content to the customized media content. Block 1030 then transfers control to block 1035.

Next, in block 1035, the client-side customization application computes a total media frames count of the customized media content. Block 1035 then transfers control to block 1040.

Next, in block 1040, a client-side timer computes a total percentage of the then-written customized media content. Block 1040 then transfers control to block 1045.

Next, in block 1045, the client-side customization application writes the new media content into the customized media content. It is queried whether the new media content comprises a final element in the pre-defined data structure. If yes, the client-side customization application, in the client-side background thread instructs the client-side main thread to terminate operation of the client-side timer, and terminates the process. If no, the process loops back to block 1030.

Alternatively, or additionally, the loop between blocks 1030 and 1045 may be replaced with a concurrent queue operation for parallel processing, which reads the media content in parallel, and then concatenates the media content into a buffer.

Figure 11:
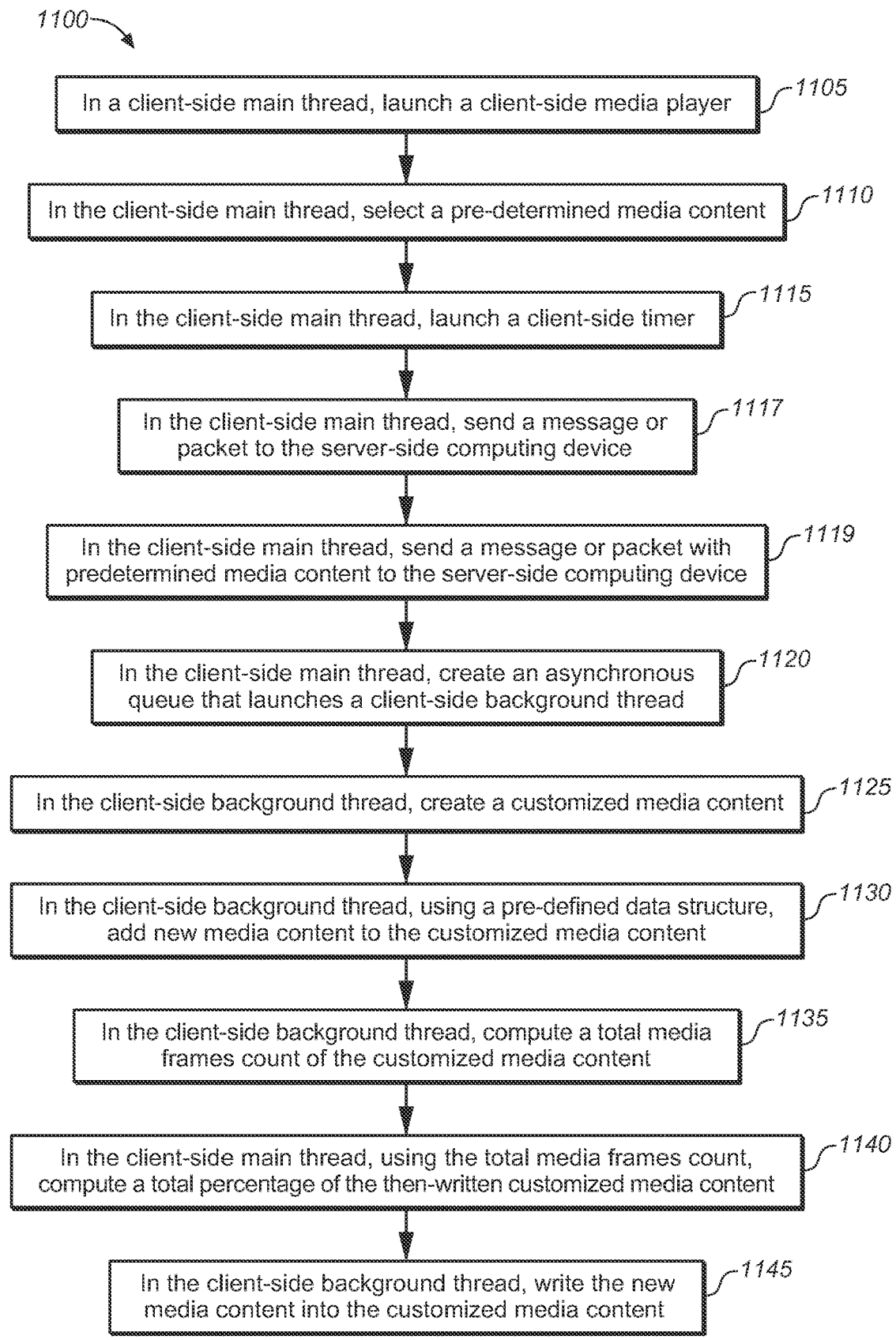
FIG. 11 is a flowchart of a more detailed method for customizing stock media content, so as to create customized media content, providing more detail from an overall view regarding sub-steps of step 615 in FIG. 6 for the download and streaming methods, and providing more detail regarding sub-steps of step 815 in FIG. 8 for the live method.

FIG. 11 is a flowchart of a more detailed method 1100 for customizing stock media content, so as to create customized media content, providing more detail from an overall view regarding sub-steps of step 615 in FIG. 6 for the download and streaming methods, and providing more detail regarding sub-steps of step 815 in FIG. 8 for the live method.

The order of the steps in the method 1100 is not constrained to that shown in FIG. 11 or described in the following discussion. Several of the steps could occur in a different order without affecting the final result.

Turning now to the method 1100 for the download, streaming, and live methods, in block 1105, in a client-side main thread, a client-side customization application launches a client-side media player. For example, the client-side main thread handles one or more actions relating to a graphical user interface (GUI). Block 1105 then transfers control to block 1110.

Next, in block 1110, the client-side customization application, in the client-side main thread, selects a pre-determined media content. For example, the pre-determined media content comprises one or more of dialog, music, sound cues, scenes, partial scenes, visual cues, and other media content. The media player then plays the pre-determined media content. Block 1110 then transfers control to block 1115.

Next, in block 1115, the client-side customization application, in the client-side main thread, launches a client-side timer. The client-side timer periodically requests from the server-side timer a total percentage of the then-written customized media content. For example, the total percentage output is displayed to the user using a progress bar. Block 1115 then transfers control to block 1117.

Next, in block 1117, the client-side customization application, in the client-side main thread, sends a client-side message or packet to the server-side customization application. For example, the client-side message or packet comprises one or more of a pre-determined media content, and a transmitted error code. Error code algorithms can be used to perform error detection. For example, one or more of a checksum and a longitudinal redundancy check can be used to perform the error check. Block 1117 then transfers control to block 1119.

Next, in block 1119, the client-side customization application sends a message or packet with pre-determined media content to the server-side customization application. Block 1119 then transfers control to block 1120.

Next, in block 1120, the server-side customization application, in the server-side main thread, creates an asynchronous queue that launches a server-side background thread and server-side timer. The server-side background thread runs simultaneously with the server-side main thread. For example, the server-side background thread handles actions not handled by the server-side main thread. For example, the server-side background thread does not handle one or more GUI-related actions. Block 1120 then transfers control to block 1125.

Next, in block 1125, the server-side customization application, in the server-side background thread, creates a customized media content that contains data types. For example, the customized media content may be created from a file in one or more of server-side data storage and server-side memory. For example, data types may comprise one or more of audio sample rates, bits per channel and other data types. Block 1125 then transfers control to block 1130.

Next, in block 1130, the server-side customization application, in the server-side background thread, using a pre-defined data structure, adds new media content to the customized media content. For example, the server-side customization application uses the pre-defined data structure to sequence the new media content in the customized media content. The new media content comprises one or more of user-selected new media content and non-user-selected new media content. For example, the new media content comprises one or more of dialog, music, sound cues, scenes, partial scenes, visual cues, and other media content. Block 1130 then transfers control to block 1135.

Next, in block 1135, the server-side customization application, in the server-side background thread, computes a total media frames count of the customized media content. For example, the total media frames count equals the stored media frames count plus a media frames count of the new media content. Block 1135 then transfers control to block 1140.

Next, in block 1140, the server-side timer, in the server-side main thread, using the total media frames count, computes a total percentage of the then-written customized media content. For example, the total percentage of the customized media content is equal to the media frames count subtotal, divided by the total media frames count. Block 1140 then transfers control to block 1145.

Next, in block 1145, the server-side customization application, in the server-side background thread, writes the new media content into the customized media content. It is queried whether the new media content comprises a final element in the pre-defined data structure. If yes, the server-side customization application, in the server-side background thread instructs the server-side main thread to terminate operation of the client-side timer, and terminates the process. If no, the process loops back to block 1130.

Next, in block 1150, the server-side customization application, in the server-side background thread, when the processing of the customized media content is substantially complete, instructs the server-side main thread to terminate operation of the timer, and terminates the process.

Alternatively, or additionally, the loop between blocks 1130 and 1145 may be replaced with a concurrent queue operation for parallel processing, which reads the media content in parallel, and then concatenates the media content into a buffer.

Figure 12:
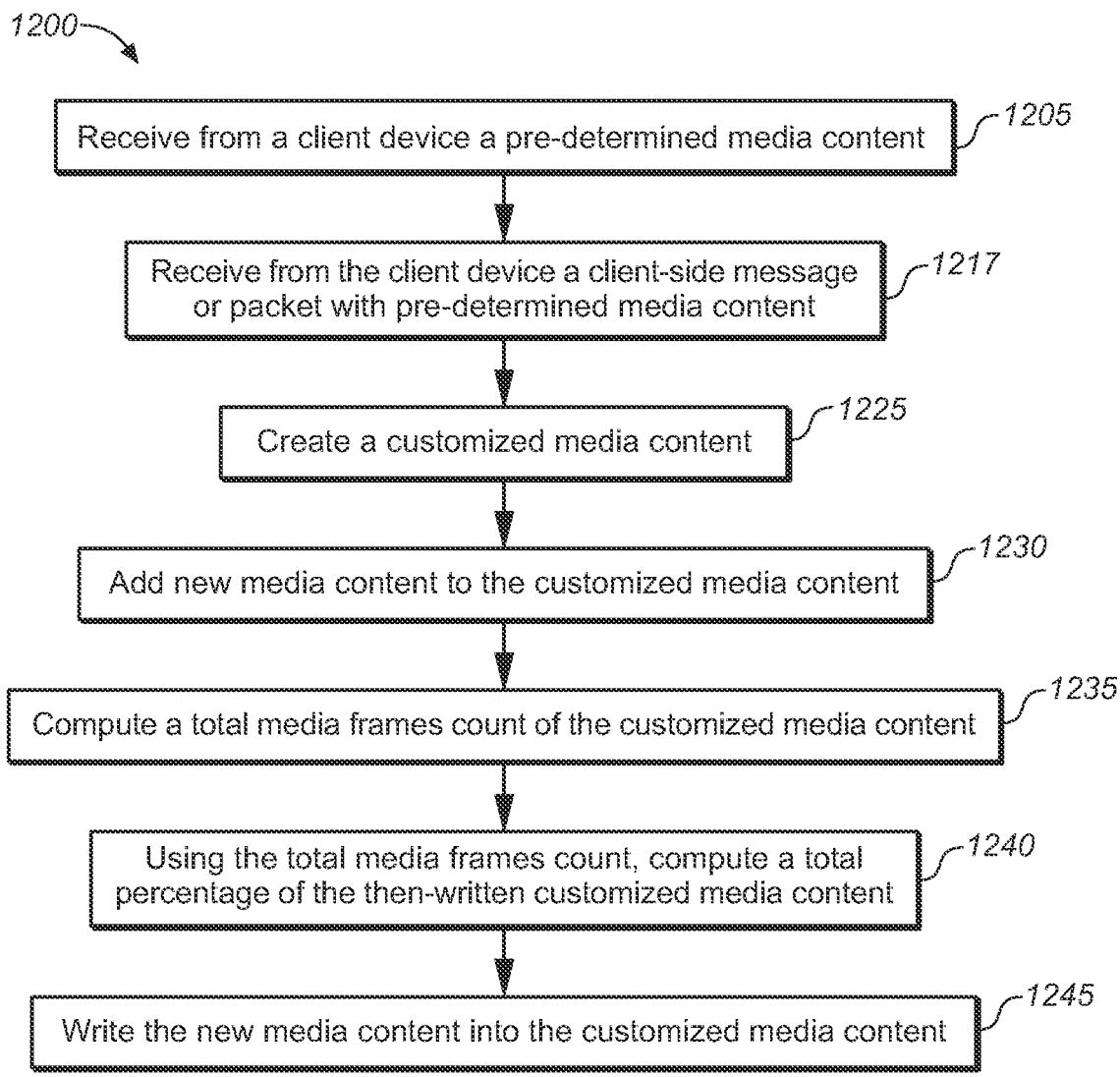
FIG. 12 is a flowchart of a method for customizing stock media content, so as to create customized media content, providing more detail from an overall view regarding sub-steps of step 615 in FIG. 6 for the download and streaming methods, and providing more detail regarding sub-steps of step 815 in FIG. 8 for the live method.

FIG. 12 is a flowchart for a method 1200 for customizing stock media content, so as to create customized media content, pursuant to a method for real-time customization and synchronization of stock media content providing more detail from the server side regarding sub-steps of step 615 in FIG. 6 for the download and streaming methods, and providing more detail regarding sub-steps of step 815 in FIG. 8 for the live method.

The order of the steps in the method 1200 is not constrained to that shown in FIG. 12 or described in the following discussion. Several of the steps could occur in a different order without affecting the final result.

In block 1205, a server-side customization application receives from a client-side customization application a pre-determined media content. Block 1205 then transfers control to block 1217.

Next, in block 1217, the server-side customization application receives from the client-side customization application a client-side message or packet with pre-determined media content. Block 1217 then transfers control to block 1219 to block 1225.

Next, in block 1225, the server-side customization application creates a customized media content. Block 1225 then transfers control to block 1230.

Next, in block 1230, the server-side customization application, using a pre-defined data structure, adds new media content to the customized media content. For example, the server-side customization application uses the pre-defined data structure to sequence the new media content in the customized media content. The new media content comprises one or more of user-selected new media content and non-user-selected new media content. Block 1230 then transfers control to block 1235.

Next, in block 1235, the server-side customization application computes a total media frames count of the customized media content. For example, the total media frames count equals the stored media frames count plus a media frames count of the new media content. Block 1235 then transfers control to block 1240.

Next, in block 1240, the server-side timer, in the server-side main thread, using the total media frames count, computes a total percentage of the then-written customized media content. For example, the total percentage of the customized media content is equal to the media frames count subtotal, divided by the total media frames count. Block 1240 then transfers control to block 1245.

Next, in block 1245, the server-side customization application, in the server-side background thread, writes the new media content into the customized media content. It is queried whether the new media content comprises a final element in the pre-defined data structure. If yes, the server-side customization application, in the server-side background thread, instructs the server-side main thread to terminate operation of the client-side timer, and terminates the process. If no, the process loops back to block 1230.

Next, in block 1250, the server-side customization application, in the server-side background thread, when the processing of the customized media content is substantially complete, instructs the server-side main thread to terminate operation of the timer, and terminates the process.

Alternatively, or additionally, the loop between blocks 1230 and 1245 may be replaced with a concurrent queue operation for parallel processing, which reads the media content in parallel, and then concatenates the media content into a buffer.

Figure 13:
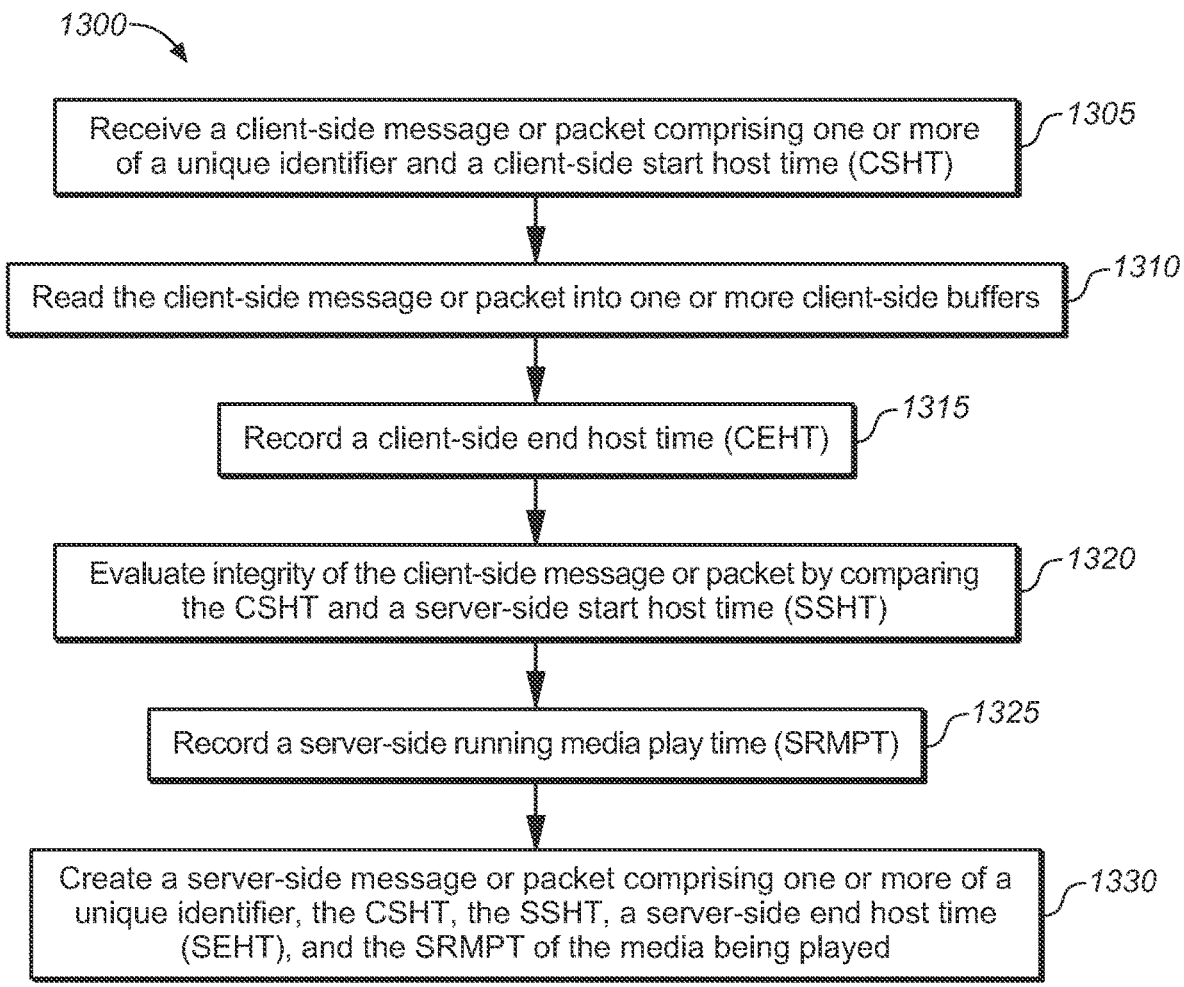
FIG. 13 is a flowchart of a method for constructing a customized media content comprising stock media content selected by a user and customization preferences of the user.

FIG. 13 is a flowchart of a method 1300 for constructing a customized media content comprising stock media content selected by a user and customization preferences of the user pursuant to a method for real-time customization and synchronization of stock media content. FIG. 13 provides more detail regarding sub-steps of step 345 in FIG. 3 for the baseline method, step 545 in FIG. 5 for the download and streaming methods, and step 745 in FIG. 7 for the live method.

The order of the steps in the method 1300 is not constrained to that shown in FIG. 13 or described in the following discussion. Several of the steps could occur in a different order without affecting the final result.

In block 1305, the server-side master application receives a client-side message or packet from the client-side synchronization application. The client-side message or packet comprises one or more of a unique identifier and a client-side start host time (CSHT). Optionally, the client-side message or packet further comprises a client-side transmitted error code. Error code algorithms can be used to perform error detection. For example, one or more of a checksum and a longitudinal redundancy check can be used to perform the error check. Block 1305 then transfers control to block 1310.

In block 1310, the server-side master application reads the client-side message or packet into one or more server-side buffers. That is, the server-side master application breaks the client-side message or packet into one or more pieces, with each piece corresponding to a data type. Then at least one of the one or more pieces is stored by the server-side master application in a server-side buffer. For example, the unique identifier may be stored in a first server-side buffer. For example, the client-side start host time may be stored in a second server-side buffer. For example, the client-side transmitted error code may be stored in a third server-side buffer. For example, other components of the client-side message or packet may be stored in other server-side buffers. For example, some of the server-side buffers may be coterminous. For example, all the server-side buffers may be coterminous. Block 1310 then transfers control to block 1315.

In block 1315, the server-side master application records a server-side start host time (SSHT).

For example, the time measurement may comprise a timestamp. For example, the real world time may comprise a seconds field representing an integral number of seconds. For example, the real world time may further comprise a microseconds field representing an additional number of microseconds elapsed in addition to the integral number of seconds. For example, the host time measurement represents the number of seconds elapsed since the start of the UNIX epoch at midnight Coordinated Universal Time (UTC) Dec. 31, 1969-Jan. 1, 1970. Block 1315 then transfers control to block 1320.

Next, in block 1320, the server-side master application evaluates the integrity of the client-side message or packet.

Preferably, but not essentially, the server-side master application evaluates the integrity of the client-side message or packet by comparing the CSHT and the server-side start host time (SSHT). If the CSHT is substantially equal to the SSHT, the server-side master application verifies integrity of the client-side message or packet. If the CSHT is not substantially equal to the SSHT, the server-side master application verifies a lack of integrity of the client-side message or packet.

Optionally, or additionally, the server-side master application evaluates the integrity of the client-side message or packet by calculating a client-side received error code for the client-side message or packet, and then the server-side master application compares the client-side received error code with the client-side transmitted error code comprised in the client-side message or packet.

If the calculated client-side received error code is substantially equal to the client-side transmitted error code, the server-side master application verifies integrity of the client-side message or packet. If the calculated client-side received error code is not substantially equal to the client-side transmitted error code, the server-side master application verifies a lack of integrity of the client-side message or packet.

If the server-side master application verifies a lack of integrity of the client-side message or packet, the server-side master application deletes the client-side message or packet and sends a message to the client-side synchronization application to request transmission of a replacement client-side message or packet. The process loops back to step 1305.

If the server-side master application verifies the integrity of the client-side message or packet, the server-side master application accepts the client-side message or packet. Block 1320 transfers control to block 1325.

Next, in block 1325, the server-side master application records a server-side running media play time (SRMPT). If no customized media content is being played by the server-side media player, the SRMPT is set to zero. Block 1325 then transfers control to block 1330.

Next, in block 1330, the server-side master application creates a server-side message or packet. The server-side message or packet comprises one or more of a unique identifier, the CSHT, the SSHT, a server-side end host time (SEHT), and the SRMPT of the media being played. Optionally, to facilitate error detection, the server-side master application adds a server-side transmitted error code to one or more server-side messages it sends to the client-side synchronization application. Block 1330 then terminates the process.

Figure 14:
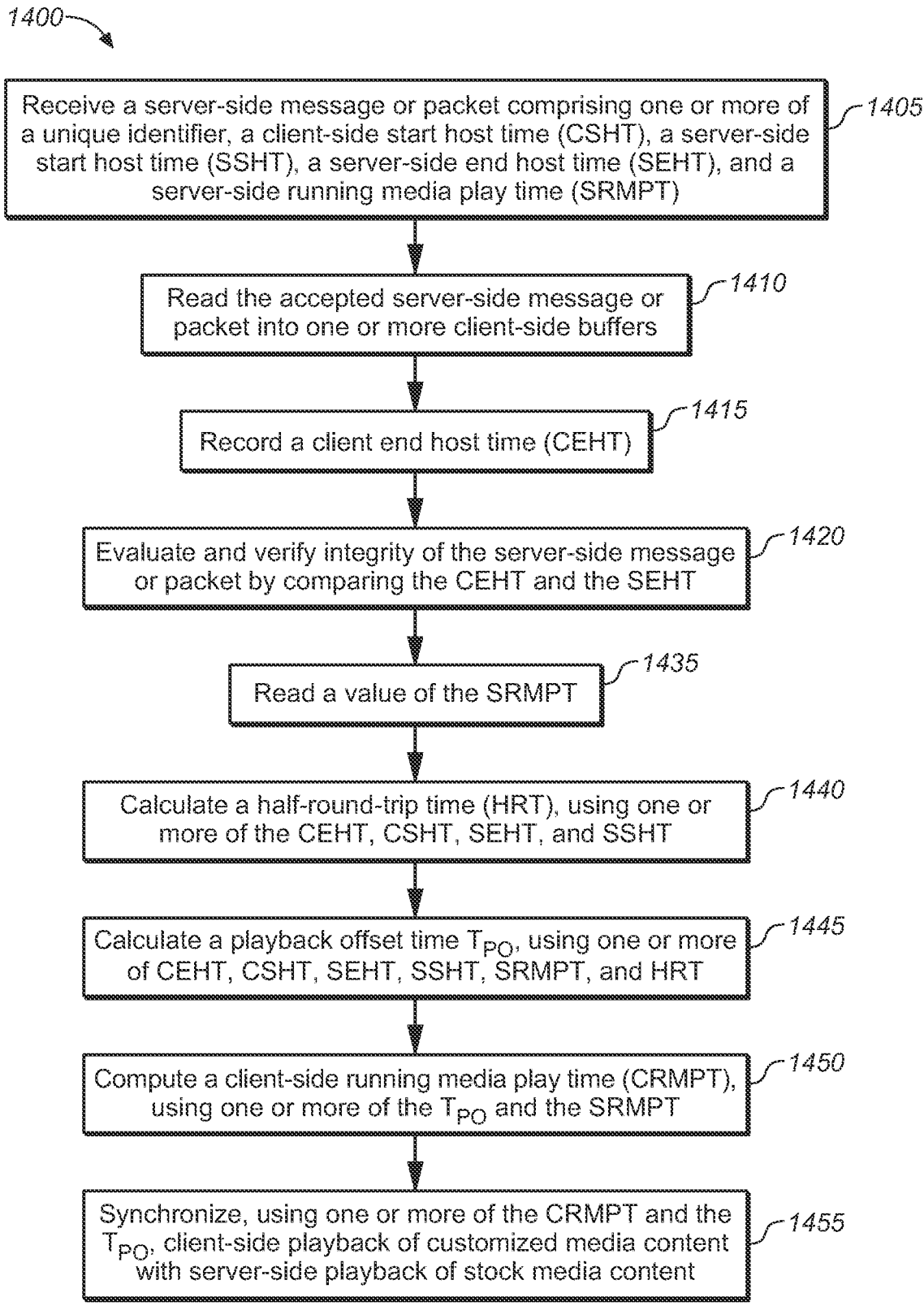
FIG. 14 is a flowchart of a method for receiving and processing a server-side message or packet and synchronizing one or more clocks in a client-side synchronization application with one or more clocks in a server-side master application.

FIG. 14 is a flowchart of a method for receiving and processing a server-side message or packet and synchronizing one or more clocks in a client-side synchronization application with one or more clocks in a server-side master application pursuant to a method for real-time customization and synchronization of stock media content. FIG. 14 provides more detail regarding sub-steps of step 360 in FIG. 3 for the baseline method, and step 560 in FIG. 5 for the download and streaming methods. Synchronization is not required with the live method.

The order of the steps in the method 1400 is not constrained to that shown in FIG. 14 or described in the following discussion. Several of the steps could occur in a different order without affecting the final result.

In block 1405, the client-side synchronization application receives a server-side message or packet from the server-side master application. The server-side message or packet comprises one or more of a client-side unique identifier, a client-side start host time (CSHT), a server-side start host time (SSHT), a server-side end host time (SEHT), and a server-side running media play time (SRMPT). Optionally, the server-side message or packet further comprises a server-side transmitted error code. Error code algorithms can be used to perform error detection. For example, one or more of a checksum and a longitudinal redundancy check can be used to perform the error check. Block 1405 then transfers control to block 1410.

In block 1410, the client-side synchronization application reads the server-side message or packet into one or more client-side buffers. That is, the client-side synchronization application breaks the server-side message or packet into one or more pieces, with each piece corresponding to a data type. Then at least one of the one or more pieces is stored in a client-side buffer. For example, the client-side unique identifier may be stored in a first client-side buffer. For example, the CSHT may be stored in a second client-side buffer. For example, the SSHT may be stored in a third client-side buffer. For example, the SEHT may be stored in a fourth client-side buffer. For example, the SRMPT may be stored in a fifth client-side buffer. For example, the server-side transmitted error code may be stored in a sixth client-side buffer. For example, other server-side message or packet components may be stored in other client-side buffers. For example, some of the buffers may be coterminous. For example, all the buffers may be coterminous. Block 1410 then transfers control to block 1415.

In block 1415, the client-side synchronization application records a CEHT. The CEHT is defined as a host time at which transmission of a server-side message or packet ends on the client side. For example, the CEHT may comprise the time at which server-side playback stops. The CEHT is the world value time that the client-side synchronization application records based on the client-side synchronization application's host time.

For example, the time measurement may comprise a timestamp. For example, the real world time may comprise a seconds field representing an integral number of seconds. For example, the real world time may further comprise a microseconds field representing an additional number of microseconds elapsed in addition to the integral number of seconds. For example, the host time measurement represents the number of seconds elapsed since the start of the UNIX epoch at midnight Coordinated Universal Time (UTC) Dec. 31, 1969-Jan. 1, 1970. Block 1415 then transfers control to block 1420.

Next, in block 1420, the client-side synchronization application evaluates the integrity of the server-side message or packet.

Preferably, but not essentially, the client-side synchronization application evaluates the integrity of the server-side message or packet by comparing the CEHT and the SEHT. If the CEHT is substantially equal to the SEHT, the client-side master application verifies integrity of the server-side message or packet. If the CEHT is not substantially equal to the SEHT, the client-side master application verifies a lack of integrity of the server-side message or packet.

Then the client-side synchronization application compares the client-side received error code with the server-side transmitted error code received in the server-side message or packet.

Optionally, or additionally, the client-side synchronization application evaluates the integrity of the server-side message or packet by calculating a server-side received error code for the server-side message or packet, and then the client-side synchronization application compares the server-side received error code with the server-side transmitted error code comprised in the server-side message or packet.

If the calculated server-side received error code is substantially equal to the server-side transmitted error code, the client-side synchronization application verifies integrity of the server-side message or packet. If the calculated server-side received error code is not substantially equal to the server-side transmitted error code, the client-side synchronization application verifies a lack of integrity of the server-side message or packet.

Optionally, or additionally, the client-side synchronization application evaluates the integrity of the server-side message or packet by comparing the client-side unique identifier with the client device unique identifier.

If the client-side unique identifier is substantially equal to the client device identifier, the client-side synchronization application verifies integrity of the server-side message or packet. If the client-side unique identifier is not substantially equal to the client device identifier, to the server-side transmitted error code, the client-side synchronization application verifies a lack of integrity of the server-side message or packet.

If the client-side synchronization application verifies a lack of integrity of the server-side message or packet, the client-side synchronization application deletes the server-side message or packet and sends a message to the client-side synchronization application to request transmission of a replacement server-side message or packet. The process loops back to step 1405.

If the client-side synchronization application verifies the integrity of the server-side message or packet, the client-side synchronization application accepts the server-side message or packet. Block 1420 transfers control to block 1435.

Next, in block 1435, using one or more of the CEHT, CSHT, SEHT, and SSHT, the client-side synchronization application then calculates a half-round-trip time. The round-trip time is equal to the time it takes a signal to leave from the client-side synchronization application, arrive at the server-side master application, be received by the server-side master application, be retransmitted by the server-side master application, and arrive back at the client-side synchronization application. For example, the round-trip time RT may be calculated according to equation (1) as:

$$RT=(CEHT-CSHT)-(SEHT-SSHT). \quad (1)$$

Where the server-side processor is faster than a minimal time, for example, where the server-side processor is faster than a playback synchronizing error threshold time, the difference (SEHT minus SSHT) may be negligible. In these cases, the round-trip time RT may be calculated according to equation (2) as:

$$RT=CEHT-CSHT. \quad (2)$$

Optionally, one or more server-side messages or packets is encrypted. Optionally, one or more client-side messages or packets is encrypted.

The client-side synchronization application then computes a half-round-trip time HRT by multiplying the round-trip time RT by 0.5, according to equation (3):

$$HRT = 0.5 * RT \quad (3)$$

Block 1435 then transfers control to block 1440.

Next, in block 1440, the client-side synchronization application reads the value of SRMPT. For example, the client-side synchronization application reads from the fifth client-side buffer the value of the SRMPT. Block 1440 then transfers control to block 1445.

Next, in block 1445, using one or more of CEHT, CSHT, SEHT, SSHT, SRMPT, and HRT, the client-side synchronization application calculates a playback offset time $T_{PO}$. The playback offset time $T_{PO}$ is defined as the time increment by which media playback at the client-side should be speeded up relative to media playback at the server-side to synchronize the server-side media and the client-side media.

The playback offset time $T_{PO}$ may be defined as the timing difference between client-side playback and server-side playback. The playback offset time $T_{PO}$ may be calculated according to equation (4):

$$T_{PO} = HRT + BD, \quad (4)$$

where BD is buffer size delays caused by inadequate sizing of one or more of the client-size buffers. Buffer size delays may be safely ignored if they are sufficiently small.

Block 1445 then transfers control to block 1450.

In block 1450, using one or more of the computed playback offset time $T_{PO}$ and the SRMPT, the client-side synchronization application then computes a client-side running media play time (CRMPT). The CRMPT is defined as the elapsed running time for the media content that is being played by the media player on the client. For example, the client-side synchronization application calculates the CRMPT according to equation (5):

$$CRMPT = SRMPT + T_{PO}. \quad (5)$$

Alternatively, or additionally, the client-side synchronization application makes multiple requests in parallel to the server-side master application. Then, using one or more of statistical analysis and machine learning algorithms, the client-side synchronization application estimates the value of the CRMPT. Block 1450 then transfers control to block 1455.

Next, in block 1455, using one or more of the computed CRMPT and the computed playback offset time $T_{PO}$, the client-side synchronization application synchronizes client-side playback of customized media content with server-side playback of stock media content. For example, the client-side synchronization application adjusts the playback to synchronize the client-side synchronization application to the client-side playback device. For example, the client-side synchronization application adjusts the playback to synchronize the client-side synchronization application to the client-side playback device by offsetting the playback time of the client-side media player by the playback offset time $T_{PO}$.

Alternatively, for example, a single system call can be used to calculate the playback offset time offset time $T_{PO}$. Alternatively, multiple systems calls may be performed to improve accuracy. For example, accuracy may be improved via one or more of linear regression, a sum of averages, a technique for evaluating statistical significance, a machine learning algorithm, and the like.

One or more of automatic re-synchronization and manual re-synchronization may be performed as needed. For example, after a while the clock may drift, meaning that one or more of a stream and a download of the media content that starts out synchronized may gradually become de-synchronized. In such cases, resynchronization may be performed by one or more of manual execution and automatic execution of a re-synchronization of the client-side synchronization application in the client-side synchronization application with the server-side master application in the server-side master application.

The client-side synchronization application may request at random or at pre-determined time intervals the player's synchronization time on the server-side master application in the server-side computing device. If there is a difference of more than a pre-determined offset, the client device will vary the rate of the playback until the drift is corrected. In another embodiment, a digital signal-processing algorithm may be used to time compress or stretch the playback. Block 1455 then terminates the process.

Figure 15A:
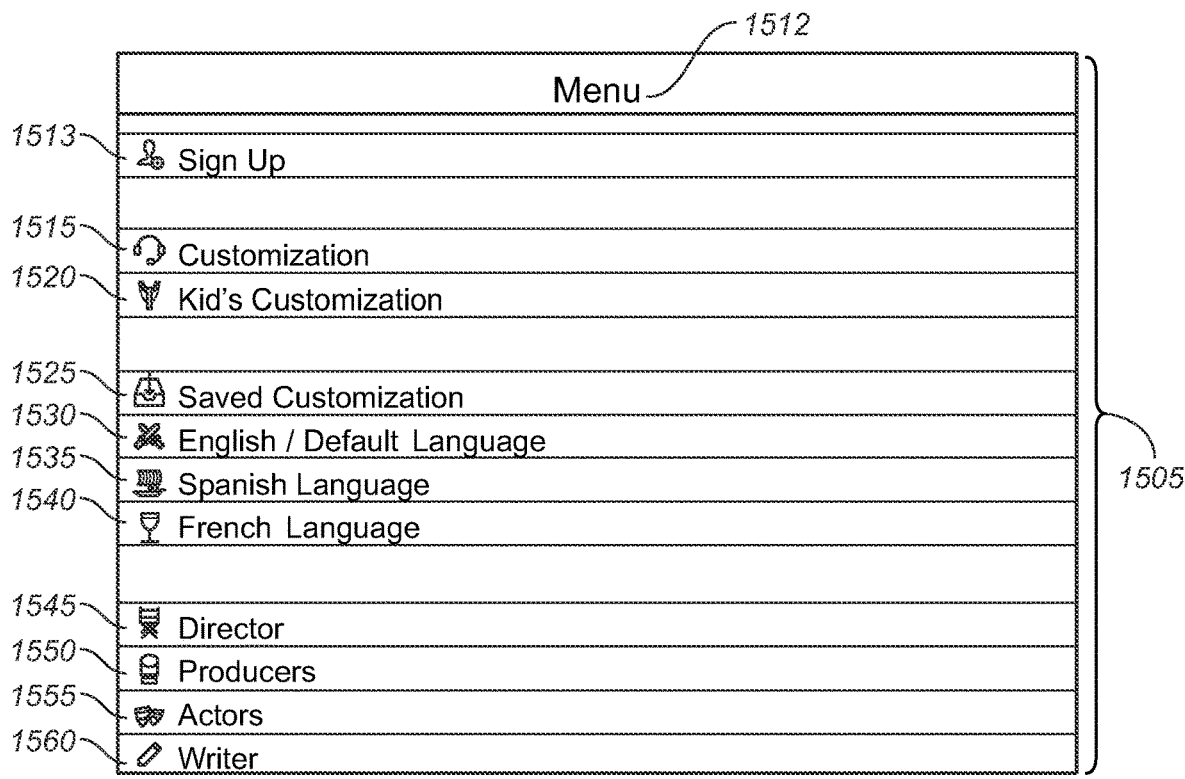
FIGS. 15A and 15B are a pair of exemplary screenshots of GUI's of a client device showing examples of screens initially displayed to a user prior to initiation of one or more of a customization and synchronization.
Figure 15B:
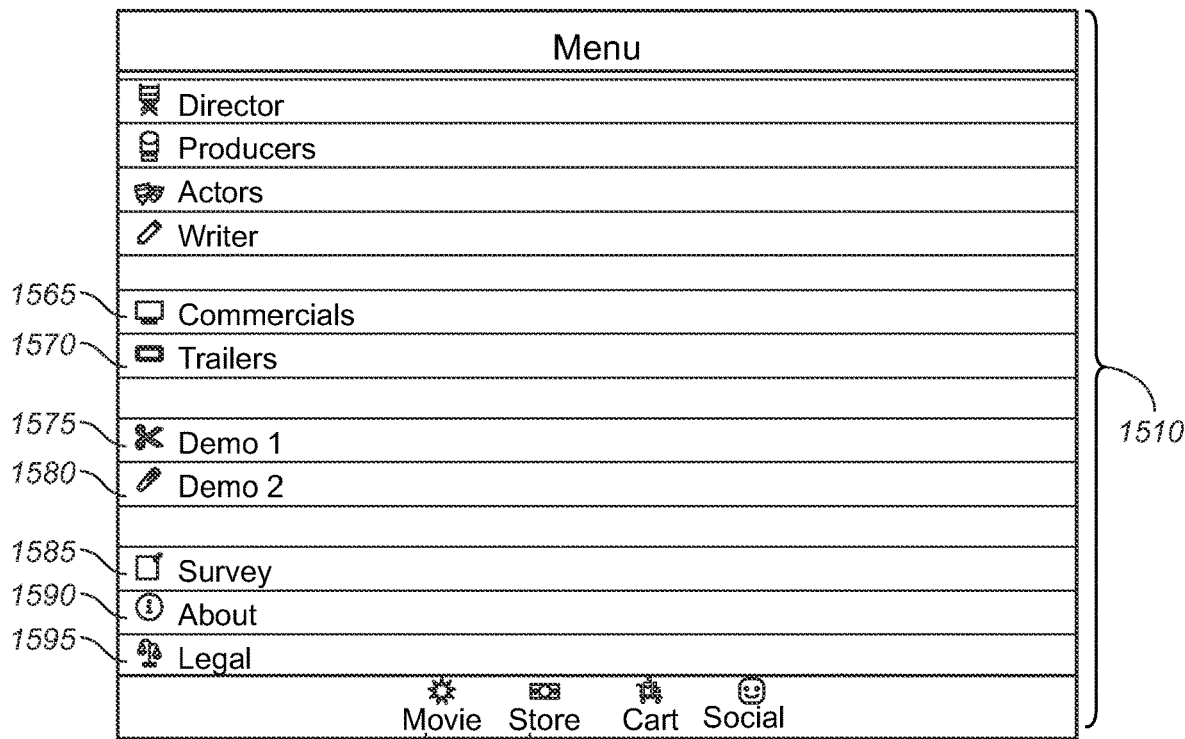

FIGS. 15A and 15B are a first screenshot 1505 and a second screenshot 1510 of a GUI of a client device showing examples of screens initially displayed to a user prior to initiation of one or more of a customization and synchronization.

In FIG. 15A, a Sign-up button 1513 allows the user to create an account on the system. The first screenshot 1505 shows a customization and synchronization menu 1512, showing the main customization and synchronization options the user will have. The user may be presented this customization and synchronization menu 1512 when the user wishes to customize media content using a Customization button 1515. The customization and synchronization menu 1512 comprises the Sign-up button 1513, a Customization button 1515, a Kid's Customization button 1520, s Saved Customization button 1525, an English/Default Language button 1530, a Spanish Language button 1535, a French Language button 1540, a Director button 1545, a Producer button 1550, an Actor button 1555, a Writer button 1560, a Commercials button 1565, a Trailers button 1570, a Demo 1 button 1575, a Demo 2 button 1580, a Survey button 1585, a Store button 1587, and a first Custom Motion picture button 1588. Other language buttons could be included in addition to or in place of one or more of the Spanish Language Button 1535 and the French Language button 1540. A language other than English could be selected as the Default Language on the English/Default Language button 1530.

The Customization button 1515 allows the user to customize media content. The Customization button 1515 further allows the user to lock the customized media content to a client media player. For example, the user locks the customized media content to the client media player by creating a unique login and password for the media player. The Kid's Customization button 1520 allows the child user to customize media content consistent with limits previously designated by an adult. The Kid's Customization button 1520 further allows the user to lock the customized media content to a client media player. For example, the user locks the customized media content to the client media player by creating a unique login and password for the media player. The Saved Customization button 1525 allows the user to retrieve and play his previously-customized media content without needing to re-render new customized media content choices despite having exited the client media player before returning to the menu.

The English/Default Language button 1530 provides an audio track media player in one or more of the English language and a default language that synchronizes to the client device. The Spanish button 1535 provides an audio track media player in the Spanish language that synchronizes to the client device. The French button 1540 provides an audio track media player in the Spanish language that synchronizes to the client device. Additional language buttons (not pictured) can be added or deleted based, for instance, on one or more of a user's account information, a rating of the media content, a time zone location, regional language usage, and other factors.

A director-based media track is played if the user presses the Director button 1545. For example, a director-based media track is played discussing the work of a Director of the media track. For example, a director-based media track is played featuring one or more interviews with a Director of the media track. For example, a director-based audio track is played if the user presses the Director button 1545. For example, a director-based video track is played if the user pressed the Director button 1545. For example, a director-based audio track media player is played if the user presses the Director button 1545. For example, the director-based audio track media player is synchronized to the client device and is played if the user presses the Director button 1545.

A producer-based media track is played if the user presses the Producer button 1550. For example, a producer-based media track is played discussing the work of a Producer of the media track. For example, a producer-based media track is played featuring one or more interviews with a Producer of the media track. For example, a producer-based audio track is played if the user presses the Producer button 1550. For example, a producer-based video track is played if the user pressed the Producer button 1550. For example, a producer-based audio track media player is played if the user presses the Producer button 1550. For example, the producer-based audio track media player is synchronized to the client device and is played if the user presses the Producer button 1550.

An actor-based media track is played if the user presses the Actor button 1555. For example, a actor-based media track is played discussing the work of a Actor of the media track. For example, an actor-based media track is played featuring one or more interviews with a Actor of the media track. For example, an actor-based audio track is played if the user presses the Actor button 1555. For example, a actor-based video track is played if the user pressed the Actor button 1555. For example, the actor-based audio track media player is played if the user presses the Actor button 1555. For example, the actor-based audio track media player is synchronized to the client device and is played if the user presses the Actor button 1555.

A writer-based media track is played if the user presses the Writer button 1560. For example, a writer-based media track is played discussing the work of a Writer of the media track. For example, a writer-based media track is played featuring one or more interviews with a Writer of the media track. For example, a writer-based audio track is played if the user presses the Writer button 1560. For example, a writer-based video track is played if the user pressed the Writer button 1560. For example, a writer-based audio track media player is played if the user presses the Writer button 1560. For example, the writer-based audio track media player is synchronized to the client device and is played if the user presses the Writer button 1560.

Clearly other buttons could be created such as a Costume Designer button (not shown), a Cinematographer button (not shown), and the like. Moreover, additional commentary buttons might be added or deleted based on, for instance, one or more of a user's selection of the name of an artist who worked on the media content, a user's account information, a rating of the media content, a user's time zone location, a user's regional language usage, and the like. For example, a rating of the media content comprises one or more of a rating by the Motion Picture Association of America, a violence content advisory level, a TV Parental Guideline, a sexual content advisory, and another rating of the media content.

Turning now to FIG. 15B, if the Commercials button 1565 is pressed by the user, the Commercials button 1565 will trigger the client device 120 to provide a media player that will play commercial content. For example, the commercial content may be related to the custom media being played. For example, if the custom media comprises an animated film, the commercial content may relate to a stuffed animal modeled after the film's main character. For example, if the custom media comprises a film, the commercial content may comprise a Digital Versatile Disc (DVD) of one or more of the film, a previous film by the same director, and a previous film featuring one of the same actors. Alternatively, or additionally, the custom media comprises unique media content related to the user based on one or more of the user's account information, a rating of the media content, a time zone location, regional language usage, and other factors.

If the Trailers button 1570 is pressed by the user, the Trailers button 1570 will trigger the client device 120 to provide a media player that will play trailer content. For example, the commercial content may be related to the custom media being played. For example, if the custom media comprises an animated film, the commercial content may relate to a stuffed animal modeled after the film's main character. For example, if the custom media comprises a film, the commercial content may comprise a Digital Versatile Disc (DVD) of one or more of the film, a previous film by the same director, and a previous film featuring one of the same actors. Alternatively, or additionally, the custom media comprises unique media content related to the user based on one or more of the user's account information, a rating of the media content, a time zone location, regional language usage, and other factors.

If the Demo 1 button 1575 is pressed by the user, the Demo 1 button 1575 will trigger the client device 120 to provide a media player that will play first demo content. For example, the first demo content comprises one or more of a demonstration regarding a technical breakthrough, a behind-the-scenes short film regarding the making of a motion picture, an outtakes reel, a documentary about a topic relating to the motion picture, and another demo.

If the Demo 2 button 1580 is pressed by the user, the Demo 2 button 1580 will trigger the client device to provide a media player that will play second demo content. For example, the second demo content comprises one or more of a demonstration regarding a technical breakthrough, a behind-the-scenes short film regarding the making of a motion picture, an outtakes reel, a documentary about a topic relating to the motion picture, and another demo.

If the Survey button 1585 is pressed by the user, the Survey button 1585 will trigger the client-side audience measurement application to provide a survey interface in which the user is invited to participate. Alternatively, or additionally, if the Survey button 1585 is pressed by the user, the Survey button 1585 will trigger the client-side audience measurement application to provide a customized survey interface that is customized based on one or more survey preferences. Survey preferences comprise one or more of a user's account information, a rating of the media content, a time zone location, regional language usage, and other survey preferences. For example, if the user selects a dog in the customization process, a survey could be presented regarding dogs.

If the Store button 1587 is pressed by the user, the Store button 1587 will trigger the client device to display store information about a store. For example, the store may sell one or more of compact discs (CD's), DVD's, downloads, views, and other formats of on-sale media. The on-sale media may comprise one or more of the media currently being viewed, DVD's of other media directed by one or more of the same directors who directed the media being viewed, DVD's of other media produced by one of the same producers who produced in the media being viewed, DVD's of other media with one or more of the same actors acting in the media being viewed, DVD's of other media with one or more of the same writers who wrote the media being viewed, and the like. For example, the store may sell a stuffed animal depicting character that appears in the media being viewed. For example, the store may sell one or more of an electronic book (e-book), a paper book, and an audio book about the making of the media being viewed. For example, the store may sell one or more of an electronic book (e-book), a paper book, and an audio book telling the story told by the media being viewed.

If the first Custom Motion picture button 1588 is pressed by the user, the first Custom Motion picture button 1588 will trigger the client device to display Custom Motion picture information about options for purchasing a Custom Motion picture that the user customizes.

If the About button 1590 is pressed by the user, the About button 1590 will trigger the client device to display information about the system. For example, the displayed information comprises one or more of a system name, a system creation date, a system version, one or more system privacy agreements, one or more system warranties, a last day and time that the system was accessed by the user, and other system information.

If the Legal button 1595 is pressed by the user, the Legal button 1595 will trigger the client device to display legal information. For example, the displayed information comprises one or more of a contact name and address for service of process, a contact name and address for an attorney, a designation of a jurisdiction in which a lawsuit may be brought, a specification whether or not binding mediation is to be pursued instead of litigation, and other legal information.

Figure 16:
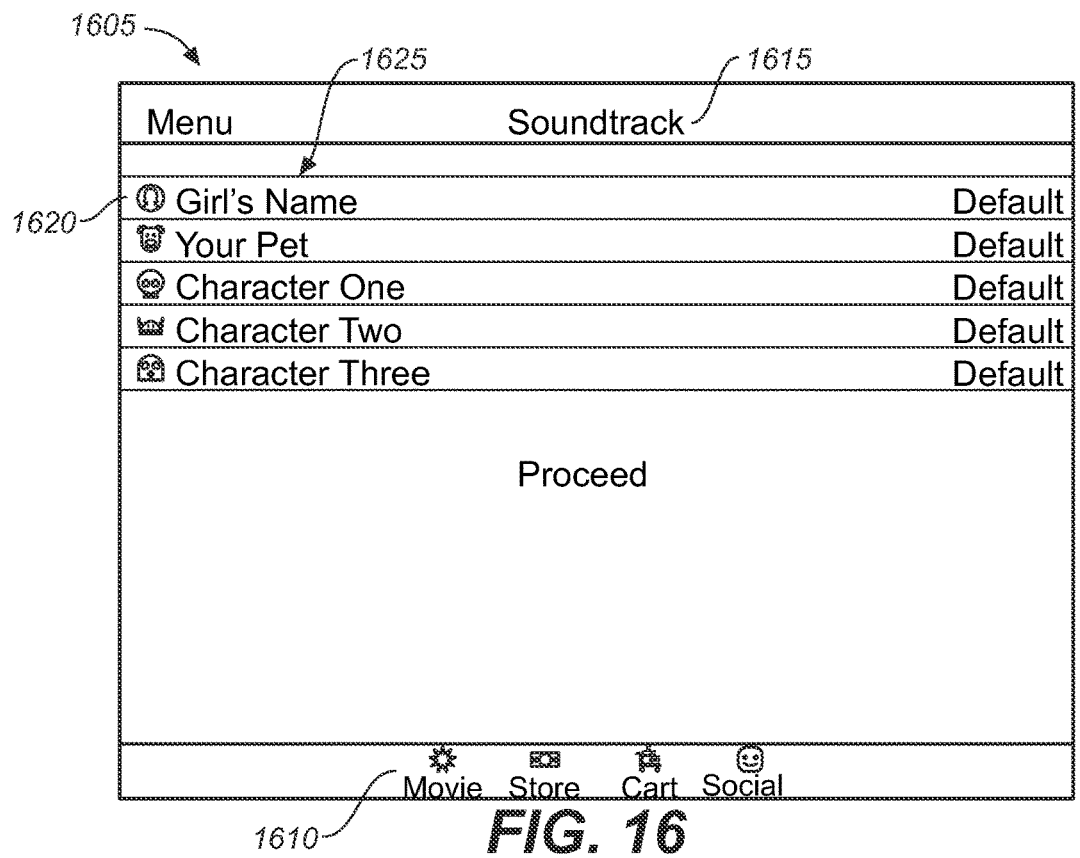
FIG. 16 is an exemplary screenshot of a graphical user interface (GUI) of a client device in a networked environment where the client device displays extracted media content that is taken from digital media content and then is inserted into a custom media track.

FIG. 16 is an exemplary screenshot of a graphical user interface (GUI) 1605 of a client device in a networked environment where the client device displays extracted media content 1605 that is taken from digital media content 1610 to be inserted into a custom media track 1615. For example, as shown in the figure, the digital media content 1610 can be a motion picture 1610. For example, as shown in the figure, the custom media track 1615 can be a soundtrack 1615. The GUI 1605 receives the user's selection of a derivative media content 1620 to be inserted into the extracted media content 1605. For example, the derivative media content 1620 comprises a custom identifier 1620. For example, the derivative media content 1620 comprises media that are recorded, stored in a database, and pulled from the database to be added into the custom soundtrack 1615 upon selection by the user. For example, as shown in the figure, the custom identifier 1620 is Girl's Name. The user selects the custom identifier 1620 from a custom identifier list 1625. For example, as shown in the figure, the custom identifier list 1625 comprises Girl's Name, Your Pet, Character One, Character Two, and Character Three. In actual operation, Characters One, Two, and Three would be respectively replaced with the names of a first, second, and third character from the extracted media content 1605. Similarly, if already known, Girl's Name and Your Pet would be respectively replaced with the actual name of the girl user and with the actual name of the user's pet.

Figure 17:
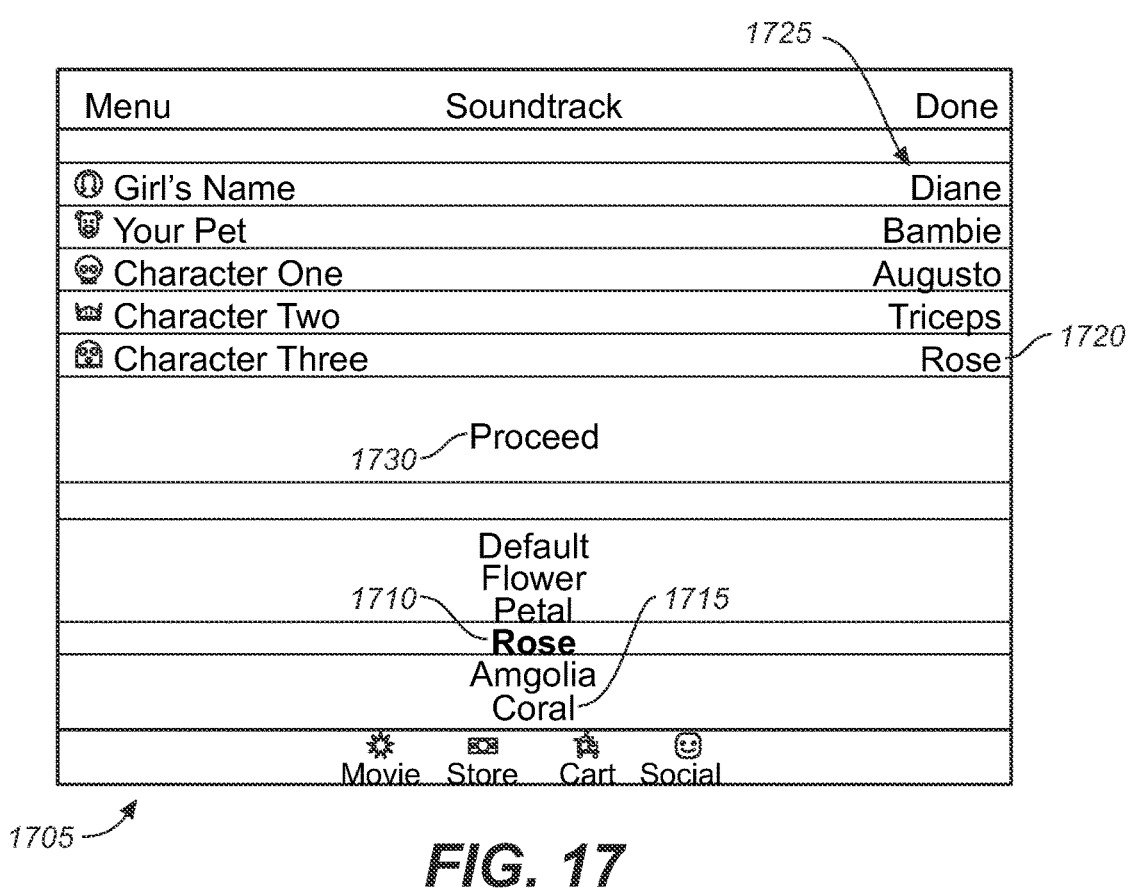
FIG. 17 is an exemplary screenshot of a GUI of a client device that displays an example of how the GUI receives the user's selection of a custom identifier to be inserted into a custom track.

FIG. 17 is an exemplary screenshot of a graphical user interface (GUI) 1705 of a client device that displays an example of how the GUI receives the user's selection of a custom identifier to be inserted into a custom media track. The GUI 1705 may receive the user's selection of a custom identifier 1710 from a custom identifier list 1715. For example, as shown in the figure, the custom identifier 1710 selected by the user is Rose. For example, as shown in the figure, the custom identifier list 1715 comprises Default, Flower, Petal, Rose, Amgolia, and Coral.

The custom identifier 1715 selected by the user is then imported as selected custom identifier 1720 in the custom identifier master list 1725. For example, as shown in the figure, other custom identifiers 1720 previously selected by other users and comprised in the custom identifier master list 1725 include Diane, Bambie, Augusto, and Triceps, as well as Rose. The user then presses the Proceed button 1730 to proceed with customization of the custom media track.

Figure 18:
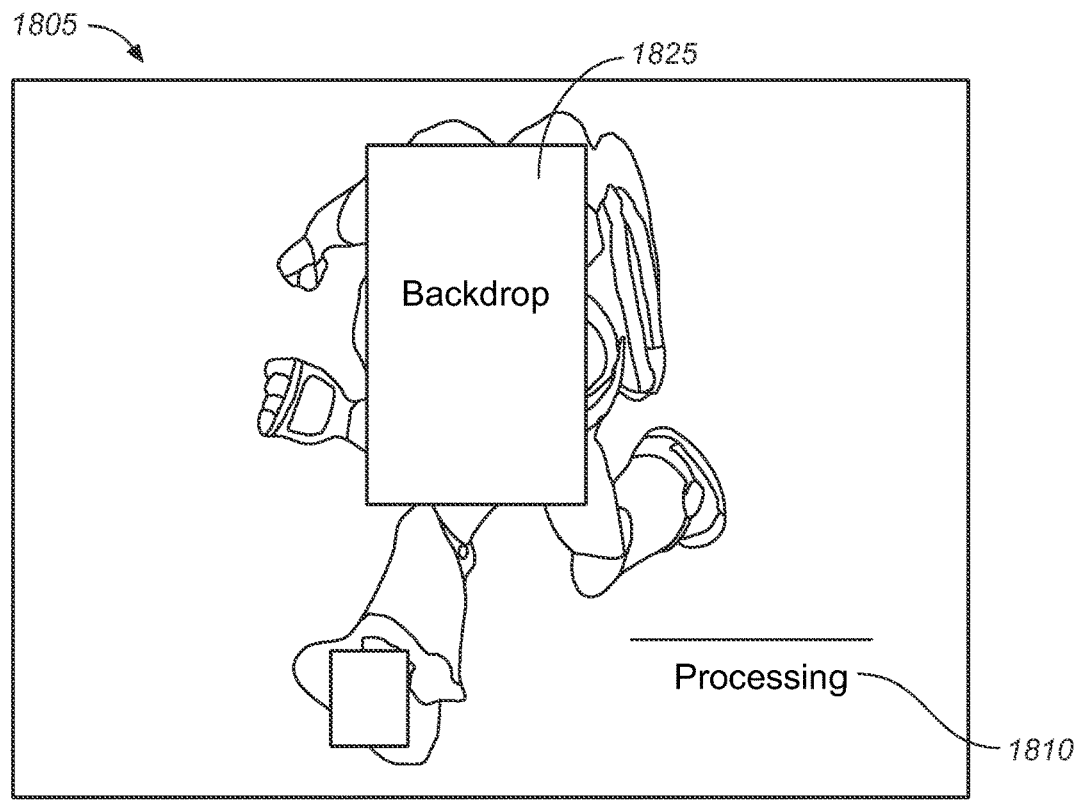
FIG. 18 is an exemplary screenshot of a GUI of a client device showing an example of a backdrop screen seen by a user while processing of data is being performed.

FIG. 18 is an exemplary screenshot of a GUI 1805 of a client device showing an example of a Backdrop screen 1805 seen by a user while processing of data is being performed. After the user clicks the Proceed button, the Backdrop screen 1805 automatically appears. The processing text and bar 1820 indicates that processing is occurring. While processing is occurring, a Backdrop 1825 is shown on the Backdrop screen 1805. The Backdrop 1825 comprises one or more of text, media, and another backdrop format. The processing of the selected data is in real-time and quick, currently less than approximately ten seconds. For example, the Backdrop 1825 comprises an advertisement. For example, as shown here, the Backdrop 1825 can be a photo still from the motion picture.

Figure 19:
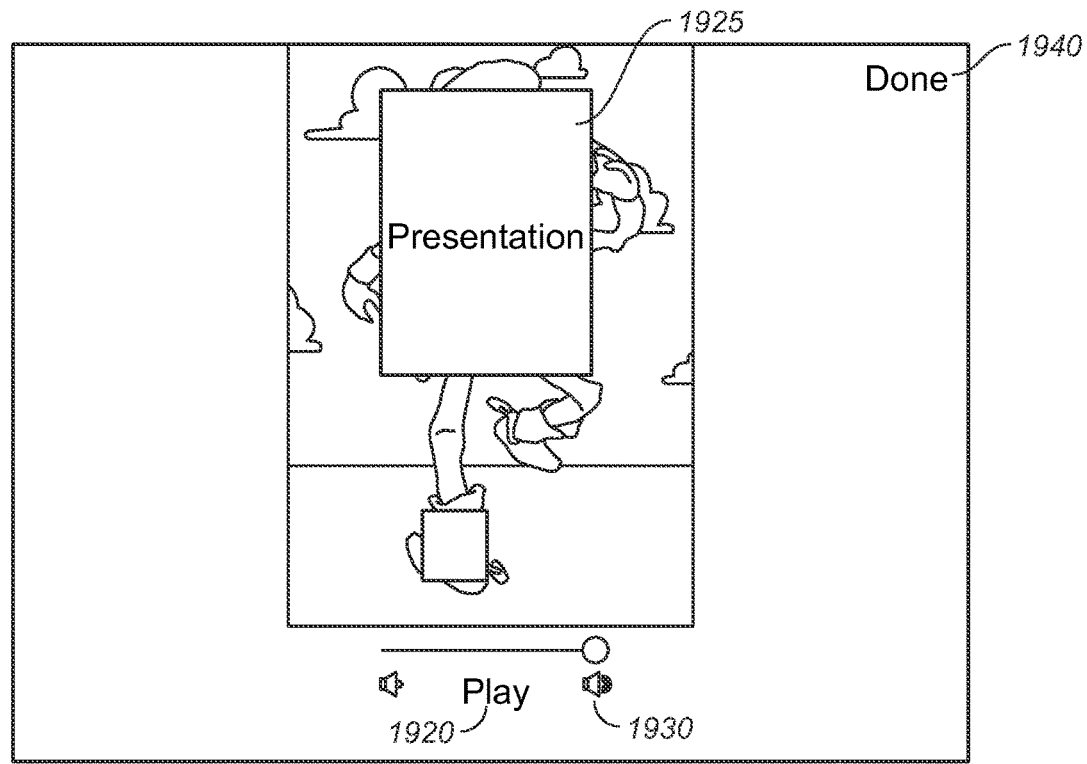
FIG. 19 is an exemplary screenshot of a GUI of a client device showing an example of a customized player screen.

Once the processing is complete, the client device automatically transfers the user to a customized player screen such as the one shown in FIG. 19. Additionally, or alternatively, the processing of the user's selection of a custom identifier happens so rapidly in real time that the user does not see the track processing screen.

FIG. 19 is an exemplary screenshot of a GUI 1905 of a client device showing an example of a customized player screen 1905. The customized player screen 1905 is synchronized with the customized soundtrack. Depicted in FIG. 19 is a screenshot of a customized character. When a user pushes a Play button 1920, a Presentation 1925 begins to play in synchronization with the customized soundtrack. The Presentation 1925 comprises one or more of text, media, and another presentation format. A Volume slider 1930 allows the user to adjust the audio volume. The Play button 1920 will switch its appearance to instead appear as a Stop button (not pictured) if the user indicates that he wants to stop the playback by, for example, clicking on the play button 1920. When the user wants to exit the player, the user clicks the Done button 1940.

Figure 20:
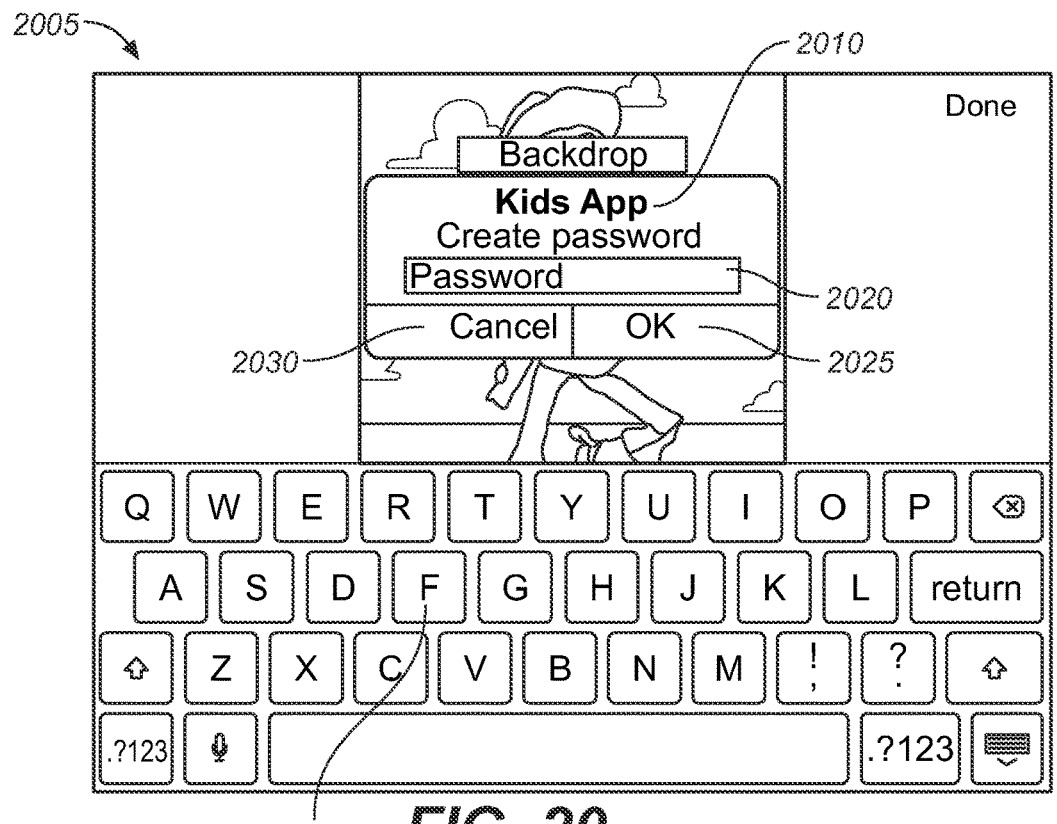
FIG. 20 is an exemplary screenshot of a GUI of a client device showing an example of a login screen for a children's application.

FIG. 20 is an exemplary screenshot of a GUI 2005 of a client device showing an example of a login screen for a children's application. If the Kid's Customization button 1520 in FIG. 15 is clicked, this is the GUI 2005 that is shown next.

The child clicks on the screen of the GUI 2005 to draw up the children's login box 2010. The children's login box 2010 comprises a password box 2020, an OK button 2025, and a cancel button 2030. A parent or guardian uses a keyboard 2035 to type into the password box 2020 a previously created Password. This allows the parent or guardian to limit the child's access. To allow Kid's Customization, the guardian must click the OK button 2025 after entering the Password into the password box 2020. The GUI then displays a customized player screen as shown in FIG. 19 with the added Kid's Customization functionality.

Figure 21:
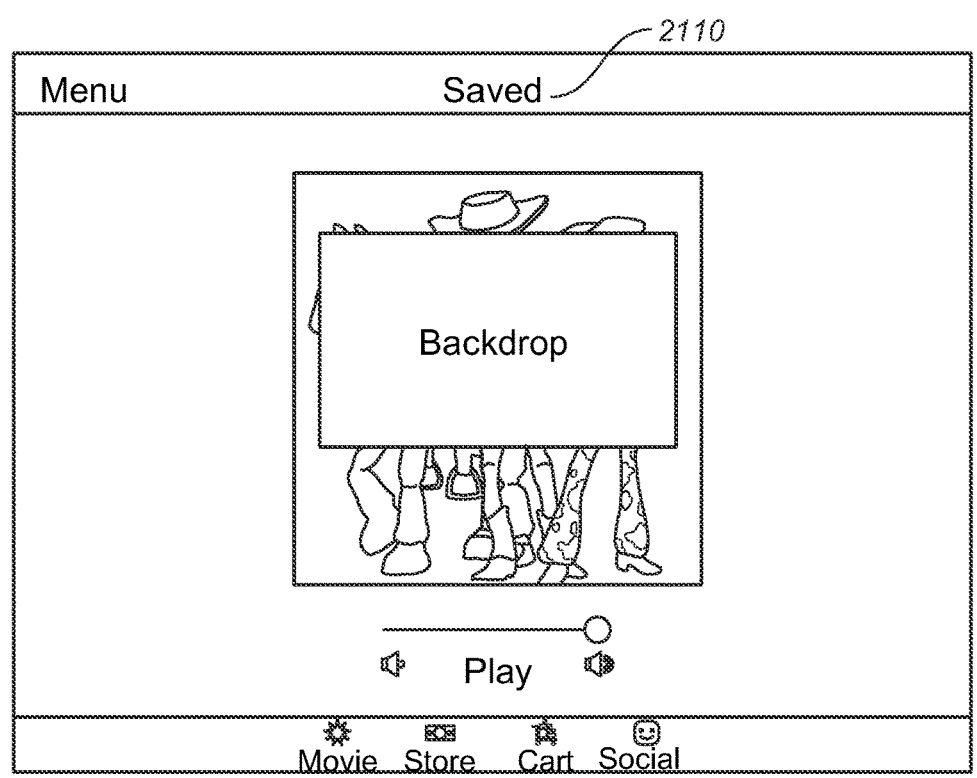
FIG. 21 is an exemplary screenshot of a GUI of a client device showing an example of a player resumption screen.

FIG. 21 is an exemplary screenshot of a GUI 2105 of a client device showing an example of a player resumption screen 2105. Should a user exit a Player screen prematurely (by inadvertently pressing the Done button 1940 in FIG. 19), the user can resume without having to input elements again by selecting the Saved button 2110, which replicates the content of the Saved Customization button 1525 in FIG. 15. Once the Saved button 2110 is pressed, the client device automatically transfers the user to the player resumption screen 2105.

Figure 22:
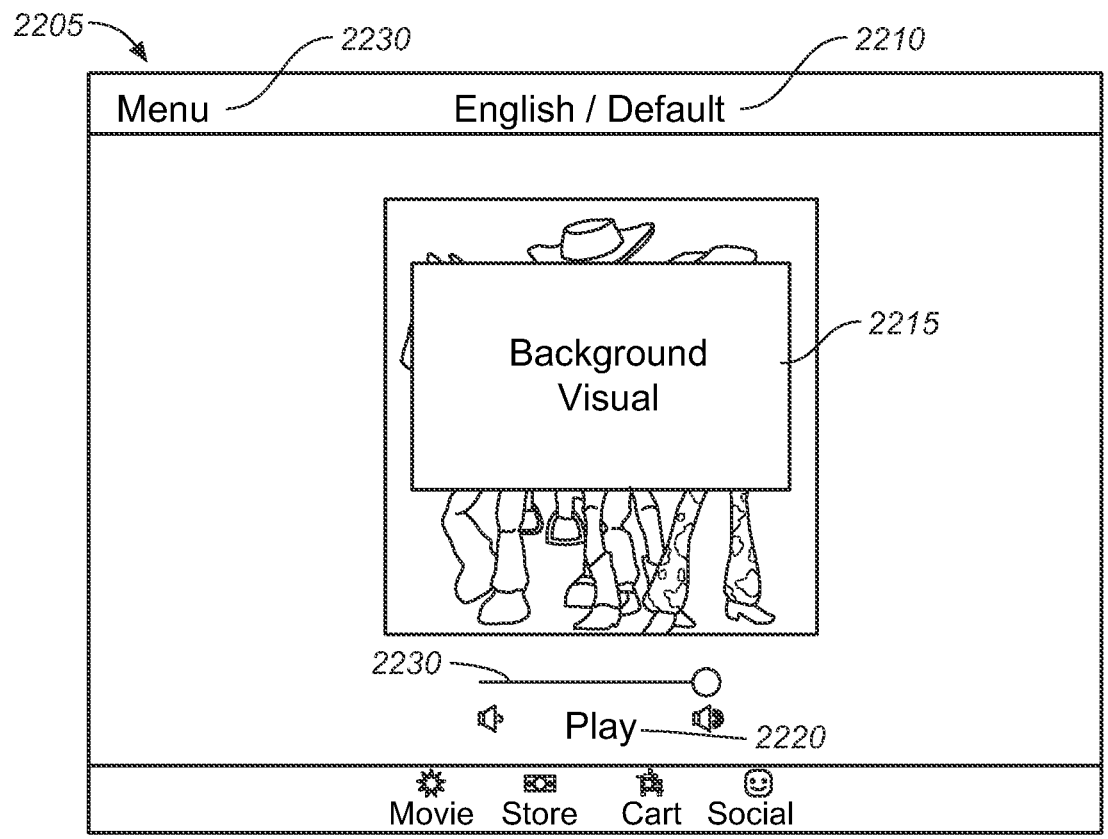
FIG. 22 is an exemplary screenshot of a GUI of a client device showing an example of a background screen seen by a user prior to initiation of play of media.

FIG. 22 is an exemplary screenshot of a GUI 2205 of a client device showing an example of a Background Screen 2205 seen by a user prior to initiation of play of media. For example, the Background Screen 2205 comprises one or more of a background visual screen, background audio, and another background media.

The Background Screen 2205 comprises a language indicator button 2210 that indicates the language the user previously selected using the customization and synchronization menu 1512 in FIG. 15. For example, as shown here, the language indicator button 2210 indicates that the previously selected language is Spanish. The customization and synchronization menu 1512 in FIG. 15 allowed for additional language choices. For example, in FIG. 15, the user previously selected a preferred language from an English/Default Language button 1530, a Spanish Language button 1535, and a French Language button 1540. Optionally, the user is allowed to now change his or her prior language selection if he or she clicks on the language indicator button 2210 and chooses a new language from a pop-up menu (not shown) or another language selection mechanism (not shown).

Until the user initiates play of the media, a Background Visual 2215 is shown on the Background Screen 2205. The Background Visual 2215 comprises one or more of text, media, and another background visual format. For example, the Background Visual 2215 comprises an advertisement. For example, as shown here, the backdrop comprises a promotional photograph from the film. Alternatively, or additionally, the backdrop comprises commercial content related to what is being played on the motion picture theater screen. For example, the Background Visual 2215 comprises one or more advertisements. For example, the advertisement is static. For example, the advertisement is dynamic. For example, the Background Visual 2215 comprises an offer to purchase an item seen in the motion picture. For example, the Background Visual 2215 comprises one or more interactive elements. For example, the Background Visual 2215 comprises a button (not pictured) configured, when pressed by the user, to take the user to another part of the application. For example, the Background Visual 2215 comprises a button (not pictured) configured, when pressed by the user, to take the user to an external resource. For example, the external resource comprises one or more of a store, a social network, a box office, and another external resource. For example, the store comprises one or more of a store operated by a service provider and a store operated by a third party. For example, the user might be taken to a theater box office in order to order tickets for a future film.

The user may tap, actuate, press or otherwise activate the "Play" button 2220 to initiate playback. Alternatively, or additionally, the "Play" button is automatically triggered by the application. The playback may provide one or more of audio, video, and another form of playback. For example, the playback could provide closed captions. A Volume slider 2230 allows the user to adjust the audio volume.

Figure 23:
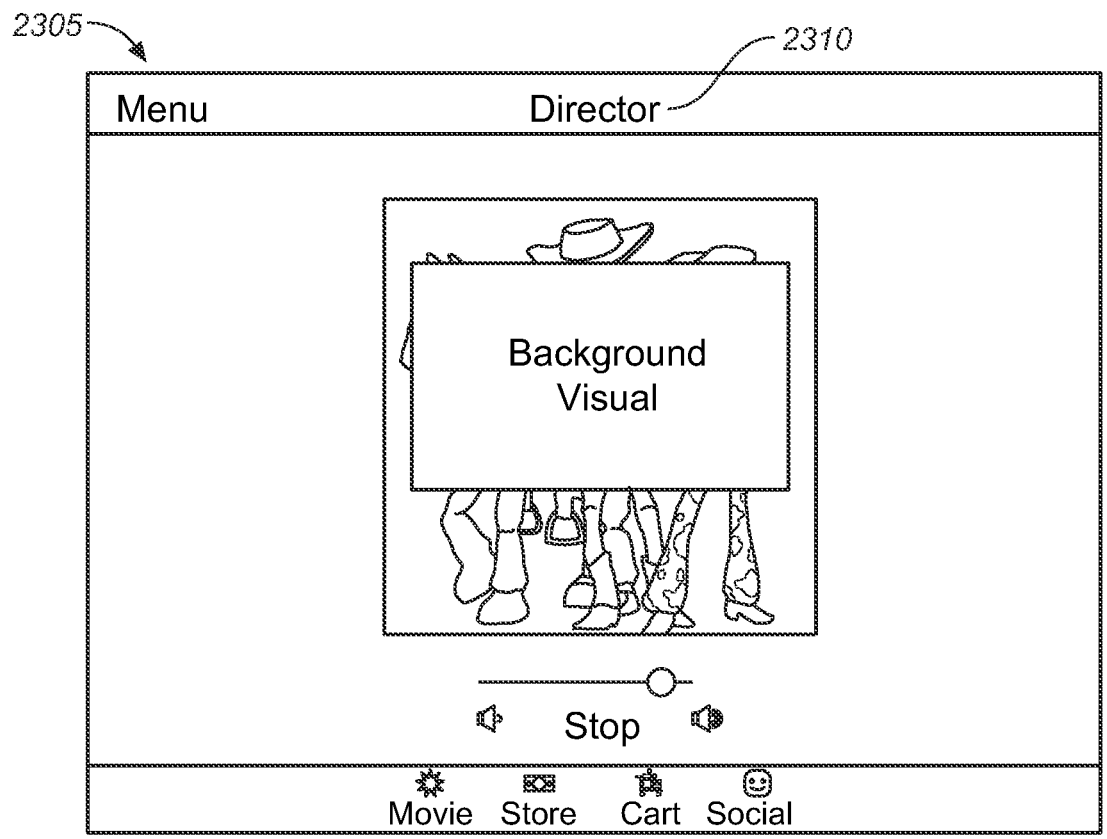
FIG. 23 is an exemplary screenshot of a GUI of a client device showing an example of an alternative commentary screen seen by a user as an alternative commentary track is being played.

FIG. 23 is an exemplary screenshot of a GUI 2305 of a client device showing an example of an alternative commentary screen 2305 seen by a user as an alternative commentary track is being played. The Alternative Commentary Screen 2305 comprises an alternative commentary track indicator 2310 that indicates the alternative commentary track the user previously selected using the customization and synchronization menu 1512 in FIG. 15. In this example, the user pressed the Director button 1545, selecting the director-based media track 2310.

The customization and synchronization menu 1512 in FIG. 15 allowed for selection of the alternative commentary track 2310. For example, in FIG. 15, if the user pressed the Director button 1545, an alternative commentary track 2310 comprising a director-based media track 2310 is played. For example, the director-based media track 2310 is played discussing the work of a Director of the media track. For example, the director-based media track 2310 is played featuring one or more interviews with a Director of the media track. For example, the director-based audio track 2310 is played if the user pressed the Director button 1545. For example, the director-based video track 2310 is played if the user pressed the Director button 1545. For example, the director-based audio track 2310 media player is played if the user pressed the Director button 1545. For example, the director-based audio track media player is synchronized to the client device and is played if the user pressed the Director button 1545.

Optionally, the user is allowed to now change his or her alternative commentary track selection if he or she clicks on the director button 2310 and chooses a new alternative commentary track 2310 from a pop-up menu (not shown) or another language selection mechanism (not shown).

If from the customization and synchronization menu 1512 in FIG. 15, the user had pressed the Producer button 1550, an alternative commentary track 2310 comprising a producer-based media track 2310 is played. If from the customization and synchronization menu 1512 in FIG. 15, the user had pressed the Actor button 1555, an alternative commentary track 2310 comprising an actor-based media track 2310 is played. If from the customization and synchronization menu 1512 in FIG. 15, the user had pressed the Writer button 1555, an alternative commentary track 2310 comprising a writer-based media track 2310 is played. As mentioned in the discussion of FIG. 15, clearly other buttons could be created such as a Costume Designer button, a Cinematographer button (not shown), and the like.

Figure 24:
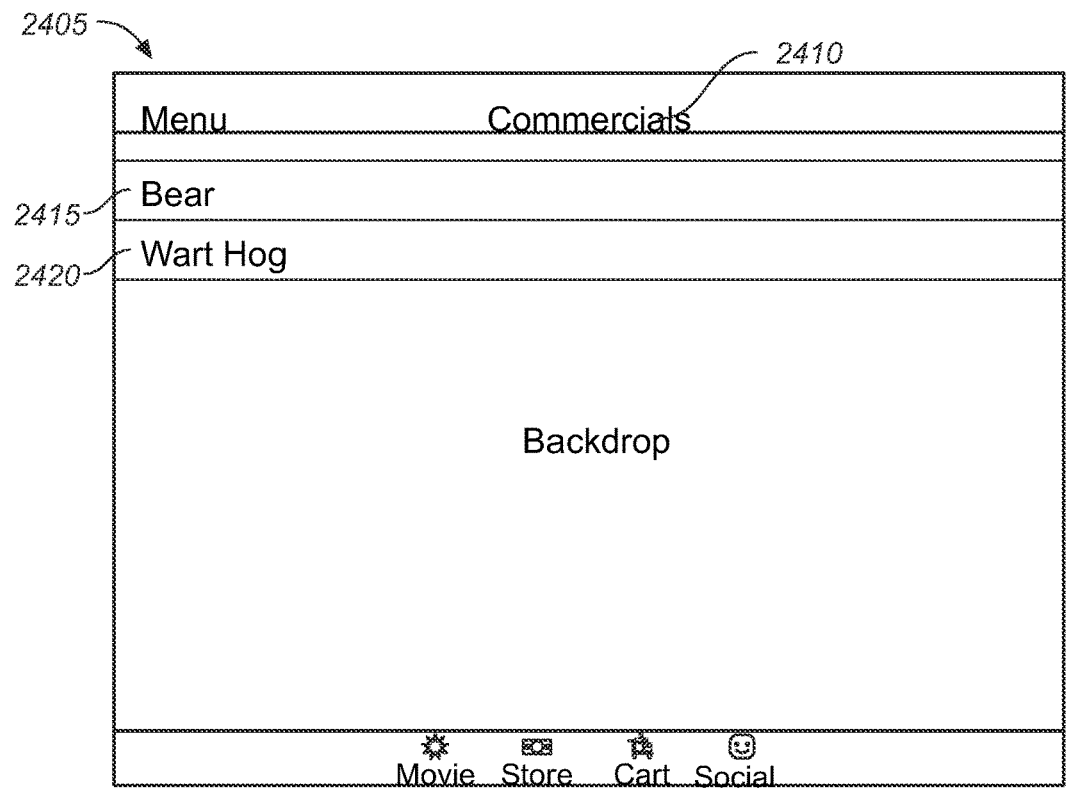
FIG. 24 is an exemplary screenshot of a GUI of a client device showing an example of an Alternative Content Screen seen by a user before alternative content plays.

FIG. 24 is an exemplary screenshot of a GUI 2405 of a client device showing an example of an Alternative Content Screen 2405 seen by a user before alternative content plays. For example, the Alternative Content Screen 2405 comprises one or more of a commercial, a trailer, a documentary, an outtake, and another form of alternative content. For example, the alternative content is pre-determined by the user. For example, the commercial is pre-determined by the user. For example, the Alternative Content Screen 2405 comprises a commercials indicator button 2410 that indicates that the user previously selected a commercial using the customization and synchronization menu 1512 in FIG. 15.

The Commercials button 1565 comprised in the customization and synchronization menu 1512 in FIG. 15 allowed for selection of the commercial. The Menu also allowed for the showing of pre-determined commercials. The list of commercials may be targeted based on the user account preferences or customization choices.

The commercial may be pre-determined by the client device based on one or more of a selection algorithm, a profile of the user, demographic information regarding one or more of groups to which the user belongs and groups to which the user does not belong, and another selection criterion. Alternatively, or additionally, the user may now select one or more pre-determined commercials. The user may now select the one or more pre-determined commercials by selecting one or more of a specific commercial of interest, a commercial category of interest, a commercial director of interest, a commercial producer of interest, a commercial actor of interest, a commercial writer of interest, and another commercial selection criterion. In this example, two commercials are available in the menu, a bear commercial and a wart hog commercial. A user can press the Bear button 2415 to select the bear commercial. Alternatively, or additionally, the user can press the wart hog button 2420 to select the wart hog commercial. In this example, the user now presses the Bear button 2415, selecting the bear commercial. Once the Bear button 2415 is pressed, the client device automatically transfers the user to a Commercial Play screen such as the one seen in FIG. 25.

Figure 25:
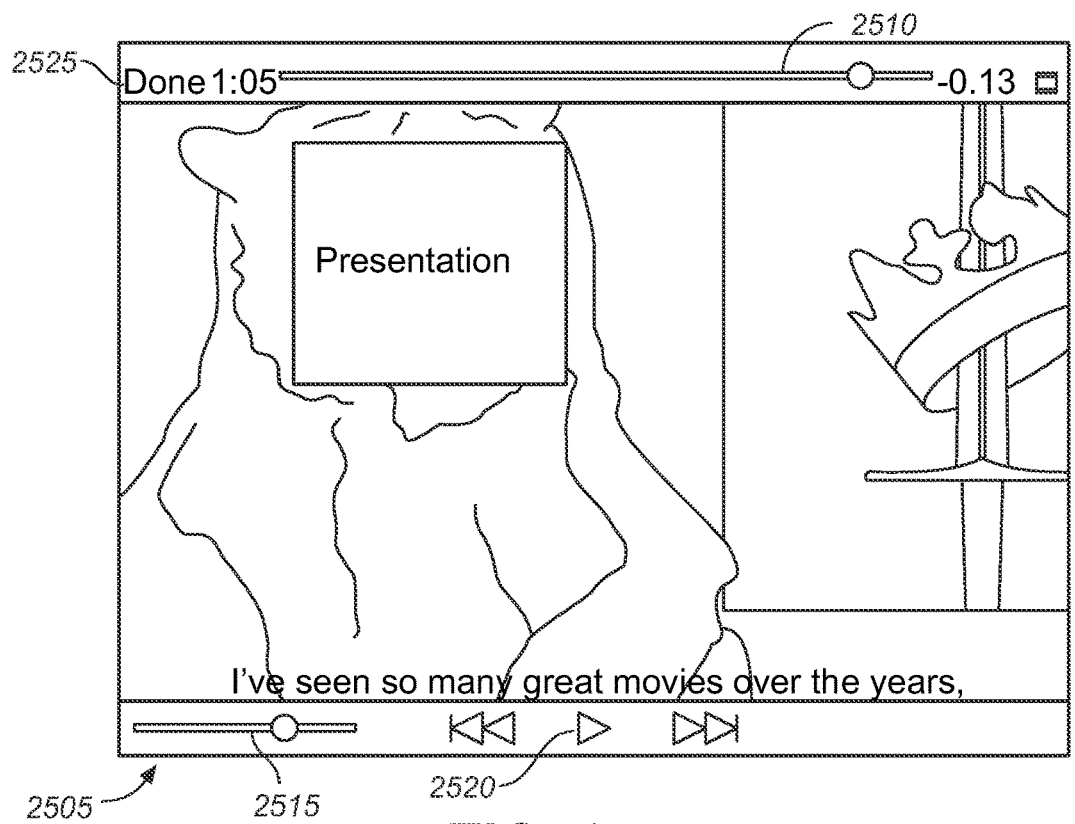
FIG. 25 is an exemplary screenshot of a GUI of a client device showing an example of an alternative content play screen seen by a user as alternative content is playing.

FIG. 25 is an exemplary screenshot of a GUI 2505 of a client device showing an example of an Alternative Content Play Screen 2505 seen by a user as alternative content is playing. For example, the Alternative Content Play Screen 2505 comprises one or more of a commercial, a trailer, a documentary, an outtake, and another form of alternative content. For example, the alternative content is pre-determined by the user. For example, the commercial is pre-determined by the user.

The commercial that is playing here is the Bear commercial chosen by the user in the previous figure when he or she pressed the Bear button 2415 in FIG. 24. Preferably, though not necessarily, the Bear commercial automatically starts playing and Alternative Content Play screen 2505 is automatically displayed after the user pressed the Bear button 2415 in FIG. 24.

The percentage of elapsed time played in the commercial is graphically illustrated by an elapsed time bar 2510. The user may control the volume using a volume control 2515. The user may play or pause the commercial using a pause/play button 2520. The pause or play button 2520 toggles between playing or pausing the commercial, with the appropriate icon shown to the user to indicate whether pressing the pause/play button 2520 will pause the commercial or resume play of the commercial. If the user presses a Done button 2525, the user is returned to the Commercials screen 2405 shown in FIG. 24.

Figure 26:
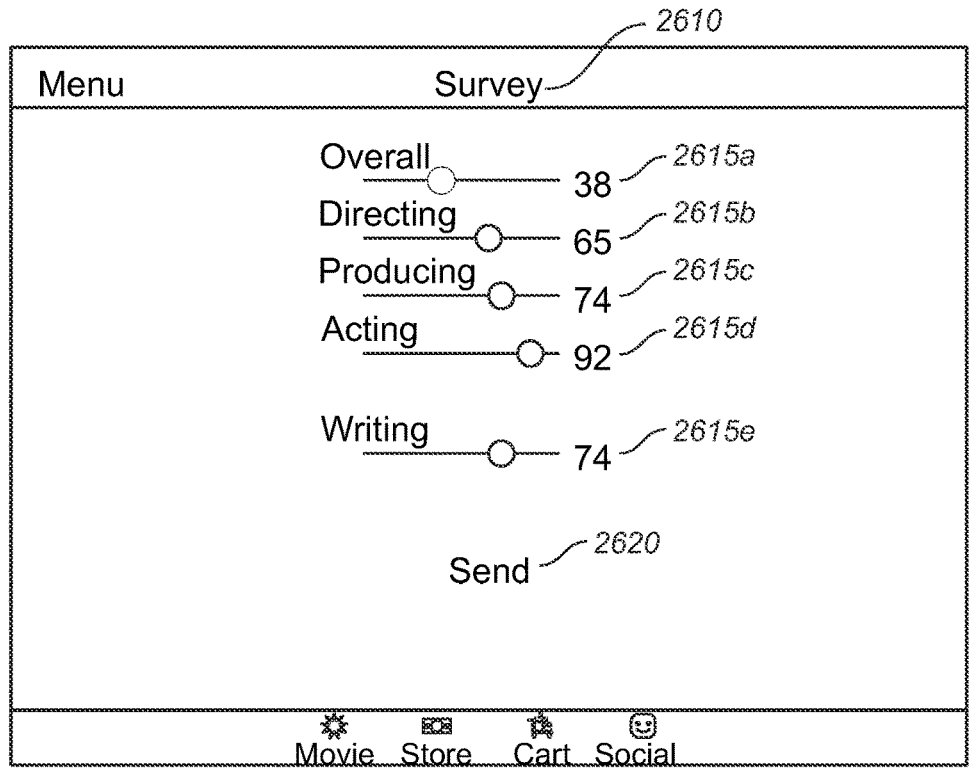
FIG. 26 is an exemplary screenshot of a GUI of a client device showing an example of a survey screen displayed to a user pursuant to initiation of a user survey.

FIG. 26 is an exemplary screenshot of a GUI of a client device showing an example of a of survey screen displayed to a user pursuant to initiation of a user survey. The example includes an active survey screen 2610 that is shown to a user after the survey is under way.

The Survey button 1585 comprised in the customization and synchronization menu 1512 in FIG. 15 allowed for selection of the commercial. If the Survey button 1585 was pressed by the user, the Survey button 1585 triggered the client device to provide a survey screen 2610 offering a survey in which the user is invited to participate. Alternatively, or additionally, if the Survey button 1585 is pressed by the user, the Survey button 1585 will trigger the client device to provide a customized survey interface that is customized based on one or more survey preferences. Survey preferences comprise one or more of a user's account information, a rating of the media content, a time zone location, regional language usage, and other survey preferences. For example, if the user selects a dog in the customization process, a survey could be presented regarding dogs.

Survey screen 2610 comprises sliders 2615a-2615e. Each slider 2615a-2615e allows the user to evaluate the media based on the quality of one of the directing, the producing, the acting, and the writing. For example, overall slider 2615a allows the user to evaluate the media based on the overall media quality. For example, directing slider 2615b allows the user to evaluate the media based on the quality of the directing. For example, producing slider 2615c allows the user to evaluate the media based on the quality of the producing. For example, acting slider 2615d allows the user to evaluate the media based on the quality of the acting. For example, writing slider 2615e allows the user to evaluate the media based on the quality of the writing. For example, in addition to the directing, producing, acting, and writing sliders seen in FIG. 26, one could also have a Cinematographer slider, a Costume slider, and the like.

Alternatively, or additionally, when the user hovers one or more of a mouse and another navigation device over the overall slider 2615a, the user is invited to individually rate the overall media quality.

Alternatively, or additionally, when the user hovers one or more of a mouse and another navigation device over the directing slider 2615b, the user is invited to individually rate one or more of a media's co-directors.

Alternatively, or additionally, when the user hovers one or more of a mouse and another navigation device over the producing slider 2615c, the user is invited to individually rate one or more of a media's co-producers.

Alternatively, or additionally, when the user hovers one or more of a mouse and another navigation device over the acting slider 2615d, the user is invited to individually rate one or more of a media's actors.

Alternatively, or additionally, when the user hovers one or more of a mouse and another navigation device over the writing slider 2615e, the user is invited to individually rate one or more of a media's writers.

Variations are almost unlimited, as will be evident to those of skill in the art. For example, the active survey screen 2610 could further comprise sliders allowing the user to provide input on one or more of the media's pacing, excitement, fight quality, emotional effect, thematic closeness to its trailer, and so on.

When the user has finished answering the survey, the user clicks a Send button 2620.

Figure 27:
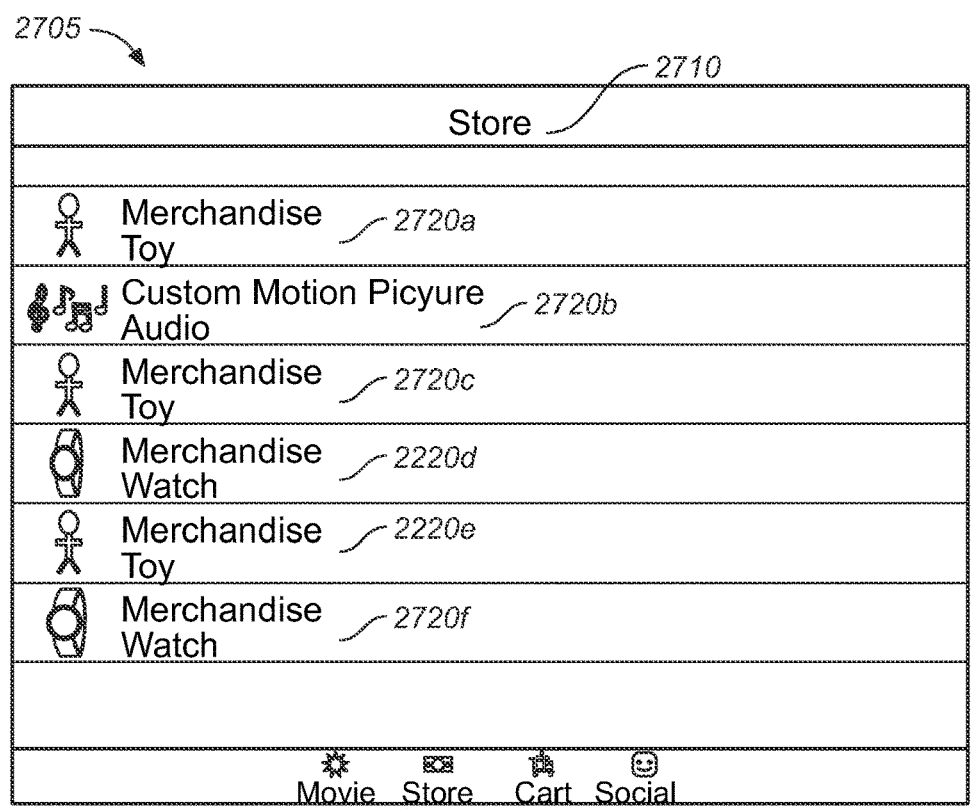
FIG. 27 is an exemplary screenshot of a GUI of a client device showing an example of a Storefront Screen seen by a user visiting the store.

FIG. 27 is an exemplary screenshot of a GUI 2705 of a client device showing an example of a Storefront Screen 2705 seen by a user visiting the store. The Storefront Screen 2705 comprises a store indicator button 2710 that indicates that the user previously selected the store using the customization and synchronization menu 1512 in FIG. 15.

The Store button 1587 comprised in the customization and synchronization menu 1512 in FIG. 15 allowed for selection of the store. If the Store button 1587 was pressed by the user, the Store button 1587 triggered the client device to provide a storefront screen 2705 displaying store information about a store.

Merchandise list 2712 comprises merchandise buttons 2720a-2720f. Merchandise buttons 2720a-2720f offer the user the opportunity to purchase different merchandise. In this particular example, the user is offered the opportunity to purchase a first toy using first toy button 2720*a*. In this particular example, the user is offered the opportunity to purchase a customized motion picture using second Custom Motion picture button 2720*b*. In this particular example, the user is offered the opportunity to purchase a second toy named "Jessie" using second toy button 2720*c*. In this particular example, the user is offered the opportunity to purchase a first watch using first watch button 2720*d*. In this particular example, the user is offered the opportunity to purchase a third toy using third toy button 2720*e*. In this particular example, the user is offered the opportunity to purchase a second watch using second watch button 2720*f*.

For example, the store may sell one or more of compact discs (CD's), DVD's, downloads, views, and other formats of on-sale media. The on-sale media may comprise the user's personally customized tracks.

The on-sale media may comprise one or more of the media currently being viewed, DVD's of other media directed by one or more of the same directors who directed the media being viewed, DVD's of other media produced by one of the same producers who produced in the media being viewed, DVD's of other media with one or more of the same actors acting in the media being viewed, DVD's of other media with one or more of the same writers who wrote the media being viewed, and the like. For example, the store may sell a stuffed animal depicting character that appears in the media being viewed. For example, the store may sell one or more of an electronic book (e-book), a paper book, and an audio book about the making of the media being viewed. For example, the store may sell one or more of an electronic book (e-book), a paper book, and an audio book telling the story told by the media being viewed.

For example, the user selects the second Custom Motion picture button 2720*b* from the merchandise list 2712. The user is then transferred to Custom Motion picture screen 2805 in FIG. 28A. As a second example, the user selects the second watch button 2720*f*. The user is then sent to Item Purchase Screen 2905 in FIG. 29.

Figure 28A:
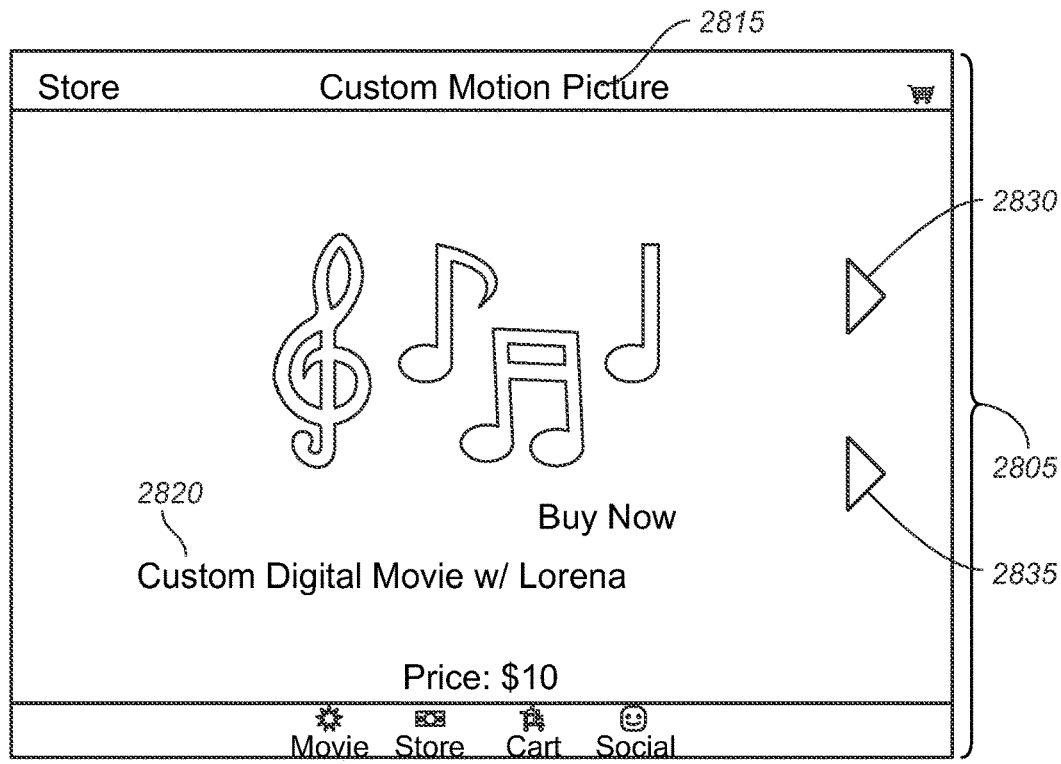
FIGS. 28A and 28B are a pair of exemplary screenshots of GUI's of a client device showing examples of custom motion picture purchase screens displayed to a user pursuant to initiation of a purchase of a custom motion picture.
Figure 28B:
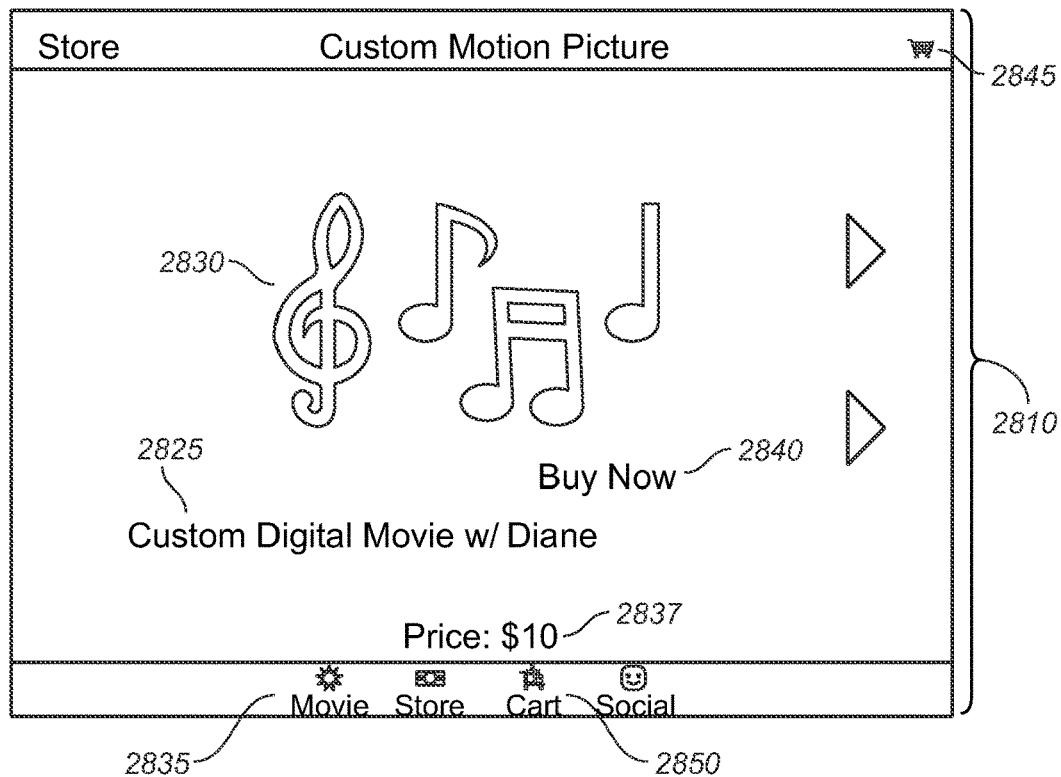

FIGS. 28A and 28B are a pair of exemplary screenshots of GUI's of a client device showing examples of Custom Motion Picture Purchase Screens displayed to a user pursuant to initiation of a purchase of a Custom Motion Picture. For example, a purchase may comprise one or more of an ownership transfer in exchange for payment, an ownership transfer in exchange for consideration other than payment, a rental, a pay-per-view, and another type of purchase.

The examples include default Custom Motion Picture screen 2805 that is initially shown to a user and active Custom Motion Picture screen 2810 that is shown to a user after the Custom Motion Picture is under way. The default Custom Motion picture Screen 2805 comprises a Custom Motion Picture indicator button 2815 that indicates that the user previously selected the Custom Motion picture using one of more of the first Custom Motion Picture button 1588 in FIG. 15 and the second Custom Motion Picture button 2715B in FIG. 27.

Default Custom Motion Picture screen 2805 displays a Custom Motion Picture Purchase opportunity using default settings. In this example, the Default Girl's Name 2820 is Lorena, the name of the motion picture's leading female character.

Active Custom Motion picture screen 2810 displays a Custom Motion Picture Purchase opportunity using customized settings. For example, customized settings comprise the user's first name, which in this example is Amanda. Accordingly, the Customized Girl's Name 2825 is Diane. Variations would include customized settings comprising the first name of one or more of a user's parent, child, spouse, partner, friend, pet, and stuffed animal.

The user can gather more information about the Custom Motion picture by pressing one or more of first Custom Motion Picture information button 2830 and second Custom Motion Picture information button 2835. If the user presses the first Custom Motion Picture information button 2830, the displayed information may comprise Custom Motion Picture Price 2837. If the user decides to purchase the Custom Motion Picture, he or she can click on the Buy Now button 2840. If the user presses the "Buy Now" button 2840, this prompts a popup indicating that the user needs to click on the Cart 2850 in order to add the item to their cart.

Once the user clicks the Cart 2840, the user is automatically taken to the Purchase Summary Screen 3005 shown below in FIG. 30. If a user wanted to access the Cart 2840 without purchasing the item, the user may do so by clicking on the Cart tab 2850 on the bottom of the active Custom Motion picture screen 2810. Optionally, the Cart tab 2850 also indicates how many items to be purchased are already in the user's Cart 2840.

Figure 29:
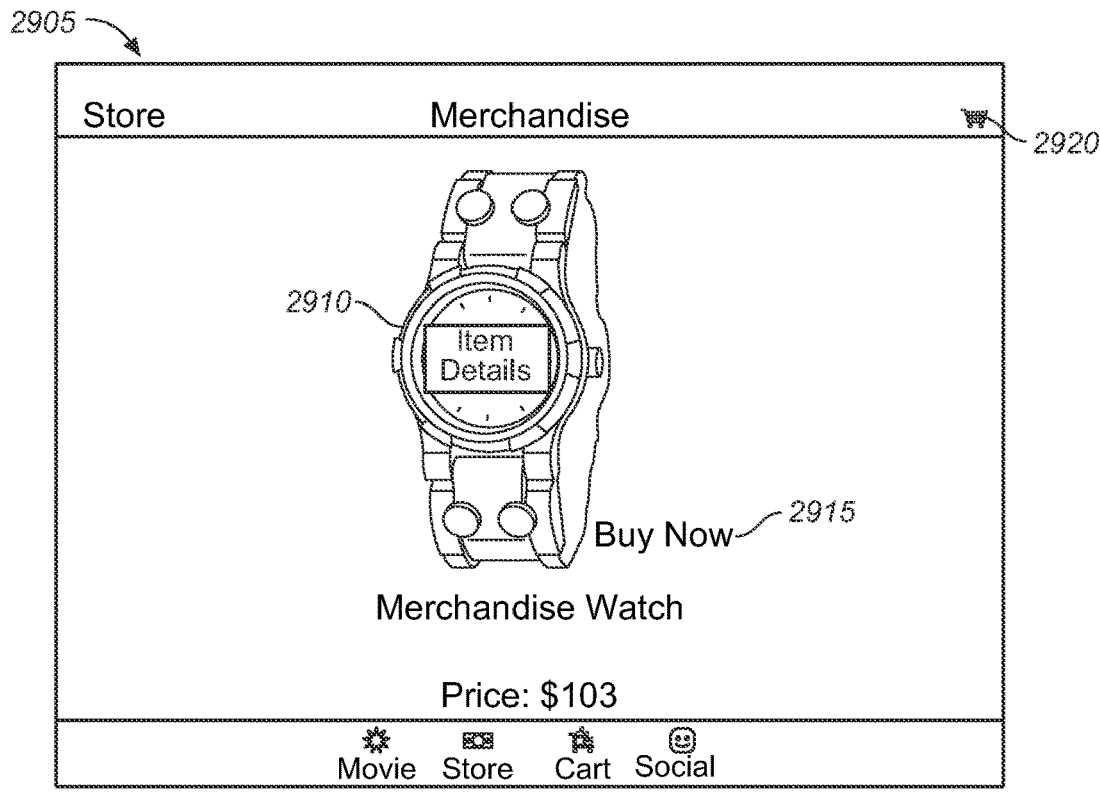
FIG. 29 is an exemplary screenshot of a GUI of a client device showing an example of an item purchase screen seen by a user considering making a purchase of an item.

FIG. 29 is an exemplary screenshot of a GUI 2905 of a client device showing an example of an Item Purchase Screen 2905 seen by a user considering making a purchase of an item. The Item Purchase Screen 2905 comprises an Item Details field 2910 comprising information regarding the Item. For example, the Item Details field 2910 comprises one or more of a photograph of the Item, a specification regarding the item, an Item price, an Item condition, Item shipping information, Item manufacturer information, Item customer ratings, and an other Item detail. The photograph may be displayed in one or more of a static form, a scrolling form, and another photographic form. Optionally, the Item Details field comprises one or more of media and text. Optionally, other items related to the selected item can also be displayed. In this example, the photograph of the watch is displayed in static form. In this example, the Item Details field 2910 comprises a photograph of the watch that is being considered for purchase, an indication of its price, and a "Buy Now" button 2835. If the user presses the "Buy Now" button 2915, this prompts a popup indicating that the user needs to click on the Cart 2920 in order to add the item to their Cart 2920. If the user adds the item to their Cart 2920, the user is taken to Purchase Summary screen 3005 in FIG. 30.

Figure 30:
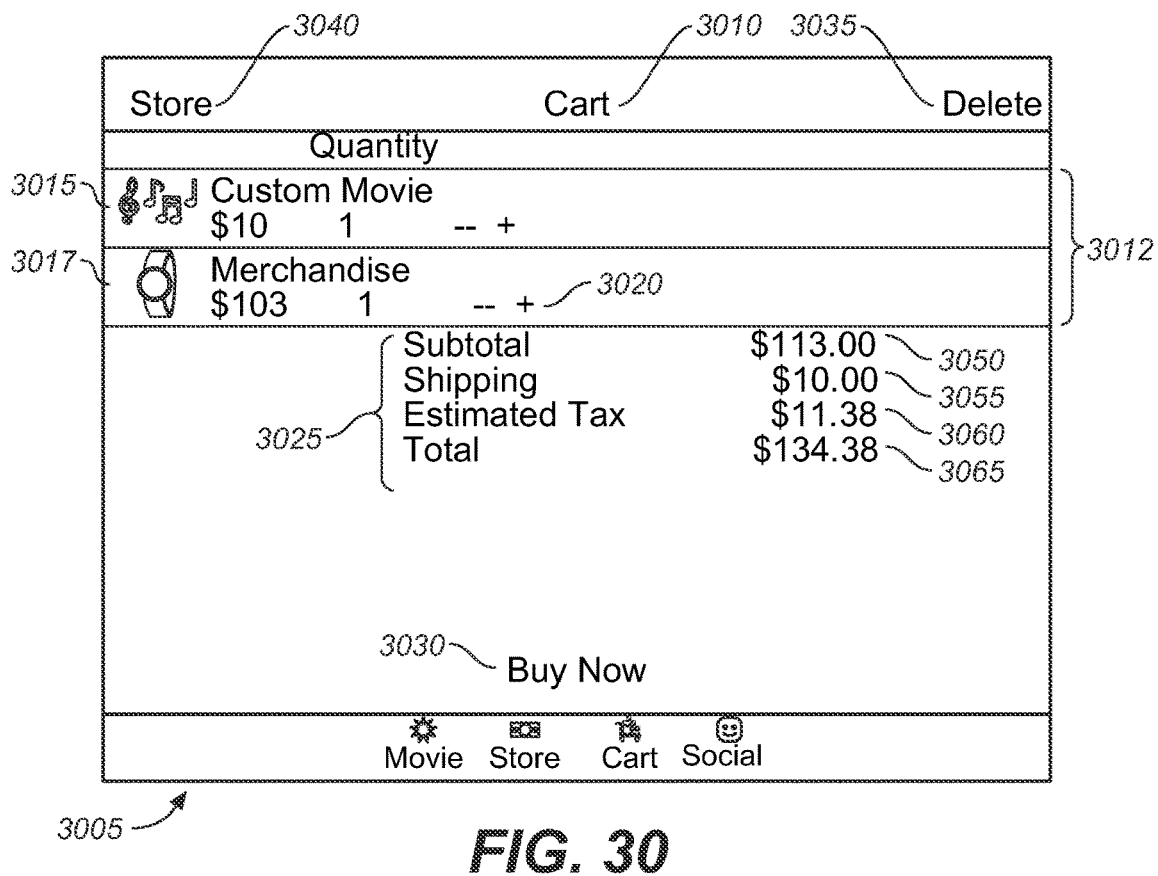
FIG. 30 is an exemplary screenshot of a GUI of a client device showing an example of a Purchase Summary Screen seen by a user making a purchase of the custom motion picture depicted in FIG. 28 and of the watch depicted in FIG. 29.

FIG. 30 is an exemplary screenshot of a GUI 3005 of a client device showing an example of a Purchase Summary Screen 3005 seen by a user making a purchase of the Custom Motion Picture depicted in FIG. 28 and of the watch depicted in FIG. 29. The Purchase Summary screen 3005 comprises Cart button 3010 and Purchase List 3012. If the user hovers one or more of a mouse and another navigation device over the Cart button 3010, the user is taken to the Purchase List 3012. Additionally, or alternatively, the user is automatically taken to the Purchase List 3012 without needing to hover the one or more of a mouse and another navigation device over the Cart button 3010. The Purchase List 3012 comprises a Custom Motion picture purchase listing 3015 and a Watch purchase listing 3017.

The Purchase Summary Screen 3005 further comprises Minus/Plus buttons 3020, Pricing Information 3025, the "Buy Now" button 3030, a Cart Deletion button 3035, and a Storefront Return button 3040. If the user presses the "Buy Now" button 2835, this prompts a popup indicating that the user needs to click on the Cart 2840 in order to add the item to their cart.

The Cart Deletion button 3035, when pressed by the user, deletes the user's Cart 2840. The Storefront Return button 3045, when pressed by the user, returns the user to the Storefront screen 2505 in FIG. 25. Pricing Information 3025 comprises a Subtotal 3050 giving the total item price of the Purchase List 3012, a Shipping price 3055, Estimated Tax 3060, and a Total Price 3065. Pricing Information 3025 may be automatically calculated. One or more of a registered street address for the user and a purchase location may be used to confirm the pricing. In this example, the Total Price 3065 equals the sum of the Subtotal 3050, the Shipping price 3055, and the Estimated Tax 3060.

A user has the opportunity to increase or decrease the number of an items purchased by tapping on the Minus/Plus buttons 3020, which automatically tally the quantity of an item desired, and automatically adjust the Pricing Information 3025.

Figure 31A:
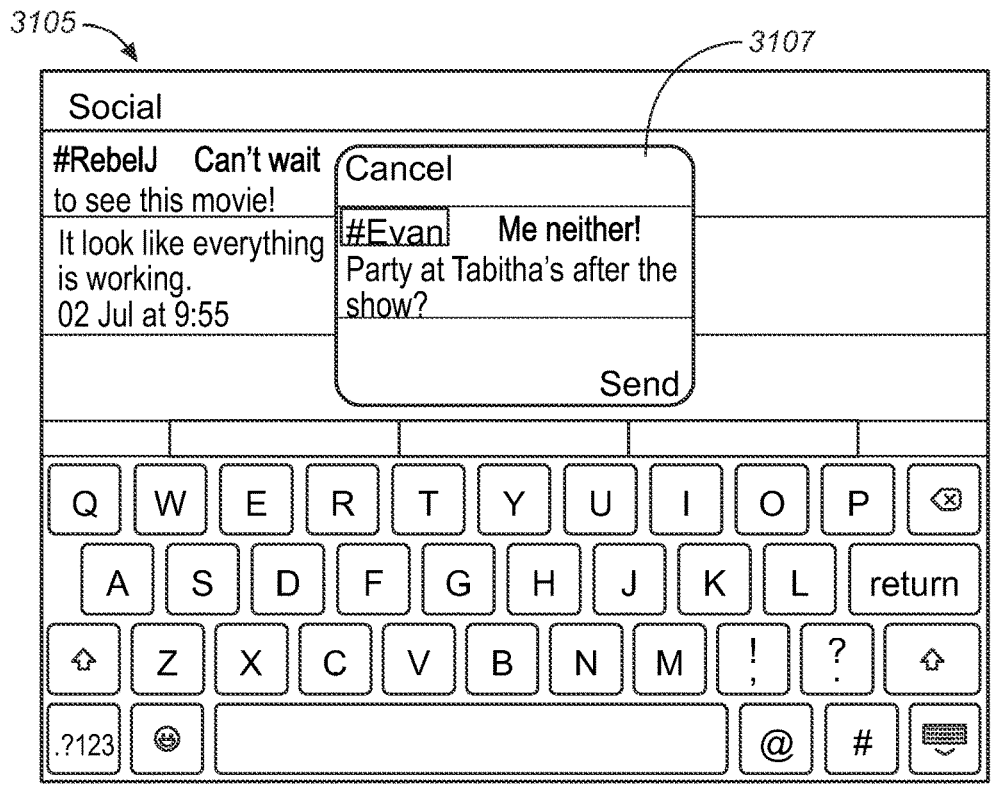
FIGS. 31A and 31B are a pair of exemplary screenshots of GUI's of a client device showing examples of users using the social network.
Figure 31B:
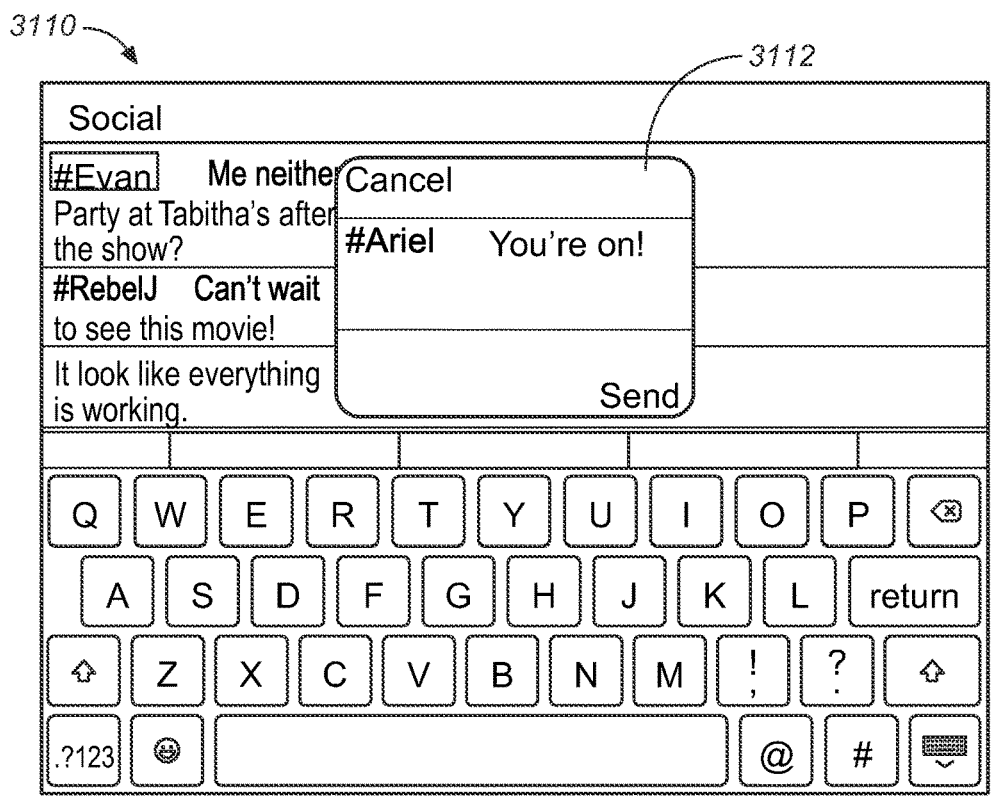

FIGS. 31A and 31B are a pair of exemplary screenshots of GUI's of a client device showing examples of users using the social network. The examples include first social network screen 3105 comprising first social network popup box 3107 and second social network screen 3110 comprising second social network popup box 3112. First social network screen 3105 and second social network screen 3110 can be operating simultaneously and/or sequentially.

Advantages of the invention include the ability to individually track a potentially unlimited number of audience members using the unique identifiers comprised in their individual devices. Additionally, media player time is divided into different buffers to improve precision. For example, the minutes and seconds go into different buffers, and then into different packets.

While the above representative embodiments have been described with certain components in exemplary configurations, it will be understood by one of ordinary skill in the art that other representative embodiments can be implemented using one or more of different configurations and different components. For example, it will be understood by one of ordinary skill in the art that the order of certain fabrication steps and certain components can be altered without substantially impairing the functioning of the invention.

For example, one or more of audio, video, and another entertainment format can be playing on the client-side. For example, one of more of audio, video, and another entertainment format can be played on the server-side.

For example, while this application for simplicity at times verifies that the media to be customized is a motion picture, embodiments of the invention are also applicable to silent pictures, video recordings of concerts, audio recordings of concerts, video recordings of interviews, audio recordings of interviews, and countless other media. For example, instead of being implemented by the client-side customization application 145 and the server-side master application 185, the steps of the flowchart depicted in FIG. 6 may be implemented by one or more of the server-side computing device 170 and the client device 120. For example, instead of being primarily implemented by the client-side customization application 145, the server-side master application 185, and the server-side customization application 190, the steps of the flowchart depicted in FIGS. 9 and 10 may be implemented by one or more of the server-side computing device 170 and the client device 120.

For example, instead of being implemented by the client-side customization application 145, the server-side master application 185, the server-side customization application 190, and the server-side streaming application 195, the steps of the flowchart depicted in FIG. 5 may be implemented by one or more of the server-side computing device 170 and the client device 120. For example, instead of being primarily implemented by the server-side master application 185, the steps of the flowchart depicted in FIGS. 11 and 12 may be implemented by one or more of the server-side computing device 170 and the client device 120.

For example, instead of being located in the client-side memory 130, one or more of the client-side electronic commerce application 140, the client-side customization application 145, the client-side audience measurement application 150, a client-side social networking application 155, and the client-side additional content application 160 may be located in a section of the client device 120 other than the client-side memory 130.

For example, instead of being located in the server-side memory 180, one or more of the server-side master application 185, the server-side customization application 190, and the server-side streaming application 195 may be located in one or more of the server-side data storage 165 and a section of the server-side computing device 170 other than the server-side memory 180. For example, instead of being a free-standing component of the server-side networked environment 110, the server-side memory 180 may be located in the server-side computing device 170.

For example, the client-side data storage 135 may be separate from the client device 120 rather than being comprised in the client device 120. For example, the server-side data storage 165 may be comprised in the server-side computing device 170 rather than being separate from the server-side computing device 170. For example, in addition to the Director, Producer, Actor, and Writer buttons seen in FIG. 15, one could also have a Cinematographer button, a Costume Designer button, and the like.

For example, instead of being the client device 120 and the client-side playback device 135 being two separate entities, the client-side playback device 135 may be comprised in the client device 120. For example, instead of the client-side customization application 145 and the client-side synchronization application 147 being two separate entities, the client-side synchronization application 147 may be comprised in the client-side customization application 145. For example, instead of the client-side customization application 145 and the client-side synchronization application 147 being two separate entities, the client-side customization application 145 may be comprised in the client-side synchronization application 147. The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A method for real-time customization and synchronization of stock media content, comprising:
   receiving, by each of a plurality of client devices, each of the plurality of client devices controlled by a respective user, stock media content selected by the respective user to be customized and played on the client device in coordination with server-side playback of the stock media content by a server-side computing device;
   obtaining, by each of the client devices, customization preferences of the respective user;

customizing the stock media content, by each of the client devices, using the customization preferences, so as to create respective customized media content;

creating, by each of the client devices, a client-side message or packet comprising one or more of a client-side unique identifier and a client-side start host time (CSHT);

sending, by each of the client devices, the client-side message or packet to the server-side computing device;

receiving and processing a server-side message or packet comprising one or more of a server-side unique identifier, the CSHT, a server-side start host time (SSHT), a server-side end host time (SEHT), and a server-side running media play time (SRMPT) and synchronizing in real-time, by each of the client devices, using one or more of the server-side unique identifier, the CSHT, the SSHT, the SEHT, and the SRMPT, client-side playback of the respective customized media content with server-side playback of the stock media content; and playing back, by each of the client devices, the synchronized respective customized media content in synchronization with the playback of the stock media content by the server device, wherein the playback of the stock media content by the server device is via a screen separate from the client devices;

wherein the stock media content comprises a stock video content and the respective customized media content of each of the client devices comprises a modified audio track corresponding to the stock video content.

2. The method of claim 1, wherein the step of communicating comprises transmitting a client-side message or packet, by each of the client devices, over the network, to the server-side computing device.

3. The method of claim 1, wherein the step of obtaining comprises receiving customization preference selections from the respective user of each of the client devices.

4. The method of claim 1, wherein the step of obtaining comprises generating customization preferences for the respective user of each of the client devices using user characteristics comprised in one or more of client-side data storage and client-side memory.

5. The method of claim 1, comprising a further step, performed after the synchronizing step, of:
relaying to the respective user, by each of the client devices, one or more offers to purchase customized goods prepared by the server-side computing device using the respective user's customization preferences.

6. The method of claim 1, wherein the respective customized media content of each of the client devices further comprises a modified visual component played back via a screen of the respective client device.

7. A method for customizing media content pursuant to a method for real-time customization and synchronization of stock media content, comprising:
receiving and processing, by a server-side computing device, from each of a plurality of client devices controlled by a respective user, a client-side message or packet from the client device comprising one or more of a client-side unique identifier, and a client-side start host time (CSHT);

creating, by the server-side computing device, a server-side message or packet comprising one or more of a server-side unique identifier comprising a copy of the client-side unique identifier, the CSHT, a server-side start host time (SSHT), a server-side end host time (SEHT), and a server-side running media play time (SRMPT);

transmitting the server-side message or packet to each of the client devices, by the server-side computing device, to be used by each of the client devices along with previously received stock media content selected to be customized, and customized media content previously created using customization preferences obtained from the respective user, to synchronize in real-time, using the CSHT, client-side playback of the respective customized media content with server-side playback of the stock media content; and playing back, by the server-side computing device, the synchronized stock media content via a screen-separate from the client devices, in synchronization with the playback by each of the client devices of the respective customized media content;

wherein the stock media content comprises a stock video content played via a screen and the respective customized media content of each of the client devices comprises a modified audio track corresponding to the stock video content.

8. The method of claim 7, wherein the respective customized media content of each of the client devices further comprises a modified visual component played back via a screen of the respective client device.

9. A method for customizing media content pursuant to a method for real-time customization and synchronization of stock media content, comprising:
receiving, over a network from each of a plurality of client device, controlled by a respective user, by a server-side computing device, a message or packet comprising stock media content received from the respective user, the message or packet further comprising customization preferences of the respective user obtained by the client-side customization application, to create a respective customized media content to be played by a respective client-side playback device in coordination with server-side playback of the stock media content by a server-side playback device;

customizing the stock media content, by the server-side computing device, using the customization preferences of the respective user, so as to create the respective customized media content;

transmitting, by the server-side computing device, to each of the client devices, the respective customized media content so that each of the client devices may synchronize with its playback of the respective customized media content a playback of the stock media content by the server-side computing device;

receiving, by the server-side computing device, from each of the client devices, a client-side message or packet comprising one or more of a client-side unique identifier and a client-side start host time (CSHT);

sending to each of the client devices, by the server-side computing device, a server-side message or packet comprising one or more of a server-side unique identifier, the CSHT, a server-side start host time (SSHT), a server-side end host time (SEHT), and a server-side running media play time (SRMPT); and initiating, by the server-side computing device, server-side playback of the stock media content on a screen separate from the client devices and initiating, by the server-side computing device, via a play command the server-side computing device sends to each of the client devices, client-side playback of the respective customized media content that is synchronized using one or more of the client-side unique identifier, the CSHT, the SSHT, the SEHT, and the SRMPT;

wherein the stock media content comprises a stock video content and the respective customized media content of each of the client devices comprises a modified audio track corresponding to the stock video content.

10. The method of claim 9, wherein the step of transmitting comprises downloading the customized media content by the server-side computing to each of the client devices.

11. The method of claim 9, wherein the step of transmitting comprises streaming segments of the customized media content by the server-side computing device to each of the client devices.

12. The method of claim 9, wherein the step of transmitting comprises transmitting a server-side message or packet, by the server-side computing device, to each of the client devices.

13. The method of claim 9, wherein the step of receiving comprises receiving user customization preference selections from each of the client devices, by the server-side computing device.

14. The method of claim 9, wherein the step of receiving comprises receiving, from each of the client devices, by the server-side computing device, a client-side message or packet.

15. The method of claim 9, wherein the step of receiving comprises receiving, from each of the client devices, by the server-side computing device, a client-side message or packet comprising respective user customization preference selections.

16. The method of claim 9, wherein the step of receiving comprises generating, by the server-side computing device, customization preferences for the respective user using user characteristics comprised in one or more of server-side data storage and server-side memory.

17. The method of claim 9, comprising a further step, performed after the initiating step, of:
preparing, by the server-side computing device, one or more offers to the respective user to purchase customized goods to be created by the server-side computing device using the respective user's customization preferences.

18. The method of claim 17, further comprising further steps, performed after the preparing step, of:
processing an offer accepted by the respective user to purchase the customized goods prepared by the server-side computing device using the respective user's customization preferences; and
creating, by the server-side computing device, the purchased customized goods.

19. The method of claim 17, wherein the customized goods comprise one or more of customized physical goods, customized services, and customized media content.

20. The method of claim 17, wherein the customized goods comprise one or more of a user-specified name, a user-specified message, and another form of customization specified by the respective user.

21. The method of claim 9, wherein the respective customized media content of each of the client devices further comprises a modified visual component played back via a screen of the respective client device.

22. A method for receiving and processing a server-side message or packet and synchronizing one or more clocks comprised in each of a plurality of client device, under a respective user's control with one or more server-side clocks pursuant to a method for real-time customization and synchronization of stock media content, comprising:
receiving, by each of the client devices, a server-side message or packet from the server-side master application, the server-side message or packet comprising one or more of a unique identifier, a client-side start host time (CSHT), a server-side start host time (SSHT), a server-side end host time (SEHT), and a server-side running media play time (SRMPT);
reading, by each of the client devices, the accepted server-side message or packet into one or more client-side buffers;
recording, by each of the client devices, a client end host time (CEHT);
evaluating and verifying, by each of the client devices, integrity of the server-side message or packet by comparing the CEHT and the SEHT;
calculating a half-round-trip time (HRT), by each of the client devices, using one or more of the CEHT, CSHT, SEHT, and SSHT;
reading, by each of the client devices, a value of the SRMPT;
calculating, by each of the client devices, using one or more of CEHT, CSHT, SEHT, SSHT, SRMPT, and HRT, a respective playback offset time $T_{PO}$;
computing, by each of the client devices, using one or more of the respective $T_{PO}$ and the SRMPT, respective a client-side running media play time (CRMPT); and
synchronizing, by each of the client devices, using one or more of the CRMPT and the respective $T_{PO}$, a respective client-side playback of respective customized media content to server-side playback of stock media content, wherein the server-side playback of the stock media content is via a screen separate from the client devices;
wherein the stock media content comprises a stock video component and the respective customized media content of each of the client devices comprises a modified audio track corresponding to the stock video content.

23. A method for customizing stock media content pursuant to a method for real-time customization and synchronization of stock media content, so as to create customized media content, comprising:
receiving, by a server-side computing device, from each of a plurality of client devices controlled by a respective user, a client-side message or packet with pre-determined media content;
creating, by the server-side computing device, a respective customized media content;
adding, by the server-side computing device, to the respective customized media content, using a pre-defined data structure, new media content comprising one or more of respective user-selected new media content and respective non-user-selected new media content;
computing, by the server-side computing device, a total media frames count of the respective customized media content;
computing, by the server-side computing device, a total percentage of the then-written respective customized media content based on the total media frames count; and
writing, by the server-side computing device, the respective new media content into the respective customized media content.

24. A method for constructing a plurality of respective media content files comprising one or more of a respective user's selected media content and media content that was not selected by the respective user, pursuant to a method for real-time customization and synchronization of stock media content, comprising:

launching, by a respective client device under the control of a respective user, a respective client-side media player;

selecting and playing, by the respective client device, a respective pre-determined media content;

creating, by the respective client device, a respective customized media content;

adding, by the respective client device, a respective new media content to the respective customized media content;

computing, by the respective client device, a total media frames count of the respective customized media content;

computing, by the respective client device, a total percentage of the then-written respective customized media content based on the total media frames count; and writing, by the respective client device, the respective new media content into the respective customized media content.

25. A system for real-time customization and synchronization of stock media content, comprising:

a plurality of client devices, each of the plurality of client devices programmed to:

receive stock media content selected by a respective user to be customized and played on the client device in coordination with a server-side playback of the stock media content by a server-side computing device;

obtain customization preferences of the respective user;

customize the stock media content using the customization preferences, so as to create respective customized media content;

create a client-side message or packet comprising one or more of a client-side unique identifier and a client-side start host time (CSHT);

send the client-side message or packet to the server-side computing device;

receive and process a server-side message or packet comprising one or more of a server-side unique identifier, the CSHT, a server-side start host time (SSHT), a server-side end host time (SEHT), and a server-side running media play time (SRMPT) and synchronize in real-time, using one or more of the server-side unique identifier, the CSHT, the SSHT, the SEHT, and the SRMPT, client-side playback of the respective customized media content with the server-side playback of the stock media content; and play back the synchronized respective customized media content in synchronization with the playback of the stock media content by the server device, wherein the playback of the stock media content by the server device is via a screen separate from the client device;

wherein the stock media content comprises a stock video content and the respective customized media content of each of the client devices comprises a modified audio track corresponding to the stock video content.

\* \* \* \* \*

UNITED STATES PATENT AND TRADEMARK OFFICE
CERTIFICATE OF CORRECTION

PATENT NO. : 10,616,329 B2
APPLICATION NO. : 15/328674
DATED : April 7, 2020
INVENTOR(S) : Julio Ferrer Page 1 of 1

It is certified that error appears in the above-identified patent and that said Letters Patent is hereby corrected as shown below:

In the Claims

At Column 48, Line 12, Claim 7 change "media content via a screen-separate" to --media content via a screen separate--

At Column 48, Lines 28 and 29, Claim 9 change "each of a plurality of client device, controlled by" to --each of a plurality of client devices controlled by--

At Column 49, Line 62, Claim 22 change "plurality of client device, under a" to --plurality of client devices under a--

Signed and Sealed this
Twenty-ninth Day of December, 2020

Andrei Iancu
*Director of the United States Patent and Trademark Office*